US008910032B2

(12) United States Patent (10) Patent No.: US 8,910,032 B2
Graves et al. (45) Date of Patent: Dec. 9, 2014

(54) MEDIA-EDITING APPLICATION WITH AUTOMATIC BACKGROUND RENDERING CAPABILITIES

(75) Inventors: Eric J. Graves, Radnor, PA (US); Giovanni Agnoli, San Mateo, CA (US); Vijay Sundaram, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 13/161,467

(22) Filed: Jun. 15, 2011

(65) Prior Publication Data

US 2012/0198318 A1 Aug. 2, 2012

Related U.S. Application Data

(63) Continuation-in-part of application No. 13/111,912, filed on May 19, 2011.

(60) Provisional application No. 61/443,707, filed on Feb. 16, 2011, provisional application No. 61/437,517, filed on Jan. 28, 2011, provisional application No. 61/443,702, filed on Feb. 16, 2011, provisional application No. 61/443,704, filed on Feb. 16, 2011.

(51) Int. Cl.
*G06F 17/00* (2006.01)
*G11B 27/034* (2006.01)
*G06F 9/48* (2006.01)
*G11B 27/34* (2006.01)

(52) U.S. Cl.
CPC ............ *G06F 9/4843* (2013.01); *G11B 27/034* (2013.01); *G11B 27/34* (2013.01)
USPC ............. 715/201; 715/202; 715/255; 710/54; 710/200

(58) Field of Classification Search
USPC ............. 715/201, 202, 203, 255; 710/54, 200
See application file for complete search history.

(56) References Cited

U.S. PATENT DOCUMENTS

| 5,613,909 A | 3/1997 | Stelovsky |
| 5,659,539 A | 8/1997 | Porter et al. |

(Continued)

FOREIGN PATENT DOCUMENTS

| GB | 2464123 | 4/2010 |
| WO | 2007/120694 | 10/2007 |
| WO | WO 2010/106586 | 9/2010 |

OTHER PUBLICATIONS

Updated portions of prosecution history of U.S. Appl. No. 13/161,468, filed Nov. 9, 2011, Graves, Eric J., et al., Updated portions of prosecution history of U.S. Appl. No. 13/161,468, including response(s)/amendment(s) filed Nov. 9, 2011 and Aug. 25, 2011 (6 pages).

(Continued)

*Primary Examiner* — Stephen Hong
*Assistant Examiner* — Matthew Ludwig
(74) *Attorney, Agent, or Firm* — Kenyon & Kenyon LLP

(57) ABSTRACT

Some embodiments provide a media-editing application that includes several background-rendering modules. These modules automatically render segments of a media presentation in the background of a system on which the media-editing application is being executed. By performing rendering in the background, the background-rendering modules produce rendered results for the segments. That is, the modules pre-generate playable media output data (e.g., composite video frames or audio samples) of the media presentation without interrupting other operations (e.g., editing operations, etc.) of the media-editing application. The background-rendering modules in some embodiments include a first background-rendering module and a second background-rendering module. The first background-rendering module determines a prioritized order in which the segments are to be rendered. The second background-rendering module renders the segments of each category in the prioritized order that is determined by the first background-rendering module.

28 Claims, 38 Drawing Sheets

(56) References Cited

U.S. PATENT DOCUMENTS

| | | | |
|---|---|---|---|
| 5,659,793 A | 8/1997 | Escobar et al. | |
| 5,664,216 A | 9/1997 | Blumenau | |
| 5,682,326 A * | 10/1997 | Klingler et al. | 715/202 |
| 5,781,188 A | 7/1998 | Amiot et al. | |
| 5,826,102 A | 10/1998 | Escobar et al. | |
| 6,134,380 A | 10/2000 | Kushizaki | |
| 6,154,600 A | 11/2000 | Newman et al. | |
| 6,154,601 A | 11/2000 | Yaegashi et al. | |
| 6,182,109 B1 * | 1/2001 | Sharma et al. | 718/104 |
| 6,204,840 B1 | 3/2001 | Petelycky et al. | |
| 6,324,335 B1 | 11/2001 | Kanda | |
| 6,487,565 B1 | 11/2002 | Schechter et al. | |
| 6,539,163 B1 | 3/2003 | Sheasby et al. | |
| 6,542,692 B1 | 4/2003 | Houskeeper | |
| 6,546,188 B1 | 4/2003 | Ishii et al. | |
| 6,573,898 B1 * | 6/2003 | Mathur et al. | 345/473 |
| 6,628,303 B1 | 9/2003 | Foreman et al. | |
| 6,763,175 B1 | 7/2004 | Trottier et al. | |
| 6,904,566 B2 | 6/2005 | Feller et al. | |
| 6,940,518 B2 | 9/2005 | Minner et al. | |
| 6,947,044 B1 | 9/2005 | Kulas | |
| 6,956,574 B1 | 10/2005 | Cailloux et al. | |
| 7,313,755 B2 | 12/2007 | Rahman et al. | |
| 7,325,199 B1 | 1/2008 | Reid | |
| 7,383,509 B2 | 6/2008 | Foote et al. | |
| 7,398,002 B2 | 7/2008 | Hsiao et al. | |
| 7,668,869 B2 | 2/2010 | Weinberger et al. | |
| 7,669,130 B2 | 2/2010 | Agarwal et al. | |
| 7,823,056 B1 | 10/2010 | Davey et al. | |
| 8,082,376 B2 * | 12/2011 | Schubert et al. | 710/105 |
| 8,285,901 B2 * | 10/2012 | Schubert et al. | 710/105 |
| 2001/0020953 A1 | 9/2001 | Moriwake et al. | |
| 2001/0036356 A1 | 11/2001 | Weaver et al. | |
| 2002/0023103 A1 | 2/2002 | Gagne | |
| 2002/0154140 A1 | 10/2002 | Tazaki | |
| 2002/0154156 A1 | 10/2002 | Moriwake et al. | |
| 2002/0156805 A1 | 10/2002 | Schriever et al. | |
| 2002/0188628 A1 | 12/2002 | Cooper et al. | |
| 2003/0001848 A1 * | 1/2003 | Doyle et al. | 345/501 |
| 2003/0002851 A1 | 1/2003 | Hsiao et al. | |
| 2003/0018609 A1 | 1/2003 | Phillips et al. | |
| 2003/0097400 A1 * | 5/2003 | Li et al. | 709/203 |
| 2003/0117431 A1 | 6/2003 | Moriwake et al. | |
| 2003/0146915 A1 | 8/2003 | Brook et al. | |
| 2004/0027369 A1 | 2/2004 | Kellock et al. | |
| 2004/0201609 A1 | 10/2004 | Obrador | |
| 2005/0058430 A1 | 3/2005 | Nakamura et al. | |
| 2006/0008247 A1 | 1/2006 | Minami et al. | |
| 2006/0168521 A1 | 7/2006 | Shimizu et al. | |
| 2006/0236245 A1 * | 10/2006 | Agarwal et al. | 715/716 |
| 2007/0154190 A1 | 7/2007 | Gilley et al. | |
| 2007/0262995 A1 | 11/2007 | Tran | |
| 2008/0170553 A1 * | 7/2008 | Montemurro et al. | 370/338 |
| 2009/0100339 A1 | 4/2009 | Wharton-Ali et al. | |
| 2009/0249222 A1 * | 10/2009 | Schmidt et al. | 715/751 |
| 2010/0262710 A1 * | 10/2010 | Khatib et al. | 709/231 |
| 2010/0281381 A1 | 11/2010 | Meaney et al. | |
| 2010/0281382 A1 | 11/2010 | Meaney et al. | |
| 2010/0281383 A1 | 11/2010 | Meaney et al. | |
| 2010/0287475 A1 | 11/2010 | van Zwol et al. | |
| 2010/0305729 A1 | 12/2010 | Glitsch et al. | |
| 2012/0011441 A1 * | 1/2012 | Larsen et al. | 715/716 |

OTHER PUBLICATIONS

Author Unknown, "Adobe Director 11: User Guide," Month Unknown, 2008, 498 pages, Adobe Systems Incorporated, San Jose, California, USA.

Author Unknown, "Apple Announces Final Cut Pro 4," NAB, Apr. 6, 2003, 3 pages, Apple Inc., Las Vegas, NV, USA.

Author Unknown, "Using Adobe Flash CS4 Professional," Updated Mar. 5, 2009, 474 pages, Adobe Systems Incorporated, San Jose, California, USA.

Author Unknown, "iMovie '08 Getting Started," Month Unknown, 2008, pp. 1-50, Apple Inc., California, USA.

Author Unknown, "Using Adobe Premiere Elements 8 Editor," last updated Aug. 12, 2010, 313 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Brenneis, Lisa, "Final Cut Pro 3 for Macinotsh: Visual QuickPro Guide," Apr. 2002, 288 pages, Peachpit Press, Berkeley, California, USA.

Casares, Juan, et al., "Simplifying Video Editing Using Metadata," Proceedings of Designing Interactive Systems (DIS 2002), Jun. 2002, pp. 157-166, London, Great Britain.

Diakopoulos, Nicholas, et al., "Videotater: An Approach for Pen-Based Digital Video Segmentation and Tagging", UIST'06, Oct. 15-18, 2006, 4 pages, Montreux, Switzerland, available at http://www.deakondesign.com/Documents/tn151-diakopoulos.pdf.

Wang, Yijin, et al. "My Videos—A System for Home Video Management", Proceedings of the 10th ACM International Conference on Multimedia, Dec. 1-6, 2002, pp. 412-413, Juan-les-Pins, France.

U.S. Appl. No. 13/161,468, filed Jun. 15, 2011, Agnoli, Giovanni et al., Non-published commonly owned U.S. Appl. No. 13/161,468.

Portions of prosecution history of U.S. Appl. No. 13/161,468, filed Jul. 27, 2011, Agnoli, Giovanni et al., Portions of prosecution history of commonly owned U.S. Appl. No. 13/161,468, including response(s)/amendment(s) filed Jul. 27, 2011 (4 pages).

* cited by examiner

MEDIA-EDITING APPLICATION WITH AUTOMATIC BACKGROUND RENDERING CAPABILITIES

CLAIM OF BENEFIT TO PRIOR APPLICATIONS

This application is a continuation-in-part application of U.S. patent application Ser. No. 13/111,912, entitled "Data Structures for a Media-Editing Application," filed May 19, 2011. U.S. patent application Ser. No. 13/111,912 claims the benefit of U.S. Provisional Patent Application 61/443,707, entitled "Efficient Media Processing," filed Feb. 16, 2011; U.S. Provisional Patent Application 61/437,517, entitled "Media-Editing Application with Video Segmentation Capabilities and Automatic Back round-Render", filed Jan. 28, 2011; U.S. Provisional Patent Application 61/443,702, entitled "Media-Editing Application with Anchored Timeline", filed Feb. 16, 2011; and U.S. Provisional Patent Application 61/443,704, entitled "Media-Editing Application with Novel Editing Tools", filed Feb. 16, 2011. This application also claims the benefit of U.S. Provisional Patent Application 61/437,517, entitled "Media-Editing Application with Video Segmentation Capabilities and Automatic Background-Render," filed Jan. 28, 2011.

CROSS REFERENCE TO RELATED APPLICATIONS

This application is related to the following application: U.S. patent application Ser. No. 13/161,468, filed Jun. 15, 2011.

BACKGROUND

Digital graphic design, image editing, audio editing, and video editing applications (hereafter collectively referred to as media content editing applications or media-editing applications) provide graphical designers, media artists, and other users with the necessary tools to create a variety of media content. Examples of such applications include Final Cut Pro® and iMovie®, both sold by Apple Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Typically, a user previews portions of a media presentation while creating the presentation in order to see if the media content of the media presentation would be presented as the user desires. However, some portions of the media presentation require a lot of processing capability for a media-editing application to playback in real-time for previewing.

When the required processing capability exceeds that of a system on which the media-editing application is executed, the media-editing application must playback the portions of the presentation in low quality or the application may not playback the portions in real-time. In such cases, the media-editing application pre-processes the portions of the media presentation so that they can be played back in real-time when the user desires to preview them.

By pre-processing, the media-editing application pre-generates playable media output data (e.g., processed composite image frames or audio samples) so that the application uses the pre-generated media output data instead of generating the data at the time the corresponding portions of the media presentation is being previewed. Such pre-generation of playable media output data by processing the portions of the media presentation for real-time playback is termed "rendering."

BRIEF SUMMARY

For a media-editing application that creates a composite media presentation, some embodiments of the invention provide a novel method for reducing rendering operations by dividing the composite presentation into several segments and rendering the segments in a manner that allows for these segments to move with respect to each other without losing the rendered results. The media-editing application of some embodiments includes a composite display area for displaying media clips that are part of the composite media presentation. In some embodiments, the composite display area includes a timeline and one or more tracks that span the timeline for holding one or more media clips.

The media-editing application defines portions of a media presentation as segments. The media-editing applications of different embodiments define the segments differently. For instance, in some embodiments, the media-editing application divides the media presentation into different time periods along the timeline and defines the time periods as segments. In some other embodiments, the media-editing application divides the media presentation not only along the timeline of the presentation but also along other dimensions of the media presentation. For instance, the media-editing application of some embodiments defines different segments for different media clips on different tracks of the media presentation. In some embodiments, the media-editing application also defines different segments for different nodes of a composite graph (e.g., a tree) that it defines to represent the media presentation in terms of a series of linked nodes, with different nodes representing different clips or operations (e.g., different effects) for compositing.

When the media-editing application renders a segment of the media presentation, the application computes an identifier that uniquely identifies the segment and then uses this identifier to store and later retrieve the rendered result for the segment. The application in some embodiments computes the identifier based on a set of attributes of the segment, and stores the results of rendering the segment at a location that is uniquely identifiable in a storage structure by the identifier. When a segment is moved within the composite presentation (e.g., moved along the timeline, moved from one track to another, moved within the composite graph, etc.) without changing its set of attributes, the media-editing application can use the rendered result for the segment without re-rendering the segment. This is because the identifier for this moved segment did not change as its set of attributes did not change, and this identifier can be used to retrieve the rendered results from the storage structure. Similarly, the media-editing application is able to use the same rendered result for any other segment that has the identical attributes, without having to render the other segment.

In some embodiments, the identifier for each segment includes a hash key that is generated from the attributes of the segments. The segment hash key in some embodiments is an MD5 hash key, while it is another type of hash key in other embodiments. Each segment's identifier only includes a hash key in some embodiments. However, in other embodiments, each segment's identifier not only includes a hash key but also a frame offset that identifies the segment's first frame within a storage structure that stores the segment's rendered result.

The frame offset is used in some embodiments to identify a particular segment in a file that stores the rendered results for multiple segments. Specifically, in some embodiments, the rendered results for different segments can be placed in different files or in the same file. When two different segments have different keys, these embodiments store the rendered results for these two segments in two different files. However, these embodiments store in the same file the rendered results for two different segments that share the same key. When two segments share the same key, these embodiments identify for the rendered result of each segment by relying on that segment's frame offset.

During the editing process, a segment that has been rendered might be modified so that its set attributes that define its identifier are changed. At this point, the segment becomes a new segment with a new set of attributes. The application would then have to render the new segment and store the new render results in a location identified by the new segment's identifier. However, in some embodiments, the application would not immediately discard the old rendered results of the old segment. This is because the application might need the old rendered results, e.g., if the new segment receives additional edits that change the new segment back to its original form (i.e., back to the old segment). Accordingly, the application in some embodiments uses certain set of criteria (e.g., least recently used (LRU) criteria) to gradually discard old rendered results from the storage structure. Some embodiments use such a set of criteria to discard rendered results of segments that no longer exist in the media presentation, while other embodiments use the set of criteria to discard any rendered result (e.g., any rendered result that is not needed as much as the other rendered results).

In some embodiments, the media-editing application includes several background-rendering modules. These modules automatically render segments of a media presentation in the background of a system on which the media-editing application is being executed. By performing rendering in the background, the background-rendering modules produce rendered results for the segments. That is, the modules pre-generate playable media output data (e.g., composite video frames or audio samples) of the media presentation without interrupting other operations (e.g., editing operations, etc.) of the media-editing application. As such, the users can continue on interacting with the media presentation using the media-editing application without being interrupted.

The background-rendering modules of some embodiments start performing their background-rendering operations when a certain amount of time elapses after users' last interaction with the media-editing application. The background-rendering operations pause when the users start interacting with the media presentation again. During the rendering of a segment, the background-rendering operations stop automatically when the segment is modified.

The background-rendering modules in some embodiments include a first background-rendering module and a second background-rendering module. The first background-rendering module determines a prioritized order in which the segments are to be rendered. In some embodiments, the first background-rendering module traverses the timeline of a media presentation, or each node of the composite graph that represents the media presentation, in order to group the segments of the media presentation into different categories. These categories in some embodiments are based on a certain subset of attributes of the segments that are used in computing their identifiers. The subset of the attributes includes a type of video that a segment has (e.g., a motion video or a still image), the real-time playability of a segment, the availability of source media files, the user's inputs as to whether a particular segment is to be rendered first, etc. The first background-rendering module prioritizes the categories based on these attributes.

The second background-rendering module renders the segments of each category in the prioritized order that is determined by the first background-rendering module. That is, the second background-rendering module renders the segments in the highest priority category first and moves on to the lower priority categories of segments. The second background-rendering module produces the rendered result for a segment from the data that specify how the media content of the segment of the media presentation should be presented.

In addition to and separate from the first and second background-rendering modules, the media-editing application includes editing modules in some embodiments. The editing modules process a user's activities (e.g., playing back, making edits, etc.) with a media presentation. When playing back the media presentation, the editing modules use the rendered results produced by the second background-rendering module when the rendered results are available for some segments of the presentation.

In some embodiments, the background-rendering modules avoid interrupting the operations of the editing modules by prioritizing the background-rendering modules lower than the editing modules in using computing resources. The computing resources include central processing units (CPU), graphical processing units (GPU), memories such as random access memories (RAM), data storages, etc. By having lower priorities than the editing modules, the background-rendering modules do not take away from the editing modules the computing resources that the editing modules might use. In some embodiments, the background-rendering modules use a set of operating system (OS) services to prioritize themselves lower than the editing modules. Instead of or in conjunction with using OS services, the background-rendering modules of other embodiments use an internal prioritization scheme of the media-editing application in order to prioritize themselves lower than the editing modules.

The background-rendering modules of some embodiments minimize their impact on the editing modules' operations by allowing the editing modules to access a portion of the media presentation simultaneously while the background-rendering modules are accessing the same portion. That is, the background-rendering modules do not block the editing modules from accessing the media project while the background-rendering modules are accessing the media project. In some embodiments, the background-rendering modules allow the simultaneous access by using a readers/writer lock when the background-rendering modules access a portion of the media project. A readers/writer lock allows multiple modules or processes to access the same piece of data simultaneously. In some embodiments, a separate lock is used to control access to the rendered result for a segment.

The background-rendering modules make individual frames in the rendered result for a segment of a media presentation immediately available for the editing modules to use. As soon as a frame is rendered from a segment, the background-rendering modules associate the frame with an identifier for the frame, called frame-level identifier below. As such, when a frame for the segment is generated, the editing modules can immediately identify the frame with the identifier and use the frame.

In some embodiments, the frame-level identifier is similar to the segment identifier. For instance, in some embodiments, both the segment identifier and frame-level identifier are expressed in terms of a key and a frame offset value. In case of the segment identifier, the key is generated from the segment's set of attributes and its offset value identifies the first frame of the segment in a storage structure that stores the segment's rendered result. In case of the frame-level identifier of a frame, the key is generated from the set of attributes of that frame's segment, and its offset identifies the frame within a storage structure that stores the segment's rendered result.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
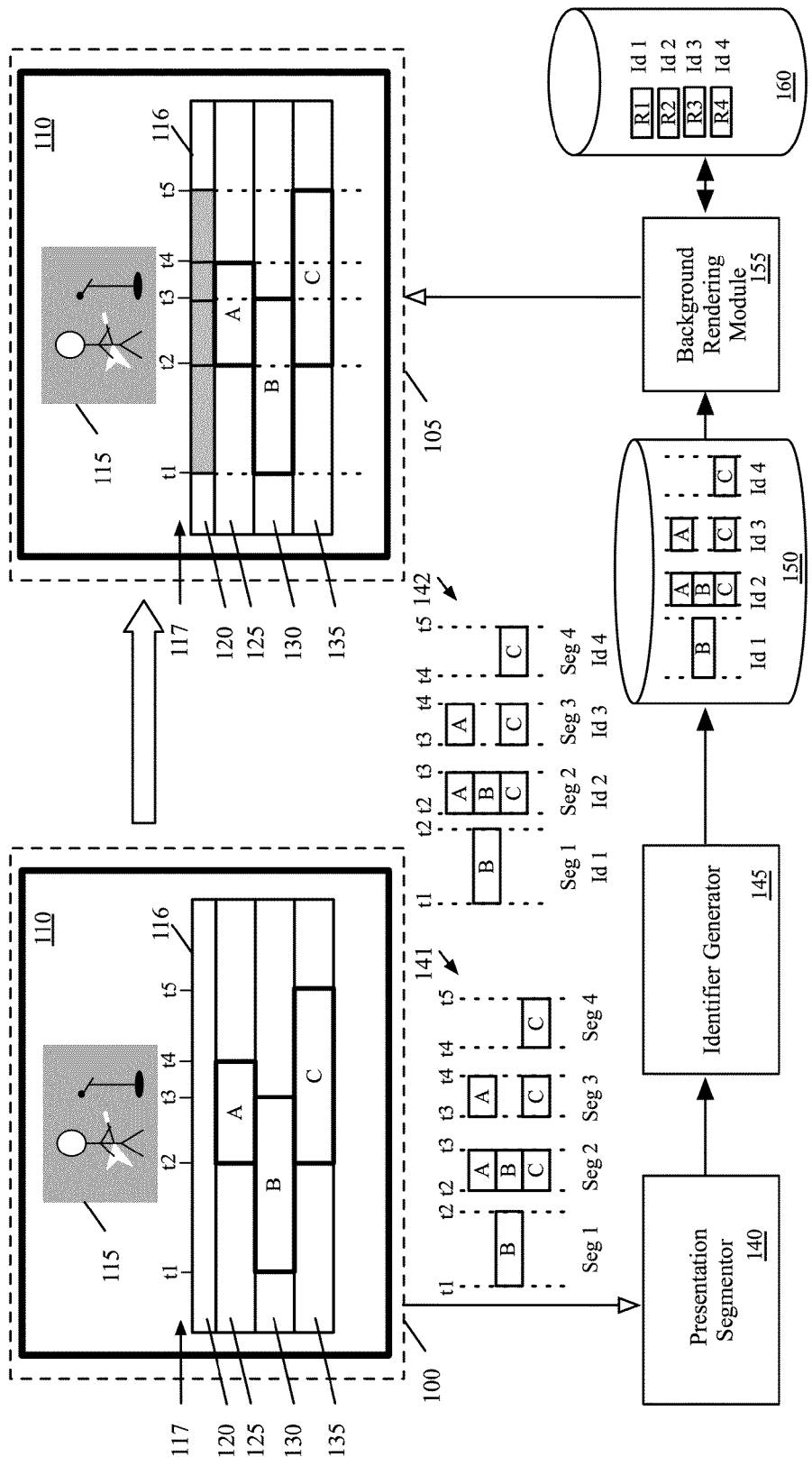
FIG. 1 conceptually illustrates segmenting a media presentation along the timeline of the presentation and generating identifiers for the rendered results.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media-editing application that creates a composite media presentation, some embodiments of the invention provide a novel method for reducing rendering operations by dividing the composite presentation into several segments and rendering the segments in a manner that allows for these segments to move with respect to each other without losing the rendered results. The media-editing application of some embodiments includes a composite display area for displaying media clips that are part of the composite media presentation. In some embodiments, the composite display area includes a timeline and one or more tracks that span the timeline for holding one or more media clips.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a composed media clip or a media clip sequence), a text clip, a text overlay, a still image or picture, or any other type of media clip that can be used to create a composite presentation. In this application, a media clip may also refer to the graphical representation of the media clip in the GUI of a media-editing application of some embodiments.

Media content that has a temporal component (e.g., audio media clips, video media clips, audio and video media clips, etc.) is further defined by an in-point and an out-point with respect to a source media file in some embodiments. In some such embodiments, the source media file is stored on the computing device on which the media-editing application executes or on a computing device to which the media-editing application has access. A media clip's in- and out-points define its start and end points with respect to the source media file.

The in- and out-points of a media clip can be defined as such to cover an entire source media file or a portion of the source media file in some embodiments. Several media clips can define different in- and out-points with respect to the same source media file such that each media clip has a different media content. For instance, the in- and out-points of a media clip can be defined to be the first half of a source media file while the in and out points of another media clip can be defined to be the second half of the same source media file.

The media-editing application defines portions of a media presentation as segments. The media-editing applications of different embodiments define the segments differently. For instance, in some embodiments, the media-editing application divides the media presentation into different time periods along the timeline and defines the time periods as segments. In some other embodiments, the media-editing application divides the media presentation not only along the timeline of the presentation but also along other dimensions of the media presentation. For instance, the media-editing application of some embodiments defines different segments for different media clips on different tracks of the media presentation. In some embodiments, the media-editing application also defines different segments for different nodes of a composite graph (e.g., a tree) that it defines to represent the media presentation in terms of a series of linked nodes, with different nodes representing different clips or operations (e.g., different effects) for compositing.

When the media-editing application renders a segment of the media presentation, the application computes an identifier that uniquely identifies the segment and then uses this identifier to store and later retrieve the rendered result for the segment. The application in some embodiments computes the identifier based on a set of attributes of the segment, and stores the results of rendering the segment at a location that is uniquely identifiable in a storage structure by the identifier. When a segment is moved within the composite presentation (e.g., moved along the timeline, moved from one track to another, moved within the composite graph, etc.) without changing its set of attributes, the media-editing application can use the rendered result for the segment without re-rendering the segment. This is because the identifier for this moved segment did not change as its set of attributes did not change, and this identifier can be used to retrieve the rendered results from the storage structure. Similarly, the media-editing application is able to use the same rendered result for any other segment that has the identical attributes, without having to render the other segment.

FIG. 1 conceptually illustrates a graphical user interface (GUI) 110 of a media-editing application with modules 140, 145, and 155 that divide a portion of a media presentation along the timeline of the presentation into segments and render the segments in the background. Specifically, this figure illustrates the GUI 110 at two different stages 100 and 105 to show that the portion of the media presentation is divided into four segments and an identifier is generated for each segment. This figure also illustrates a presentation segmentor 140, an identifier generator 145, a data repository 150, a background-rendering module 155, and a rendered results repository 160. In addition, this figure illustrates a segmentation result 141 and an identifier generation result 142.

As shown, the GUI 110 of a media-editing application includes a preview display area 115 and a composite display area 116. The preview display area 115 displays a preview of a composite presentation that the application creates by compositing several media clips. In some embodiments, the composite display area 116 specifies a description of a composite presentation (also referred to as a "composite media presentation" or a "composite representation"). The portion of the composite media presentation displayed in the display area 116 includes media clips A, B, and C.

The composite display area 116 includes a timeline 117, a render status bar 120, and tracks 125-135. The timeline 117 is a user interface item that shows the time codes of the media presentation. The render status bar 120 indicates different render statuses of different time periods with different colors. The tracks 125-135 represent video and audio tracks of the media presentation. The tracks span the timeline and display a graphical representation of the composite presentation by displaying media clips (or sequences) that form the composite presentation. In some embodiments, the media clips in different tracks represent different layers of media content of the composite presentation. For instance, from time t2 to time t4, the content of the media clip A overlays the media content of the media clip B. In the same time period, the content of media clips A and B overlay the media content of media clip C.

A presentation segmentor 140 of the media-editing application traverses the timeline of the media presentation and divides the media presentation into segments along the timeline of the media presentation. In some embodiments, the segmentor 140 defines each segment based on edit points of the media presentation (e.g., in- and out-points of media clips in different tracks, the starts and ends of the applied effects, etc.). For instance, the segmentor 140 divides the portion of the media presentation into four different segments (seg 1-seg 4) based on the in- and out-points of the media clips A-C. As shown by the segmentation result 141, segment 1 spans from time t1 to time t2, which are the in-point of the media clip B and the in-point of the media clip A (or C), respectively. Segment 2 spans along the timeline 117 from time t2 to time t3 which are the in-point of the media clip A (or C) and the out-point of media clip B, respectively. Segment 3 spans from time t3 to time t4, which are the out-point of media clip B and the out-point of the media clip A, respectively. Segment 4 spans from time t4 to time t5, which are the out-point of the media clip A and the out-point of the media clip C, respectively.

Segments begin and end at the edit points of the media presentation in some embodiments because the edit points are usually where different media contents begin and end in a media presentation. For instance, segment 1 includes a portion of media content only from media clip B while segment 2 includes portions of media content from the media clips A, B, and C.

An identifier generator 145 generates a unique identifier for each segment of the media presentation. As shown by the identifier generation result 142, a generated identifier is associated with the rendered result for each segment. In some embodiments, the identifier generator 145 generates an identifier for each segment based on a set of attributes of the segment. There are numerous attributes of a segment that could be used to compute an identifier for the segment. Some such attributes include the number of media clips included in the segment, the identification of the track that each media clip in the segment spans, the identifications of the media clips in the segment, the target frame rate for the rendered result, the types of effects applied to the segment, etc. Any edits that change any attributes in the set necessitate re-rendering of the segment because the media content specified in the segment will change when these attributes in the set change. The segments of the media presentation and the identifiers for the segments are stored in a data repository 150.

In some embodiments, the identifier generator 145 uses a set of attributes of the segment as inputs to a hash function and uses the output of the hash function as the identifier for the rendered result for the segment. Generating an identifier for a segment based on a set of attributes of the segment will be described further below.

A background-rendering module 155 renders each segment of the media presentation. Rendering a segment is a process of combining the media contents (e.g., video contents) represented by the media clips in the segment with the effects, such as transitions or filters that are applied to the media clips, one frame at a time. The result of rendering a segment includes a set of displayable frames that shows the combined media content of that segment. In some embodiments, each frame is in a form of compressed or uncompressed data that represents pixel values of the pixels in that frame. The rendered result is stored in a storage structure such as a data file. Examples of data files that store rendered results for segments include .mov, .wmv, .mpg, etc. files. Such a file that stores the rendered result for a segment is referred to as a render file.

The background-rendering module 155 retrieves the data that specify the combined media content for each segment which needs rendering and produces the rendered results. The module 155 stores the rendered results in the rendered results repository 160, which is a cache or other persistent storage in some embodiments. The background-rendering module performs its rendering operations in the background of the system on which the media-editing application is executed. Background-rendering modules and their operations are described in detail further below. The background-rendering module 155 associates the rendered results for the segments with the identifiers generated for those segments.

The operation of the GUI 110 and the modules 140-155 will now be described. At the first stage 100, a portion of a media presentation is displayed in the composite display area 116 of the GUI 110. This portion of the media presentation includes three media clips A-C that span the timeline of the presentation from time t1 to time t5. The media clip A spans the track 125 from time t2 to time t4. The media clip B spans the track 130 from time t1 to time t3. The media clip C spans the track 135 from time t2 to time t5. The render status bar is drawn in white in some embodiments to indicate that this portion of the presentation has not been rendered yet.

The presentation segmentor 140 traverses the timeline 117 chronologically to divide this portion of the media presentation into segments. The presentation segmentor 140 uses the first in- or out-point it finds in the three tracks 125-135 as the start of the first segment. The next in- or out-point it finds is used as the end of the first segment and as the start of the next segment. In this manner, the presentation segmentor 140 divides the portion of the presentation into segments 1-4.

The identifier generator 145 then goes through each segment of the media presentation and generates an identifier for each segment. The identifier generator 145 generates an identifier 1 (denoted by Id 1 in this figure) for segment 1 using the track identification of the track that the segment B spans, the duration of a portion of the media clip B that is within the segment 1, the number of media clips in the segment 1, etc. Similarly, the identifier generator 145 generates identifiers 2-4 for the segments 2-4. Each generated identifier is different than the others because a set of attributes that are used to compute the identifier is different for each segment.

The background-rendering module 155 then produces the rendered result for each segment from the data that represent the segment in the media presentation. The rendered results for the segments are then stored in the repository 160. As shown, four rendered results R1-R4 are store in the repository 160. The media-editing application checks the existence of particular rendered result for a particular segment of the media presentation and draws the corresponding portion of the render bar 120 accordingly. All four segments are rendered and the rendered results for the four segments are stored in the repository 160. As shown, the rendered result for each segment is associated with an identifier.

At the stage 105, the rendered bar 120 is drawn in gray for each segment. In some embodiments, drawing the rendered bar in gray indicates that the portion of the media presentation displayed in the composite display area 116 is rendered.

Figure 2:
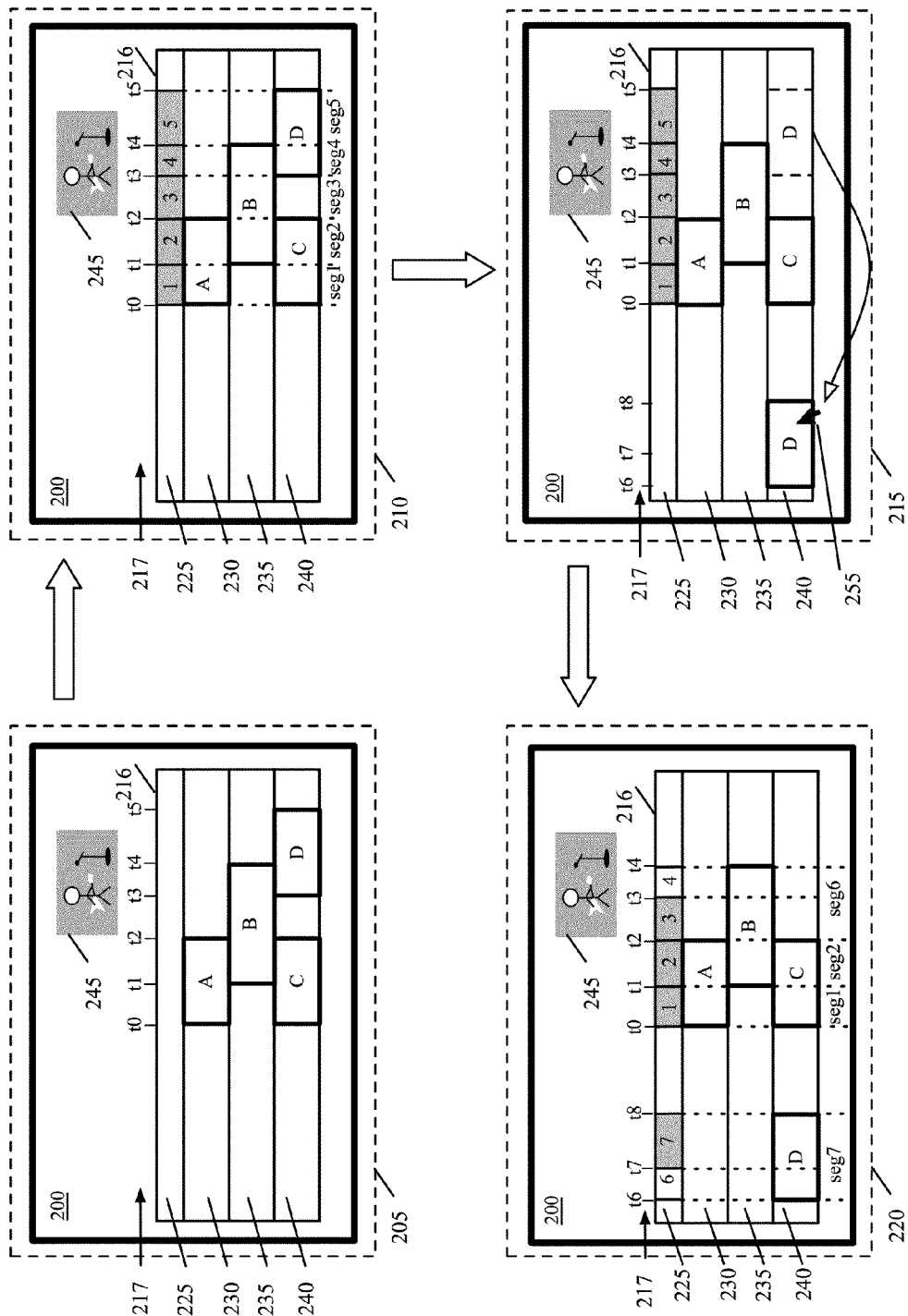
FIG. 2 illustrates an example GUI at several stages that show reusing rendered frames after segments in a media presentation receive certain edits.

FIG. 2 illustrates a GUI 200 of a media-editing application that reuses the rendered results for the segments of a media presentation. Specifically, this figure illustrates the GUI 200 at four different stages 205, 210, 215, and 220 to show that the application avoids re-rendering portions of segments when the segments receive a certain edit.

As shown, the GUI 200 includes a preview display area 245 and a composite display area 216. The display area 216 includes a timeline 217, a render status bar 225, and tracks 230-240. The GUI 200 is similar to the GUI 100 described above by reference to FIG. 1. In addition, this figure illustrates a cursor 255 for providing feedback to a user and operating various selection buttons and other controls included in the GUI 200. The cursor 255 also allows a user to select or manipulate various objects (e.g., representations of media content) that are included in the GUI 200.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

At stage 205, a portion of the media presentation is displayed in the GUI 200. Four media clips A-D are composited to make up the portion of the media presentation. The render status bar 225 is drawn in white to indicate in some embodiments that the portion of the media presentation has not been rendered. As shown, media clip A spans the track 230 from time t0 to time t2. Media clip B spans the track 235 from time t1 to time t4. Media clip C spans the track 240 from time t0 to time t2. Media clip D spans the track 240 from time t3 to time t5.

At stage 210, the portion of the media presentation is divided into five different segments (seg 1-seg 5). The five segments have been rendered. The rendered results for these segments are associated with the unique identifiers. The corresponding time periods 1-5 in the render status bar 225 are drawn in gray to indicate that the segments have been rendered. As shown, the segments 1-5 span the timeline and the starts and the ends of the segments 1-5 are defined by the in- and out-points of the media clips A, B, C, and D.

Segment 1 occupies time period 1 that spans the timeline from time t0 to time t1, which are the in-point of media clip A (or C) and the in-point of media clip B, respectively. Segment 1 includes the composited media content of the media clips A and C. segment 2 occupies the period 2 that spans the timeline from time t1 to time t2. Segment 2 includes the composited media content of media clips A, B, and C. Segment 3 occupies time period 3 that spans from time t2 to time t3. Segment 3 includes media content from the media clip B only. Segment 4 occupies time period 4 that spans from time t3 to time t4. Segment 4 includes the composited media content of the media clips B and D. Segment 5 occupies time period 5 that spans from time t4 and t5. Segment 5 includes media content from the media clip D only.

At stage 215, the portion of the media presentation receives an edit. The edit, as illustrated in stage 215, causes the media clip D to move from the location between times t3 and t5 to a new location between times t6 and t8 in track 240. The user has dragged the media clip D from the previous location and dropped it at the new location. As shown, the media clip D now occupies a time period that spans from time t6 to time t8 in the track 240. The render status bar 225 has not been re-drawn and still shows the render status of the previous stage.

At stage 220, the portion of the media presentation displayed in the GUI 200 has been divided into different segments according to the edit that the portion has received. The segments 1 and 2 still occupies the time periods 1 and 2, respectively. A new segment 6 occupies the time periods 3 and 4 because the in-point of the media clip D that had defined the end of the segment 3 and the start of the segment 4 has been moved to another location in the track 240. The out-point of the media clip B at time t4 now defines the end of the segment 6 as shown. The segments 3, 4 and 5 are now no longer part of the media presentation. In some embodiments, the segment 3 may be extended to span the time periods 3 and 4 instead of creating the new segment 6. A new segment 7 occupies the time periods 6 and 7 which span the timeline from time t6 to time t8.

The render status bar has been redrawn to reflect the render status before the portion of the media presentation is rendered according to the received edit. As shown, the render status bar indicates that the time periods 1 and 2 are already rendered. This is because the attributes in the sets of attributes of the segments 1 and 2 that occupy the time periods 1 and 2 have not been modified by the received edit. The rendered results for the segments 1 and 2 are located with the identifiers that identify these rendered results.

The time period 3 that spans from time t2 to time t3 is deemed rendered because the attributes in the sets of attributes of a portion of the segment 6 (i.e., the segment 3) that occupies the time period 3 have not been changed by the received edit. That is, this portion of the segment 6 that spans from time t2 to time t3 originally included media content from media clip B only and the movement of the media clip D did not affect a set of attributes of this portion of the segment 6. Therefore, the rendered result for this portion of the segment 6 is located by the identifier for the segment 3 which used to span from the time t2 to time t3. However, the portion of the segment 6 that now occupies the time period 4 has been changed in a way that necessitates re-rendering of the portion. That is, the time period 4 of the media presentation now includes the media content of a portion of the media clip B only and not the media content of a portion of media clip D due to the movement of the media clip D. Thus, the rendered result for the segment 4 cannot be used for the time period 4 and will not be identified by the identifier that will identify the rendered result for the segment 6.

The time period 6 is deemed not rendered because the portion of the media clip D that now occupies the time period 6 has not been previously rendered. This portion of the media clip D used to occupy the time period 4 at the stage 210. However, the rendered result for the time period 4 at stage 210 included the media content from the media clips B and D, not the media content from the clip D alone. On the other hand, the time period 7 is deemed rendered because the portion of the media clip D that now occupies the time period 7 has been rendered before at stage 210. This portion of the media clip D occupied the time period 5 at stage 210 which included media content from the media clip D alone.

As shown at stage 220, segments 6 and 7 are deemed partially rendered. This partial rendering status is possible when a portion of a segment can be identified with frame-level identifiers. Assigning frame-level identifiers to a portion of a segment will be described further below by reference to FIG. 18.

Figure 4:
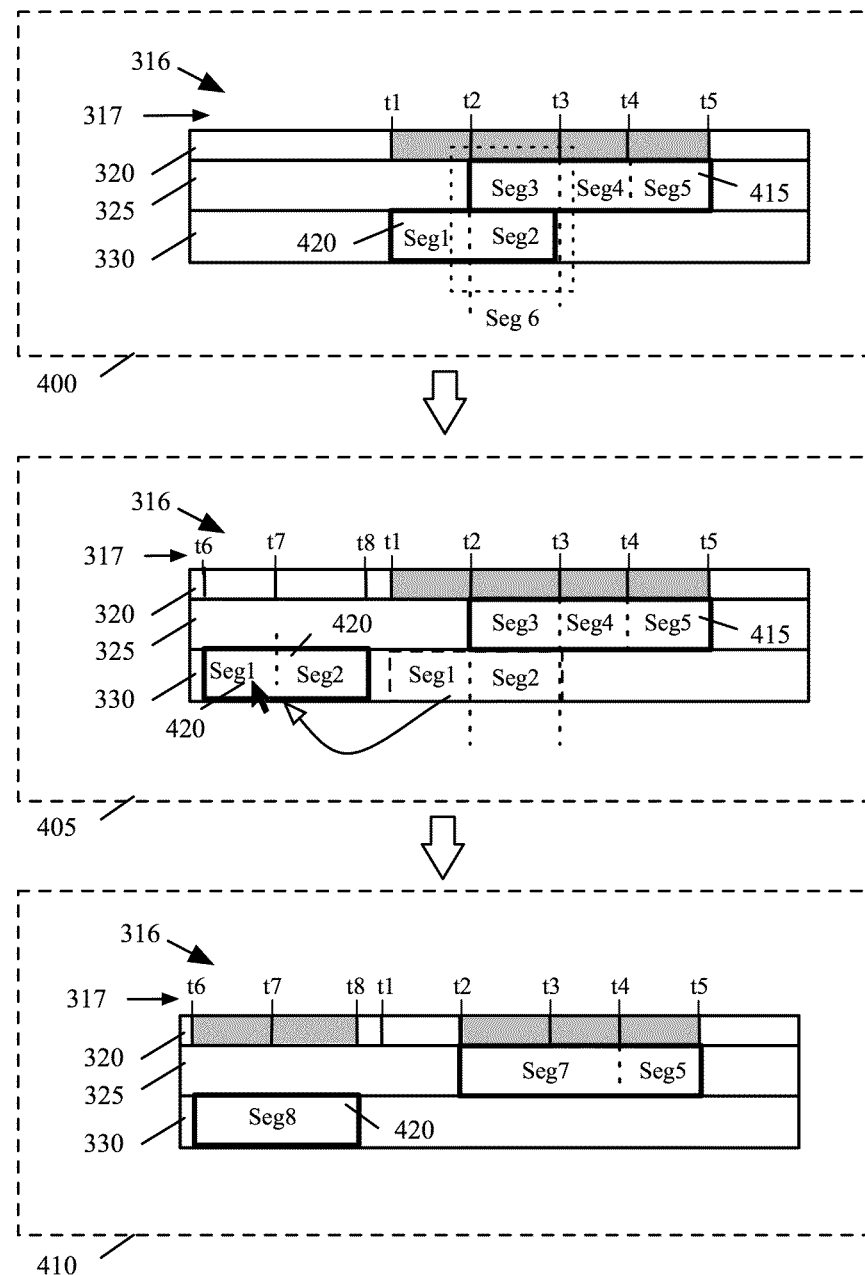
FIG. 4 illustrates an example GUI at several stages that show reusing rendered frames after segments in a media presentation receive certain edits.
Figure 5:
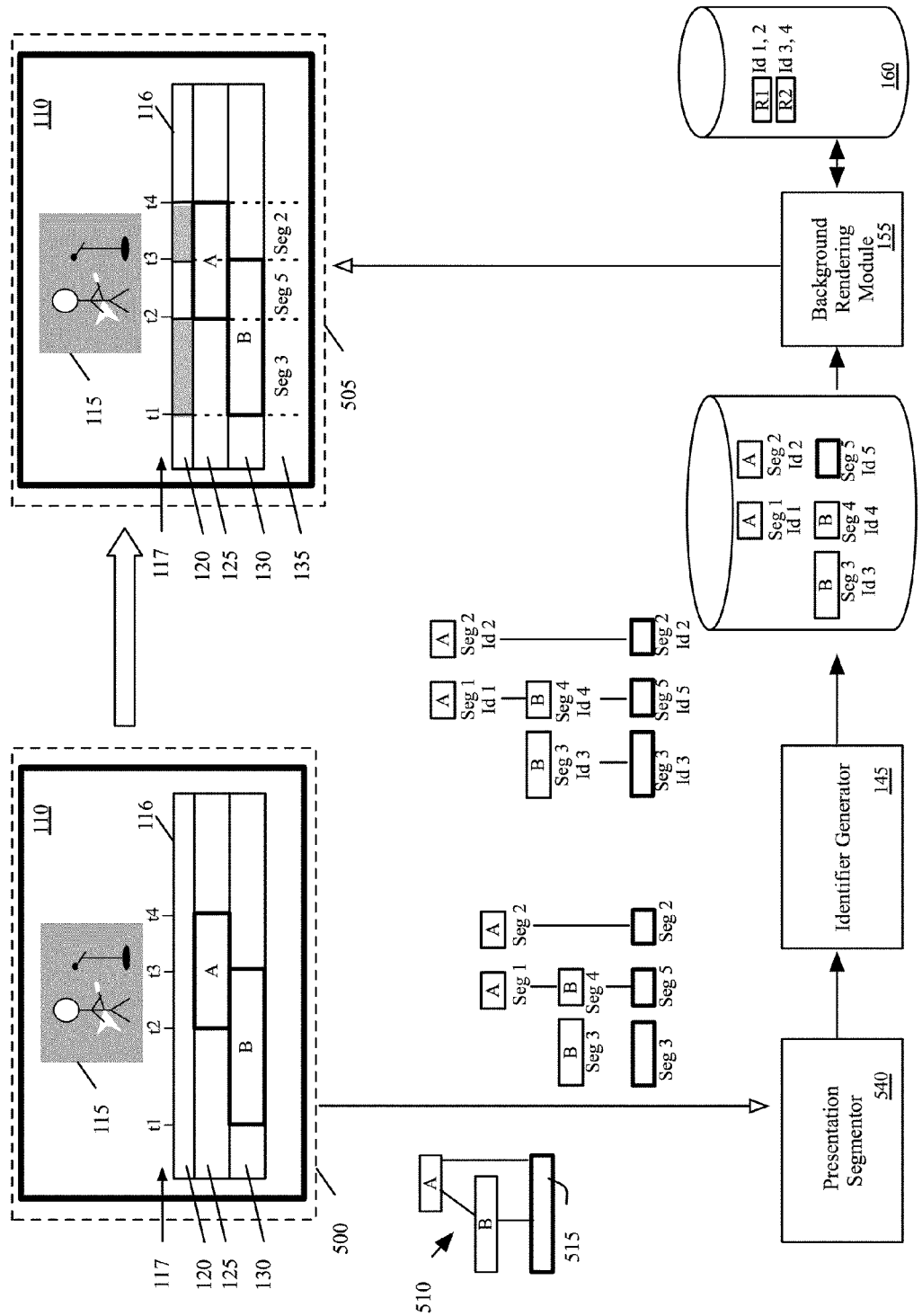
FIG. 5 illustrates segmenting a media presentation and selectively rendering the segments.

The media-editing application of some embodiments segments a media presentation along a single dimension such as the timeline as illustrated in FIG. 1. Unlike the media-editing application illustrated in FIG. 1, the media-editing of some other embodiments do not segment the media presentation in only one dimension. The media-editing applications that segment along two or more dimensions are illustrated in FIGS. 3, 4, and 5.

Figure 3:
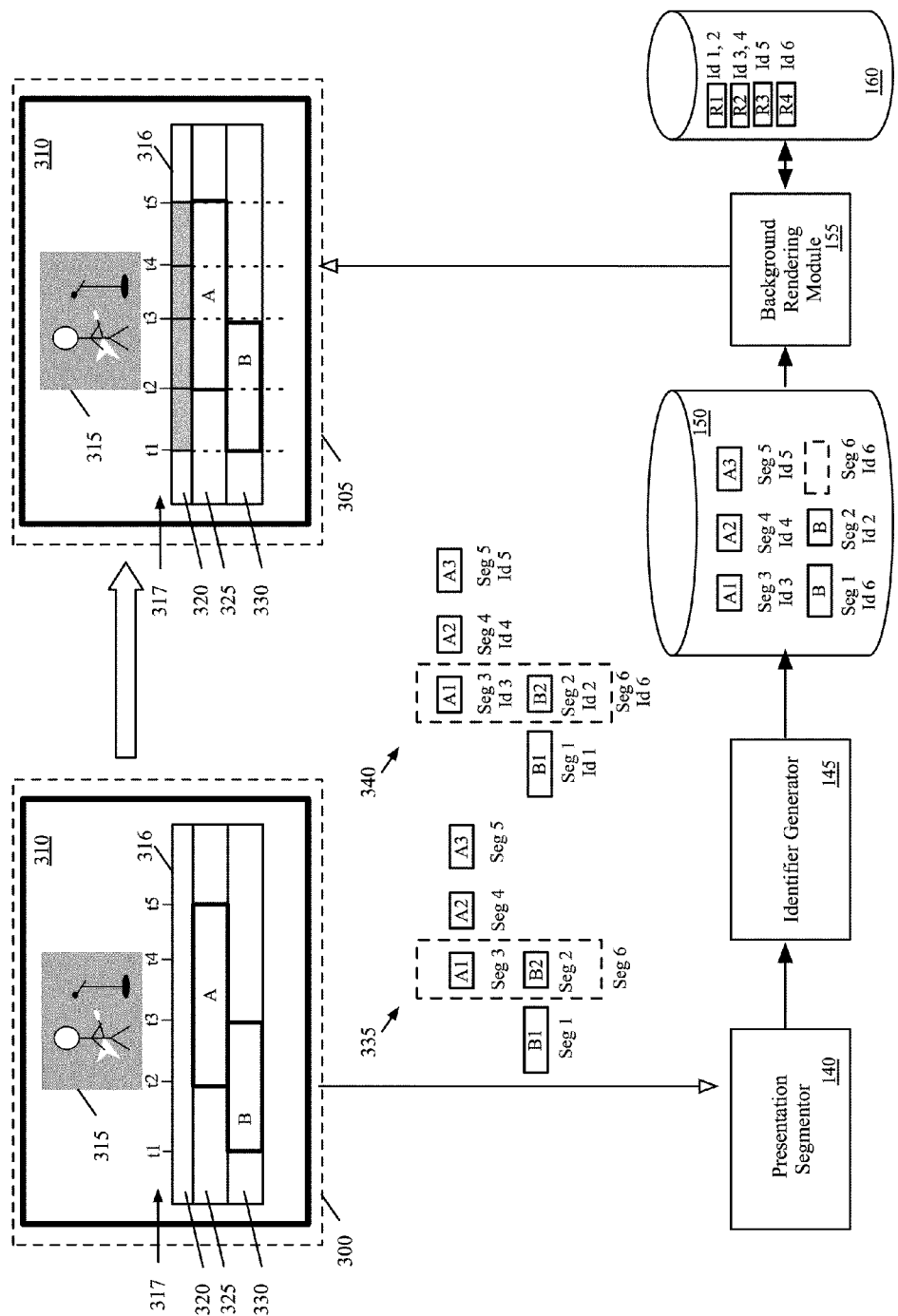
FIG. 3 illustrates segmenting individual media clips in a media presentation and generating identifiers for the rendered results.

FIG. 3 conceptually illustrates the GUI 310 of a media-editing application that divides a portion of a media presentation into segments. Specifically, this figure shows that a portion of the media presentation is not only divided along the timeline of the presentation but it is segmented along the media clips that make up the presentation. That is, the media-editing application of some embodiments divides some of the individual media clips (e.g., composed media clips) in the media presentation into several segments.

FIG. 3 illustrates the presentation segmentor 140, the identifier generator 145, the data repository 150, the background-rendering module 155, and the rendered results repository 160 described above by reference to FIG. 1. In addition, this figure illustrates a segmentation result 335 and an identifier generation result 340.

In some embodiments, the presentation segmentor 140 divides a single media clip in a media presentation into multiple segments. Examples for such single media clips that the segmentor 140 divides into multiple segments include media clips, media clips that are imported from another media-editing application, and other media clips such as composite media clips. As described above, a composed media clip in some embodiments is a sequence of composited media clips. In some embodiments, a composed media clip may appear like another media clip in the composite display area 316. That is, the graphical representation of a composed media clip displayed in the composite display area 316 may not show the lines demarcating the different media clips in the composed media clip. In some embodiment, a media clip that is contained in a composed media clip is itself a composed media clip. The segmentor 140 of some embodiments divides a composed media clip into multiple segments based on the boundaries (i.e., in- and out-points) of the media clips within the composed media clip.

In some embodiments, a single media clip that is imported into a media-editing application from another media-editing application contains multiple media clips. The information about the composition of such single media clip can be obtained by invoking the application-programming interface (API) calls. Such API calls can be obtained from the same media-editing application that the single media clip is imported. For instance, the segmentor 140 obtains the in- and out-points of the media clips that are included in the imported single media clip by invoking an appropriate API call. The segmentor 140 of some embodiments divides an imported media clip based on the boundaries of the media clips within the imported media clip.

Other single media clips that are divisible may include media clips that contain scene changes. Different techniques to detect scene changes in a media clip are known in the art. Using one of those techniques, the segmentor 140 of some embodiments divides a media clip into multiple segments at the frames in the media clip where scene changes are detected.

As described above, the identifier generator 145 generates an identifier for each segment of the media presentation. Each of these identifiers uniquely identifies the location of the rendered result in storage such as the rendered results repository 160. For instance, in those embodiments that store the rendered results as render files, the identifier for a segment identifies a render file that contains the rendered result for that segment. As such, two different identifiers for segments may identify two different render files.

In some cases, two different identifiers may identify two different locations within a render file for two different segments. Such cases may occur, for example, when two different segments are defined within a single media clip as described above. In these cases, the media-editing application of some embodiments defines an identifier that identifies the rendered result within a render file as a combination of a key and an offset. The key uniquely identifies the render file and the offset identifies the rendered result within the render file. Thus, when two different identifiers for two different segments identify two different locations within a render file, the two identifiers share the same key but have different offsets.

In some embodiments, a key that identifies a render file is generated by the identifier generator 145 based on a set of attributes of the segment of which the rendered result is stored in the render file. Some attributes in the set include the number of media clips included in the segment, the identification of the track that each media clip in the segment spans, the identifications of the media clips in the segment, the target frame rate for the rendered result, the types of effects applied to the segment, etc.

The identifier generator 145 combines the generated key with an offset in some embodiments. The offset for the rendered result within a render file is a value that identifies the first frame of the rendered result in the render file. For instance, when there are hundred frames in a render file, the first frame of the rendered result, which includes the last thirty frames within the render file, will be the seventy-first frame of the render file. The value that is associated with the seventy-first frame is the offset for the rendered result in some embodiments. As such, a combination of a key that identifies a render file and an offset that identifies the rendered result within the render file makes it possible to find the rendered result stored in storage. Generating and combining keys and offsets that identify the location of the rendered result will be described in more details further below by reference to FIGS. 12 and 13.

The operation of the modules 140, 145, and 155 will now be described by reference to FIG. 3. At stage 300, a portion of a media presentation is displayed in the composite display area 316 of the GUI 310. This portion of the media presentation includes two media clips A and B that span the timeline of the presentation from time t1 to time t5. The media clip A spans the track 325 from time t2 to time t5. The media clip B spans the track 330 from time t1 to time t3. The media clip A is a composed media clip that is a sequence of two media clips. The two media clips are bordering at time t4 but the line that would demarcate these two media clips within the media clip A does not appear in the graphical representation in the composite display area 316. The render status bar 320 is drawn in white in some embodiments to indicate that this portion of the presentation has not been rendered yet.

The presentation segmentor 140 divides each of the two media clips A and B into segments. As shown by the segmentation result 335, the segmentor divides the media clip B into segments 1 and 2 (denoted by seg 1 and seg 2 in this figure) because the in-point of the media clip A at time t2 falls in the time period occupied by the media clip B. The segmentor 140 divides the media clip A into three segments 3-5. The segmentor divides the clip A at the out-point of the media clip B (i.e., at time t3) and the border between the two media clips in the media clip A (i.e., at time t4). As shown by the segmentation result 335, the first of the two media clips within the media clip A is divided into two sub-clips A1 and A2 and the second of the two media clips is media clip A3.

The presentation segmentor 140 also defines segment 6. The media content of segment 6 is a composite of the media contents of segments 2 and 3. That is, segment 6 is a segment of the media presentation resulted from dividing the composite media presentation along the timeline only.

The identifier generator 145 then generates an identifier for each segment defined by the presentation segmentor 140 based on a set of attributes of the segment. As shown by the identifier generation result 340, each of the segments 1-6 has a unique identifier. The identifiers 1 and 2 (denoted by Id 1 and 2 in this figure) are different and each of the identifiers 1 and 2 identifies a rendered result for its respective segment. In some cases, each of the identifiers 1 and 2 is a combination of a key and an offset. In such cases, the identifiers 1 and 2 shares the same key because these two segments are divided from the same media clip B and thus have the same set of attributes that is used to compute a key. That is, segments 1 and 2 have the same number of media clips, the same identification of the track that each media clip in each segment spans, the same identification of the media clips in each segment, etc. Similarly, the identifier generator 145 generates the same key for the identifiers 3 and 4 for the segments 3 and 4, which are divided from the first media clip within the media clip A. The identifier generator stores the defined segments and the identifiers associated with the segments in the storage 150.

The background-rendering module 155 then renders segments 1-6. The rendered results for the segments are then stored in the repository 160 with their associated identifiers. As described above, the rendered results are stored as render files in some embodiments and the background-rendering module 155 associates the render file for each segment with the identifier generated for that segment. As shown, there are four render files R1-R4 stored in the repository 160. For the segments that have the same keys in their identifiers, the rendered results are stored in a single render file in some embodiments. The rendered result for each of these segments is identified with offsets. The offsets and a method of identifying the rendered results for different segments in a render file using the offsets will be described further below by reference to FIGS. 12 and 13.

FIG. 4 illustrates a composite display area 316 of a media-editing application that reuses the rendered results for the segments of a media presentation. Specifically, this figure illustrates the composite display area 316 at three different stages 400, 405, and 410 to show that the application avoids re-rendering portions of segments when the segments receive a certain edit.

At stage 400, a portion of the media presentation is displayed in the composite display area 316. This portion is the same portion of the media presentation illustrated in FIG. 3 above. That is, media clips 415 and 420 are the media clips A and B, respectively, that are described above by reference to FIG. 3. At the stage 400, the segments 1-6 are already rendered. The render status bar 320 is drawn in gray to indicate that the segments 1, 6, 4 and 5, which are the segments divided along the timeline of the media presentation, are rendered.

At stage 405, the portion of the media presentation receives an edit. The user has dragged the media clip 420 from its previous location and dropped the media clip at a different location in track 330. As shown, the media clip 420 is now occupying a time period that spans from time t6 to time t8 in the track 330. The render status bar 320 has not been re-drawn and still shows the render status of the previous stage. As a result of receiving this edit, segment 1 now occupies the time period from time t6 to time t7. Subsequently, segment 2 occupies the time period from time t7 to time t8 of the media presentation.

At stage 410, the portion of the media presentation is segmented according to the received edit. Because no in- or out-points fall in the time period occupied by the media clip 420, the media clip 420 in some embodiments is segmented into a single segment (i.e., segment 8). An identifier that will be generated for segment 8 shares the same key with the identifiers generated for the segments 1 and 2 because segments 1, 2, and 8 are divided from the same media clip (i.e., the media clip 420).

The out-point of the media clip 420 that used to be at time t3 and was used to divide the media clip 415 is moved away from time t3. As such, segment 415, which is a composed clip containing two media clips as described above, is divided into two segments (i.e., segments 7 and 5) at the border between the two segments (i.e., divided at time t4). An identifier that will be generated for the segment 7 shares the same key with the identifiers generated for the segments 3 and 4 because the segments 3, 4, and 7 are divided from the same media clip (i.e., the first media clip within the media clip A).

The render status bar has been redrawn to reflect the render status of the portion of media presentation. As shown, the render status bar indicates that the time period from time t6 to time t8 is rendered because segment 8 already has a render file that contains the rendered results for the segments 1 and 2. The rendered results for the segments 1 and 2 are identified by the key and the offsets in the identifier for the segment 8. Likewise, the time period from time t2 to time t4 is also shown rendered because segment 7 has a render file that contains the rendered results for the segments 3 and 4. The time period from time t4 to time t5 remain rendered as there was no change with regards to the segment 5 which already has a render file. As such, none of the segments 5, 7, or 8 has to be re-rendered. The time period from time t1 to time t2 is shown not rendered because there is no media content to render in this time period of the media presentation.

The media editing application of some embodiments that uses only the timeline to segment a media presentation performs background-rendering differently. For instance, in some embodiments, when a segment, which is created only along the timeline, includes portions of two or more media clips, the media-editing application defines these portions of the media clips as additional segments. That is, each of the portions of the different media clips included in the segment can be defined as a segment, too. These additional segments are also identified by unique identifiers so that if a background-rendering module determines to render these additional segments before rendering the segment that includes these additional segments, the module can do so.

FIG. 5 conceptually illustrates the GUI 110 of a media-editing application that divides a portion of a media presentation into segments. Specifically, this figure shows that each media clip in the portion of the media presentation can be divided into multiple segments in addition to the segments that are divided from the portion of the media presentation along the timeline. FIG. 5 illustrates the presentation segmentor 140, the identifier generator 145, the data repository 150, the background-rendering module 155, and the rendered results repository 160 described above by reference to FIG. 1. In addition, FIG. 5 illustrates a composite graph 510.

The composite graph 510 represents a portion of a media presentation that consists of the media clips A and B. In some embodiments, a composite graph is a hierarchical tree structure that links a set of nodes. Each of the nodes represents a media clip or an effect that is applied to a media clip. For instance, the nodes A and B of the graph 510 represent the media clips A and B, respectively. Having node A on top and node B below it, the composite graph 510 indicates that the media content of the media clip A overlays the media content of the media clip B. The root node 515, depicted as a rectangle with thick borderlines in this figure, represents the composite media content of the media presentation.

In some embodiments, the presentation segmentor 140 divides a media presentation into segments based on a composite graph. The segmentor 140 first divides the root node of the composite graph that represents the media presentation based on in- and out-points of the media clips and starts and ends of the effects in the media presentation. Each divided portion of the root node represents a portion of the media presentation along the timeline. Other non-root nodes of the composite graph are divided into different pieces according to the divisions of the root node. For instance, the presentation segmentor 140 divides the root node 515 of the graph 510 into three different segments based on the boundaries (i.e., in- and out-points) of the media clips A and B. Each divided piece of the node is defined as a segment by the segmentor. For example, node A is divided into segments 1 and 2. Node B is divided into segments 3 and 4.

As described above, the render status bar 120 indicates different render statuses of different time periods with different colors. Thus, in some embodiments, the render status bar 120 can only indicate the render status of the segments that are divided from the root node of a composite graph. That is, the render status bar indicates the statuses of portions of the composite media presentation and not the render statuses of individual media clips in different tracks.

The identifier generator 145 then goes through each segment of the media presentation and generates an identifier for each segment. As described above, the identifier generator 145 generates an identifier for each segment. In some embodiments, the identifier generator 145 generates an identifier for a segment using the identifiers for the segments that are composited into the segment. For instance, the identifiers 1 and 4 for the segments 1 and 4 are used as attributes to compute an identifier for segment 5 (i.e., identifier 5).

The background-rendering module 155 renders the segments defined by the segmentor 540. As will be described further below, a background-rendering module of some embodiments chooses which segments to render first. For instance, the background-rendering module 155 may choose to render the segments divided from the media clips represented by the non-root nodes first. Also, in some embodiments, a rendered result for a first segment can be used for rendering a second segment when the second segment includes the first segment.

The operation of the modules 140, 145, and 155 will now be described. At the stage 100, the composite display area 116 displays a portion of media presentation that spans from time t1 to time t4. The portion of the media presentation includes media clips A and B. This portion of the media presentation has not been rendered yet. The media clip A spans the track 125 from time t2 to time t4. The media clip B spans the track 130 from time t1 to time t3.

The presentation segmentor 140 divides the nodes of the composite graph 510 based on the boundaries of the media clips. First, the root node 515 is divided into three different segments 3, 5, and 2. That is, the segmentor 140 divides this portion of the media presentation into segments along the timeline. The presentation segmentor 140 uses the first in- or out-point it finds along the timeline of the presentation as the start of the first segment. The next in- or out-point it finds is used as the end of the first segment and as the start of the next segment. In this manner, the presentation segmentor 140 divides the root node into segments 3, 5, and 2.

The presentation segmentor 140 divides other non-root nodes of a composite graph into segments as well. The presentation segmentor 140 divides nodes A and B based on the in- and out-points of the media clips that are represented by the nodes. For instance, the segmentor 140 divides the node A into two segments 1 and 2 because the out-point of the media clip B falls in the time period that the media clip A spans. Similarly, the node B is divided into two segments 3 and 4. Because segments 3 and 2 are the only segments defined in the corresponding time periods (i.e., the time period from time t3 to time t4 and the time period from time t1 and t2) of the media presentation, they will be the same segments divided from the root node 515.

The identifier generator 145 generates identifiers 1-5 (denoted by Id 1-5 in this figure) for the segments 1 through 5. For the identifiers 1 and 2 for the segments 1 and 2, the identifier generator generates the same identifier (i.e., identifier 1) because the segments 1 and 2 contain the media content of the same media clip (i.e., the media clip A) and thus share the same set of attributes that are used to compute a key. In some embodiments, the rendered results for these two segments are stored in the same render file that will be associated with the key shared by the identifiers 1 and 2. The different rendered results in the render file that are resulted from rendering the segments 1 and 2 are identified with the offsets. Similarly, the identifier generator 145 generates the same key for the identifiers 3 and 4 for the segments 3 and 4 because these two segments are divided from the same media clip (i.e., media clip B).

The background-rendering module 155 then chooses to render only the segments that are divided from the media clips and not the segments divided along the timeline of the presentation. The rendered results for the segments 1-4 are then stored in the repository 160. The render file R1 is associated with the key shared by the identifiers 1 and 2 and contains the rendered results for the segments 1 and 2. The render file R2 is associated with the key shared by the identifiers 3 and 4 and contains the rendered results for the segments 3 and 4.

At the stage 505, the render status bar 120 is drawn in gray for the time period from time t1 to time t2 and the time period from time t3 to time t4. The render status bar is drawn in white for the time period from time t2 to time t3 because the segment 5, which is the segment that occupies the time period from time t2 to time t3 of the media presentation, is not rendered yet.

Several more detailed embodiments of the invention are described in the sections below. Section I provides the overall software architecture of a media-editing application for some embodiments of the invention. Next, Section II provides a description of segmenting a media presentation and generating keys for the segments. Section III then describes how the media-editing application performs the background-rendering operations. Next, Section IV describes making rendered results for segments immediately available for use. Section V follows with a description of managing rendered results. Section VI then describes several use cases of the background-rendering modules of the media-editing application. Section VII describes the process used to define the media-editing application of some embodiments. Finally, Section VIII describes an electronic system that implements some embodiments of the invention.

I. Software Architecture

As described above, the media-editing application of some embodiments includes several background-rendering modules. These modules automatically render segments of a media presentation in the background of a system, on which the media-editing application is being executed. By performing rendering in the background, the background-rendering modules produce rendered results for the segments. That is, the modules pre-generate playable media output (e.g., composite images or audio) of the media presentation without interrupting other operations (e.g., editing, etc.) of the media-editing application. As such, the users can continue on editing the media presentation using the media-editing application without being interrupted.

Figure 6:
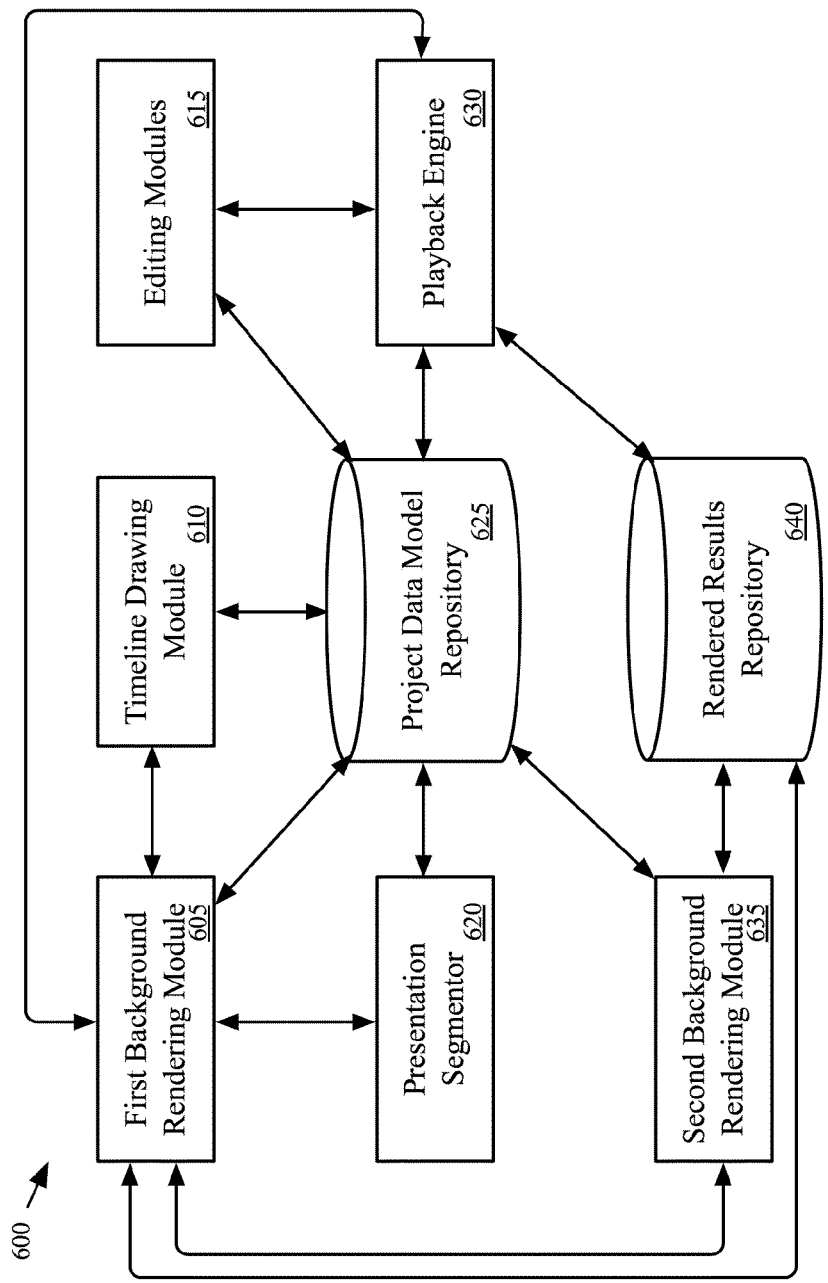
FIG. 6 conceptually illustrates the software architecture of the media-editing application of some embodiments.

FIG. 6 conceptually illustrates the software architecture of a media-editing application 600 of some embodiments. Specifically, this figure shows that the media-editing application 600 includes two separate background-rendering modules that perform background-rendering operations as described above. As shown, the media-editing application 600 includes first and second background-rendering modules 605 and 635, editing modules 615, playback engine 630, presentation segmentor 620, and timeline drawing module 610.

A project data model repository 625 stores project data models. A project data model in some embodiments is a data structure for defining the composition of the media presentation. That is, the data model defines how the media clips and effects are composited and applied in order to form a composite media presentation. A project data model also defines how the media content of the media presentation are edited, combined, transitioned, overlaid, and pieced together. Example data structures in a project data model will be described further below by reference to FIG. 8. The modules of the media-editing application 600 access the project data model repository 625 to modify or read the project data models stored in the repository. As described above, in order for a user to see whether the media content in a media presentation is edited as the user desires, the user needs to preview the media content in the media presentation. The project data model has to be converted to a form that can be played back and previewed.

The editing modules 615 process user activities with a media presentation through the media-editing application. The user activities include skimming, playing back, editing actions, etc. When the user activities involve editing actions, the editing modules access the project data model repository 625 to modify the project data model according to the edits that the user makes to the media presentation. For instance, the user may move a media clip from one time period to another, change the in-point of a clip, specify quality of frames for preview, etc. For skimming or playing back actions, the editing modules 615 direct the playback engine 630 to convert the portion of the media presentation that the user wishes to playback or skim into displayable frames. In some embodiments, playback is an operation of continuously displaying frames of video content in the media presentation. Skimming or scrubbing is displaying individual frames as specified by the user.

The presentation segmentor 620 divides a media presentation into segments. As discussed above, segments are non-overlapping time periods along the timeline of the media presentation. The segmentor reads the project data model for the media presentation that is stored in the project data model repository 625. The segmentor 620 defines the segments based on in- and out-points of media clips and the starts and ends of any effects applied to the media presentation. The segmentor 620 in some embodiments gives a list of segments to the first background-rendering module 605. The list is updated by the presentation segmentor whenever there is any change made to the project data model.

The first background-rendering module 605 groups the segments of the media presentation into different categories based on certain attributes of the segments. Some such attributes include the type of video that a segment includes (e.g., a motion video or a still image), the real-time playability of a segment, the availability of a source media file, the user's inputs as to whether a particular segment is to be rendered first, etc. The first background-rendering module prioritizes the categories based on these attributes. As it will be described below, the segments in the highest priority category are rendered first. Grouping segments into categories and prioritizing the categories will be described in details further below.

In order to group the segments into categories and to prioritize the categories, the first background-rendering module 605 receives a list of segments from the presentation segmentor 620. The first background-rendering module 605 goes through each segment in the list and retrieves the relevant attributes of the segment from the project data model stored in the repository 625. After the segments are grouped into categories and the categories are prioritized, the list of segments is updated with information regarding the categories and their assigned priorities. For instance, a segment in the list will be associated with a category and the rendering priority.

The first background-rendering module 605 also generates keys for the segments. In some embodiments, the first background-rendering module 605 uses a separate key generator module (not shown) in order to generate the keys. As noted above, these keys identify storage structures that store the rendered results for the segments. The keys are generated by using a hash function, which takes as inputs sets attributes of the segments in some embodiments. Not all attributes are used in computing the keys. For instance, some attributes, which when changed do not affect the media content represented by the segment (e.g., moving an out-point of a media clip in the segment further out), are not used in computing a segment key.

In addition to generating a key for a segment, the first background-rendering module 605 constructs frame-level identifiers in some embodiments. As discussed above, a rendered result in some embodiments includes a set of frames when the media content of the segment is a video content. An identifier for a frame in the rendered result is generated based on the key that identifies the storage structure that stores the rendered result and an offset for the frame within the storage structure. The segment keys and frame offsets are constructed before any segments are rendered in some embodiments. That is, the keys and offsets are constructed before the rendered results are produced from the segments in these embodiments. The segment keys and frame offsets will be described further below by reference to FIGS. 12 and 13.

Using the key for a segment and the offsets for the frames, the first background-rendering module 605 accesses the rendered results repository 640 to check whether the segment has been at least partially rendered. When there are frames identified by the key and offsets in the repository, the first background-rendering module 605 updates the list of segments to indicate the segment's rendering status. The rendering status of a segment can be fully rendered, partially rendered, or not rendered. The rendering status is fully rendered when the rendered result is found in the repository and it includes a complete set of frames that are supposed to be produced from the segment. When only some of the frames that are supposed to be produced from the segment are found in the rendered result, the render status of the segment will be partially rendered. When the render status indicates partial rendering, the status also includes information about which portions of the segment are rendered or not. When the rendered result is not found in the repository, the rendering status for the segment indicates that the segment is not rendered.

The timeline drawing module 610 color-codes the render status bar of a GUI that represents a media presentation. The module 610 draws portions of the render status bar that correspond to the segments in different colors to reflect the rendering statuses of the segments. For instance, portions of the render status bar that correspond to those segments of the media presentation that are already rendered will be colored in gray. The timeline drawing module 610 receives from the first background-rendering module 605 the list of segments that contains the information regarding the rendering status of each segment. When a segment is partially rendered, the timeline drawing module 610 draws those portions of the render status bar that correspond to the rendered portions of the segment in gray and other portions of the render status bar that correspond to the not-rendered portions of the segment in different colors. One of ordinary skill in the art will recognize any combination of colors may be used to indicate different render status.

The second background-rendering module 635 renders the segments of the media presentation when they need rendering. The second background-rendering module 635 receives the list of segments with render status, categories, and category priorities from the first background-rendering module 605. The module 635 skips those segments that are already rendered. For other segments that need rendering, the second background-rendering module 635 goes through the list and finds the segments in a category with the highest rendering priority. Those segments in the highest priority category are rendered first. Once the module renders all segments in the highest priority category, the module moves on to render the next highest category of segments.

The segments within the same category are rendered in chronological order (e.g., their order of appearance in the timeline of the media presentation) in some embodiments. The second background-rendering module produces the rendered result for the segment from the portion of the project data model that represents the segment being rendered. The second background-rending module retrieves the project data model for the media presentation from the project data model repository 625.

The rendered results for the segments are stored in the rendered results repository 640. The frames are associated with appropriate keys and offsets. In some embodiments, the rendered result for a segment is stored in a single file called a render file.

The playback engine 630 generates a preview of the media presentation. As described above, the playback engine 630 is directed by the editing modules 615. The editing modules process the users' requests to playback or skim certain segments of the media presentation and direct the playback engine to produce the frames for playing back or skimming.

The playback engine 630 finds out whether the segments of the media presentation have been rendered already by looking up a list of segments that contains render status of each segment in the media presentation. The playback engine receives the list of segments from the first background-rendering module 605.

For segments that are already rendered, the playback engine retrieves the rendered results using the keys for the segments from the rendered results repository 640. For those segments that have not been rendered, the playback engine 630 processes the corresponding data of the segments in the media presentation that are stored in the project data model repository 625 in order to produce playable frames and display those frames. In other words, when the playback engine plays back a segment of media presentation, the engine uses the rendered result for the segment if the segment is already rendered. Otherwise, the engine produces the frames from the data that corresponds to the segment.

The operation of the media-editing application 600 will now be described. The editing modules receive an edit from the user. The edit may be received through user's clicking a mouse button or tapping a touchscreen to select a user interface (UI) item, selecting an option through keyboard input, etc. The user adds a blurring effect on a time period from time t1 to time t2 along the timeline (not shown) of the media presentation. The editing modules modify the project data model for the media presentation that is stored in the project data model repository 625. The user has not yet indicated that the user wishes to preview the effect that is just added.

The presentation segmentor module divides the timeline of the media presentation according to the received edit. Since an effect was added, the time period that covers the effect is defined as a new segment in some embodiments. The segmentor 620 updates the list of segments with newly defined segments and passes the list to the first background-rendering module 605.

The first background-rendering module 605 receives the updated list of segments and constructs new keys for the segments. The module 605 retrieves a set of attributes of each segment from the project data model for the media presentation stored in the project data model repository 625. A new key for each segment is computed based on the retrieved attributes of the segment. The first background rending module 605 then queries the rendered results repository 640 to see if the rendered result associated with the new key exists in the repository. When such rendered result does exist, the first background rending module 605 updates the list of segments to indicate that the segment has been rendered already. When the segment is rendered partially (that is, when the rendered result for only a portion of the segment is found in the repository), the render status for the segment will be updated to indicate the segment as a partially rendered segment. In such case, the status may include the range of offsets of the frames found in the rendered result for the segment. The status for the segment will indicate "not rendered" when no rendered result for the segment is found in the repository.

The first background-rendering module 605 then determines to which the categories the newly defined segments should belong. The segment that occupies the timeline from time t1 to time t2 is placed in a higher priority category because other segments do not have the effect applied and require less processing capability to render. The list of segments is then updated accordingly and passed to the timeline drawing module 610.

The timeline drawing module 610 receives the updated list of segments from the first background-rendering module 605. The timeline drawing module 610 draws in appropriate colors a render status bar (not shown) according to the render statuses of the portions of the media presentation.

The second background-rendering module 635 then receives the updated list of segments from the first background-rendering module 605. The module 635 goes through the list of segments and finds segments that belong to the highest priority category. The second background-rendering module 635 renders the segments in the highest priority category in chronological order. Other segments in different categories that need rendering are also rendered and all rendered results are stored in the rendered results repository 640.

In some embodiments, background-rendering modules of a media-editing application start performing the background-rendering operations when a certain amount of time elapses after the user's last interaction with (e.g., makes an edit to) the media presentation using the media-editing application. The background-rendering modules pauses their operations when the user interacts with the media presentation again.

When a segment that is being accessed by the background-rendering modules is modified by the editing modules, the background-rendering modules stop performing their operations regarding that segment. In some embodiments, the background-rendering modules stop performing when any segment starts being modified by the editing modules.

In some embodiments, the background-rendering modules and the editing modules of a media-editing application run simultaneously. However, the application preferentially treats the editing operations over the background-rendering operations. That is, the background-rendering operations performed by the background-rendering modules do not supersede the edit operations that the editing modules perform.

The media-editing application 600 was described above for some embodiments of the invention. One of ordinary skill in the art will realize that in other embodiments this module can be implemented differently. For instance, in some embodiments described above, certain modules are implemented as software modules. However, in other embodiments, some or all of the modules might be implemented by hardware. For example, while in some embodiments the second background-rendering module and the playback engine are implemented as software modules, in other embodiments one or both of these modules are implemented by hardware, which can be dedicated application specific hardware (e.g., an ASIC chip or component) or a general purpose chip (e.g., a microprocessor or FPGA).

Figure 7:
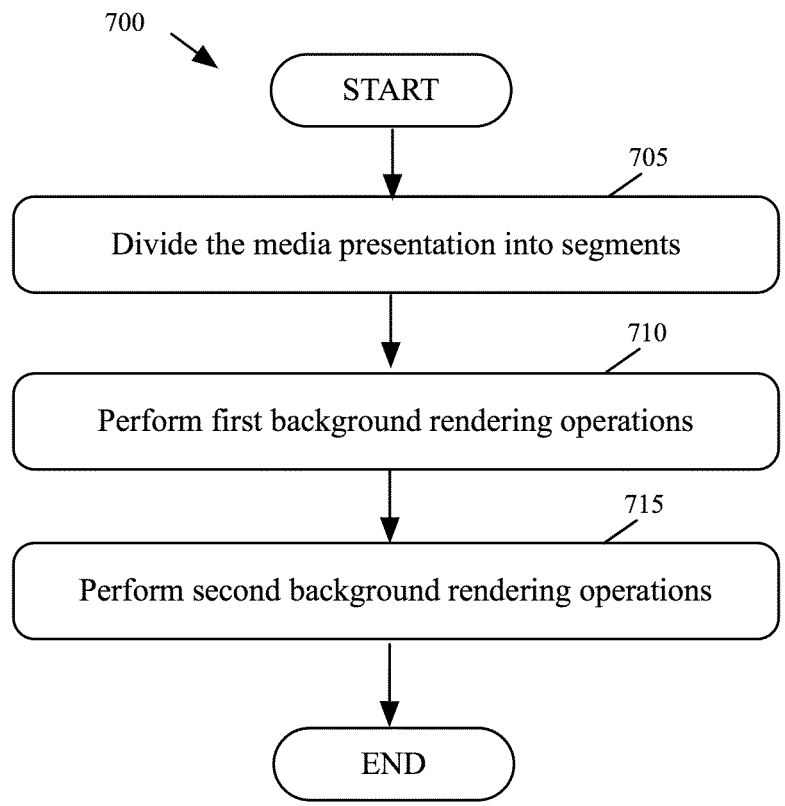
FIG. 7 illustrates a conceptual process that some embodiments use to segment a media presentation and background-render the presentation.

FIG. 7 illustrates a conceptual process 700 that some embodiments perform to background-render a media presentation. Process 700 is performed by a media-editing application. More specifically, the process in some embodiments is performed by a presentation segmentor such as the segmentor 620 described above by reference to FIG. 6 and first and second background-rendering modules such as the first and second background-rendering modules 635 and 64 described above by reference to FIG. 6. The process in some embodiments starts when it receives an edit to the media presentation or when a project data model is opened by the media-editing application.

Process 700 begins by dividing (at 705) the media presentation into segments. In some embodiments, the process divides the media presentation only along the timeline of the media presentation. That is, the process uses the in- and out-points of the media clips or the starts and ends of the effects applied to the media presentation to divide the media presentation into segments. Some of these segments may contain the media content from two or more media clips that fall within the same time period in the media presentation.

In other embodiments, the process divides the media presentation not only along the timeline but also along other dimensions of the media presentation. For instance, the process divides individual media clips that make up the media presentation into segments. Such segments may not contain composite media content because these segments are divided from single media clips and not from the composite media presentation itself.

In some of these embodiments, the process divides a single media clip into multiple segments based on not only the in- and out-points that fall in the time period occupied by the segments but also the media clips within the single media clip.

A single media clip that contains multiple media clips include composed media clips and imported media clips. As described above, a composed media clip is a sequence of the media clips that are concatenated. In some embodiments, a media clip in a composed media clip itself is a composed media clip. An imported media clip is a media clip imported from another media-editing application. The process can obtain the information about the composition of the media clips within an imported media clip by calling one or more of the API calls provided by the media-editing application from which the media clip is imported.

Next, process 700 performs (at 710) first background-rendering operations. As described above, the first background-rendering operations in some embodiments include grouping the segments into different categories based on some attributes of the segments and prioritizing the categories based on one or more criteria. For instance, the process groups those segments that are most costly to render (i.e., segments that consume a lot of computing resources to process the project data model to produce rendered results for the segments). The first background-rendering operations also include generating keys for the segments. In some embodiments, the process uses sets of attributes of the segments as inputs to a hash function. The output hash values are then used as the keys for the segments. The process later uses these generated keys to identify the rendered results for the segments.

The process then performs (at 715) second background-rendering operations. The second background-rendering operations in some embodiments include rendering the segments in a prioritized order that is determined during performing the first background-rendering operations. The process renders first the segments in the category with the highest priority. For the segments within the same category, the process in some embodiments renders the segments in a certain order. For instance, the process renders the segments within the same category in a chronological order within the timeline of the presentation. That is, the segments that occupy earlier time periods within the media presentation get rendered first by the process. The process ends after the second background-rendering operations are performed.

Having described the overall software architecture of a media-editing application, the following Section II will now describe several methods for segmenting a media presentation and generating keys for the segments of the media presentation.

II. Presentation Segmentation

As described above, the media-editing application defines portions of a media presentation as segments. The media-editing applications of different embodiments define the segments differently. For instance, in some embodiments, the media-editing application divides the media presentation into different time periods along the timeline and defines the time periods as segments. In some other embodiments, the media-editing application divides the media presentation not only along the timeline of the presentation but also along other dimensions of the media presentation. For instance, the media-editing application of some embodiments defines different segments for different media clips on different tracks of the media presentation. In some embodiments, the media-editing application also defines different segments for different nodes of a composite graph (e.g., a tree) that it defines to represent the media presentation in terms of a series of linked nodes, with different nodes representing different clips or operations (e.g., different effects) for compositing.

When the media-editing application renders a segment of the media presentation, the application computes an identifier that uniquely identifies the segment and then uses this identifier to store and later retrieve the rendered result for the segment. The application in some embodiments computes the identifier based on a set of attributes of the segment, and stores the results of rendering the segment at a location that is uniquely identifiable in a storage structure by the identifier. When a segment is moved within the composite presentation (e.g., moved along the timeline, moved from one track to another, moved within the composite graph, etc.) without changing its set of attributes, the media-editing application can use the rendered result for the segment without re-rendering the segment. This is because the identifier for this moved segment did not change as its set of attributes did not change, and this identifier can be used to retrieve the rendered results from the storage structure. Similarly, the media-editing application is able to use the same rendered result for any other segment that has the identical attributes, without having to render the other segment.

A. Introduction

Figure 8:
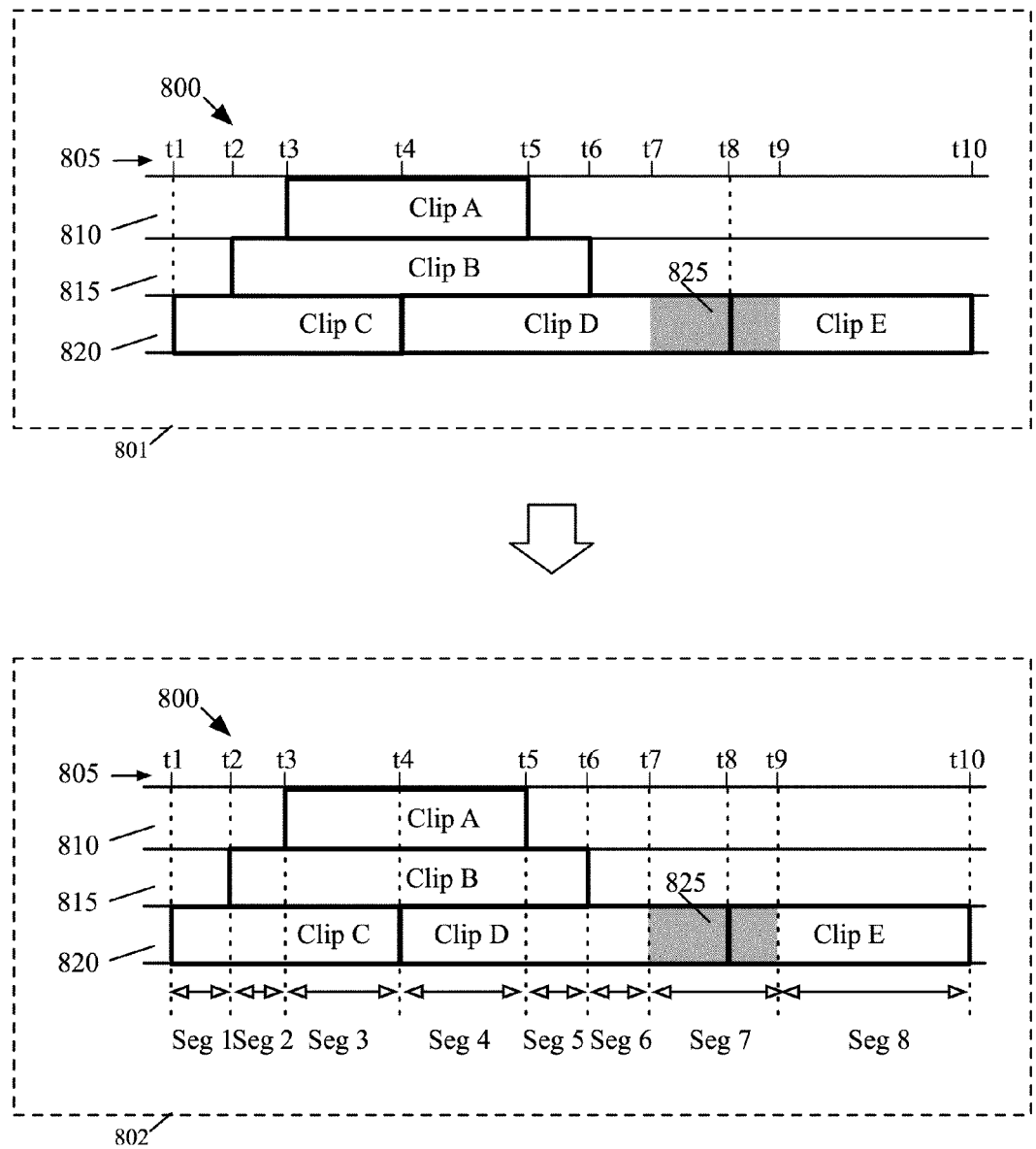
FIG. 8 conceptually illustrates a composite display area that shows a portion of a media presentation divided into segments.

FIG. 8 illustrates dividing a portion of media presentation into multiple segments along the timeline of the media presentation. Specifically, the figure illustrates a composite display area 800 in two different stages 801 and 802 to show that the media presentation is divisible along the timeline in some embodiments. As shown, the composite display area 800 includes a timeline 805, tracks 810-820, and media clips A-E.

The composite display area 800 is a composite display area of a media-editing application. As described above, user can composite a media presentation by dropping media clips on the tracks. The media clips can be moved along or into different tracks. The lengths of the clips can be adjusted. Effects can be added and adjusted in a similar manner. The timeline 805 spans the GUI 800 horizontally. The timeline shows time periods that the media clips and effects span within the media presentation.

As described above, a media clip represents a portion of a source media file that contains media content. The start and end of a media clip are called in- and out-points, respectively. When a source media file is a video file (e.g., .mov or .avi file), the in- and out-points represent the first and last frame of the portion of the file that the media clip represents. When a media clip is brought into a media presentation, the in- and out-points of the media clip fall in certain points along the timeline of the presentation. For instance, the in- and out-points of the media clip A are at time t3 and time t5 of the timeline of the media presentation displayed in the display area 800.

An effect is a process that is applied to a portion of the media presentation such that the portion has different visual appeal when played back. There are many kinds of effects. Any manipulation of a media clip that results in different visual appeal may be an effect. For instance, a blurring effect blurs a portion of the media presentation to a certain degree. A segment of a media presentation in some embodiments is a time period along the timeline of the media presentation. In some embodiments, segments are defined by (1) in- and out-point of the media clips and (2) starts and ends of effects. The media clips and effects span different portions of tracks along the timeline of a media presentation.

At stage 801, the media clip A spans the track 810 from time t3 to time t5. The in- and out-points of clip A are at times t3 and t4, respectively. The media clip B spans the track 815 from time t2 to time t6. The media clip C spans the track 820 from time t1 to time t4. The media clip D spans the track 820 from time t4 and time t8. The media clip E spans the track 820 from time t8 to time t10. A gray portion 825 represents an effect applied to the media clips D and E. The effect 825 spans the track 820 from time t7 to time t9 over two media clips D and E.

At stage 802, the portion of the media presentation displayed in the composite display area 800 is divided into different segments along the timeline of the media presentation. As shown, there are eight different segments that are depicted as bidirectional arrows. Segment 1 spans the media presentation from time t1 to time t2, which are the in-points of clips C and B, respectively. Segment 2 spans from time t2 to time t3, which are the in-points of the media clips B and A, respectively. Segment 3 spans the media presentation from time t3 to time t4 which are the in-point of the media clip A and the out-point of the media clip C (or the in-point of the media clip D), respectively. Segment 4 spans from time t4 and time t5 which are the in-point of the media clip D and the out-point of the media clip A, respectively. Segment 5 spans from time t5 to time t6, which are the out-point of the media clip A and the out-point of the media clip B, respectively. Segment 6 spans from time t6 to time t7, which are the out-point of the media clip B and the start of the effect 825, respectively. Segment 7 spans from time t7 to time t9, which are the start of effect 825 and the end of effect 825, respectively. Segment 8 spans from time t9 to time t10, which are the ending of effect 825 and out-point of the media clip E.

In most cases, segment 7 should be divided into two segments—one that spans from time t7 to time t8 and the other that spans from time t8 to time t9—because the media clip D ends at time t8 and the media clip E starts at time t8. However, in some embodiments, some types of effects define segments at the starts and ends of the effects regardless of existence of any in- or out-points within the time periods that the effects span. One of such types of effects is a transition, which is used to change from one media clip in the media presentation to the next. The effect 820 in this example is a transition.

Each segment that is divided along the timeline of the presentation represents composite media content of the media clips. Segment 1 represents the media content of the media clip C from time t1 to time t2. Segment 2 represents media content that is a composite of the media contents of the media clips B and C from time t2 to time t3. Segment 3 represents media content that is a composite of media contents of the media clips A, B, and C from time t3 to time t4. Segment 4 represents media content that is a composite of media contents of the media clips A, B, and D from time t4 to time t5. Segment 5 represents media content that is a composite of media contents of the media clips B and D from time t5 to time t6. Segment 6 represents media content of the media clip D from time t6 to time t7. Segment 7 represents media content that is a composite of media content of media clip D from time t7 to time t8, and the media content of the media clip E from time t8 to time t9, which covers the effect that is applied to the media contents of the media clips D and E. Segment 8 represents the media content of the media clip E from time t9 to time t10.

Figure 9:
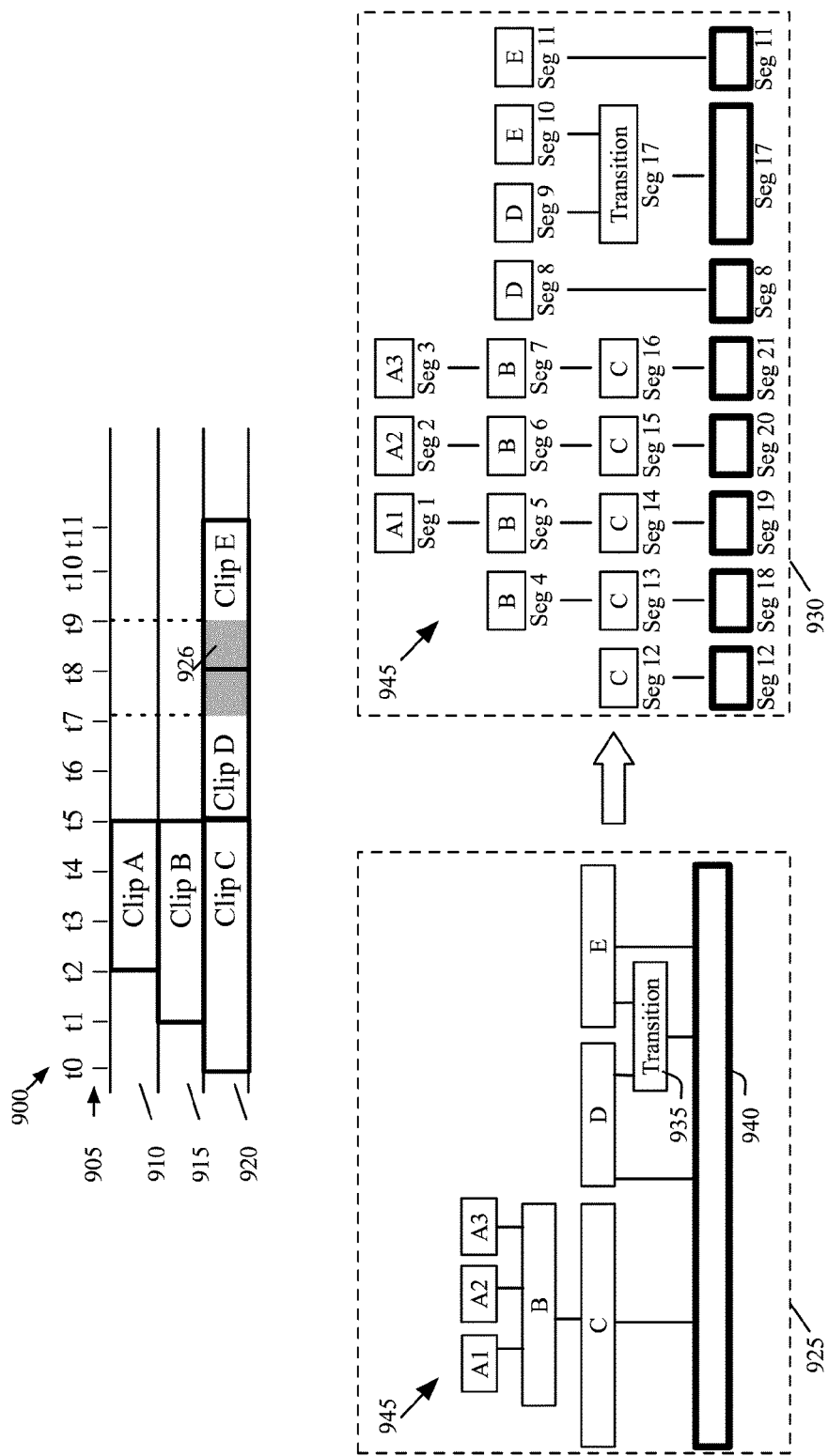
FIG. 9 illustrates a composite display area and composite graphs that show a portion of a media presentation divided into segments.

FIG. 9 illustrates dividing a portion of media presentation into multiple segments along the time line as well as along the individual media clips in the presentation. Specifically, the figure illustrates a composite graph 945 in two different stages 925 and 930 to show that the media presentation is divisible along the timeline and along the media clips in some embodiments. FIG. 9 also illustrates a composite display area 900 which is similar to the composite display area 800 described above by reference to FIG. 8. As shown, the composite display area 900 includes a timeline 905, tracks 910-920, and media clips A-E.

As shown, the composite display area 900 displays a portion of media presentation that spans from time t0 to time t11. The portion of the media presentation includes media clips A-E and an effect applied to the media clips D and E. The media clip A spans the track 910 from time t2 to time t5. The media clip B spans the track 915 from time t1 to time t5. The media clip C spans the track 920 from time t0 to time t5. The media clip D spans the same track from time t5 to time t8. The media clip E spans the track 920 from time t8 to time t11. A gray portion 926 that spans the track 920 from time t7 to time t9 represents an effect applied to the media clips D and E.

At stage 925, the composite graph 945 represents a portion of the media presentation displayed in the composite display area 900. The composite graph 945 includes root node 940 which represents the composite media content of the media presentation. The nodes A1-A3 represent the media clips A1-A3 (not shown) that make up the composed media clip A displayed in the display area 900. The media clip A1 occupies the time period from time t2 to time t3. The media clip A2 occupies the time period from time t3 to time t4. The media clip A3 occupies the time period from time t4 to time t5. The nodes B-E represent the media clips B-E, respectively. The node 935 represents the effect applied to the media clips D and E.

At stage 930, the nodes in the composite graph 945 is divided into segments. The nodes A1-A3 are not divided into multiple segments because no in- or out-points of other media clips fall in the time period occupied by the media clip A. Node B is divided into segments 4-7 because the in-points of the media clips A1-A3 fall in the time period occupied by the media clip B at times t2, t3, and t4. As such, node B is divided into segments 4-7. In a similar manner, node C is divided into segments 12-16.

The node D is divided into two segments 8 and 9 because the start of the effect 925 falls in the time period occupied by the media clip D. The node E is divided into two segments 10 and 11 because the end of the effect 925 falls in the time period occupied by the media clip E. The node 935 is not divided into multiple segments because the effect represented by the node 935 is a transition. As noted above, a transition is a type of effect that is defined as a segment regardless of any in- or out-points that fall within the time period occupied by the effect.

The root node 925 is divided into multiple segments along the timeline of the media presentation. Each of these segments contains composite media content unless the segment includes a single media clip or effect. The first segment that is divided from the root node 925 is segment 12. The segment 12 does not contain composite media content because the time period from time t0 to time t1 contains only the media content from the media clip C. In contrast, segments 18-21 contain composite media content from two or more media clips included in the time period occupied by each of the segments. The segment 17 is deemed one of the segments divided from the root node 940 because the transition represents the media content of the media presentation from time t7 to time t9. Segment 11 also contains only the media content of media clip E thus is not a segment that contains composite media content.

In some embodiments, the media-editing application divides the portion of the media-presentation displayed in the composite display area 900 only along the timeline of the media presentation. That is, the media-editing application utilizes the fact that the media clip A is a composed media clip when dividing the portion of the media presentation along the timeline. However, the media-editing application in these embodiments does not divide individual media clips into multiple segments. The segmentation result in these embodiments would have been only the segments 12, 18, 19, 20, 21, 8, 17, and 11, which is the result of dividing only the root node.

Figure 10:
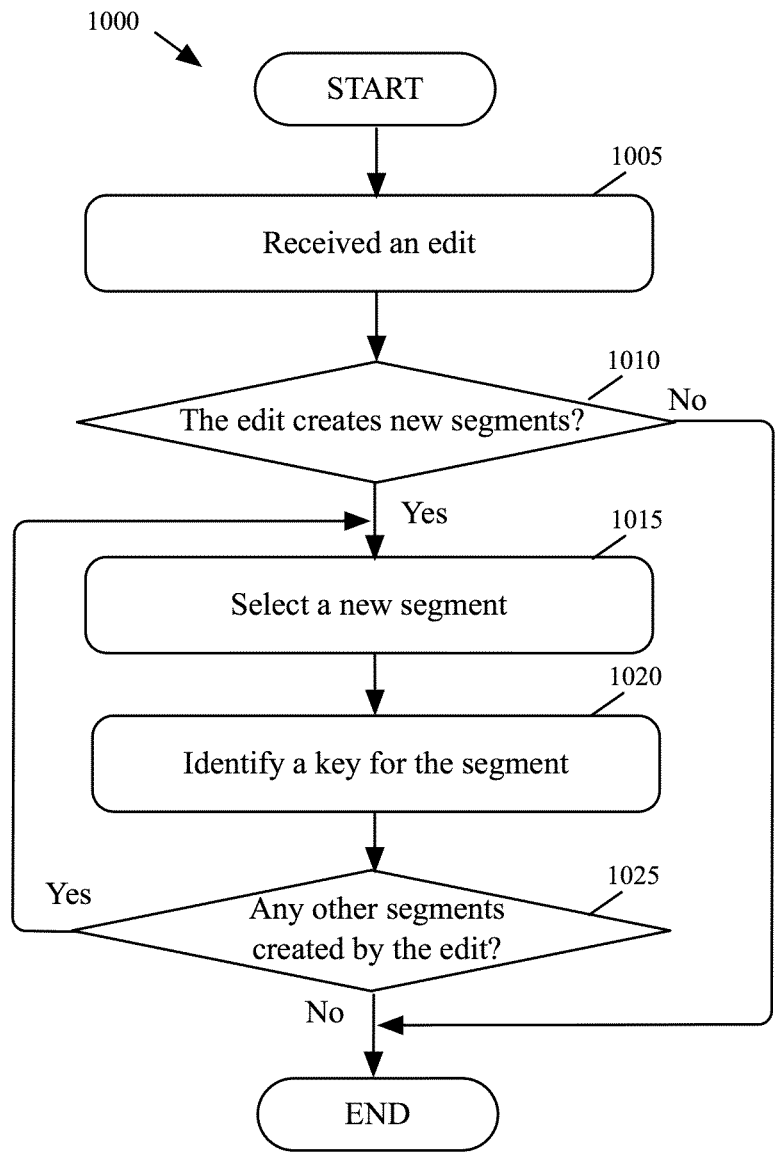
FIG. 10 illustrates a conceptual process that some embodiments use to segment a media presentation and identify keys for the segments.

FIG. 10 illustrates a conceptual process 1000 that some embodiments use to divide a media presentation into segments and generate keys for the segments. The process is performed by a media-editing application. More specifically, the process in some embodiments is performed by a presentation segmentor such as the segmentor 620 described above by reference to FIG. 6 and an identifier generator such as the identifier generator 145 described above by reference to FIGS. 1, 3, and 5. The process in some embodiments starts when the media-editing application receives and processes user inputs that specify an edit that the user wishes to make on the media presentation.

The process starts by receiving (at 1005) an edit. The process in some embodiments receives an edit from an editing module such as one of the editing modules 615, described above by reference to FIG. 6, that processes the user inputs that result in modifying some portion of the media presentation.

Next, the process determines (at 1010) whether the edit creates new segments. That is, the process determines whether the received edit changes one or more media clips such that the process has to define new segments after receiving the edit.

In some embodiments, the process divides the media presentation only along the timeline of the media presentation. As discussed above, when a media presentation is divided along the timeline, the segments that are divided from the media presentation along the timeline include the media content resulted from compositing the media clips to create the media presentation. Some of these segments include media contents from more than one media clips.

In other embodiments, the process divides the media presentation not only along its timeline but also along other dimensions. For instance, the process in some embodiments divides each individual media clip in the media presentation into one or more segments that could be rendered separately.

As an example of the received edit resulting in new segments, the received edit in some cases adds a first media clip to the media presentation such that the media content in the first media clip overlays the media content of a portion of a second media clip. Based on such received edit, the process defines several new segments. The process defines the time period in which the media content of the first media clip overlays the media content of the second media clip as a new segment that contains the composite media content from the first and second media clips. When the process segments the individual media clips of the media presentation into one or more segments, the process defines the first media clip as a new segment.

When the process determines (at 1010) that the received edit did not create new segments, the process ends. Otherwise, the process selects (at 1015) a new segment. That is, the process selects one of the new segments resulted from the edit.

The process then identifies (at 1020) a key for the selected new segment. In some embodiments, the process identifies the key for the segment by computing the key based on a set of attributes of the segment. In some cases, the key generated for the segment is a new key that is different than other keys that have been generated for other existing segments. In other cases when a set of attributes of the new segment is identical to the set of attributes of an existing segment, the key generated for the new segment is the same as the key for the existing segment. For instance, when the existing segment and the new segment are divided from the same media clip, the key generated for the two segments are the same because the two segments share the same set of attributes that are used to compute the keys for the segments.

Next, process 1025 determines whether there are other segments created by the received edit for which keys have not been identified. When the process determines that there are no such other new segments, the process ends. Otherwise, the process loops back to 1015 to select another new segment among the new segments resulted from the received edit.

Figure 11:
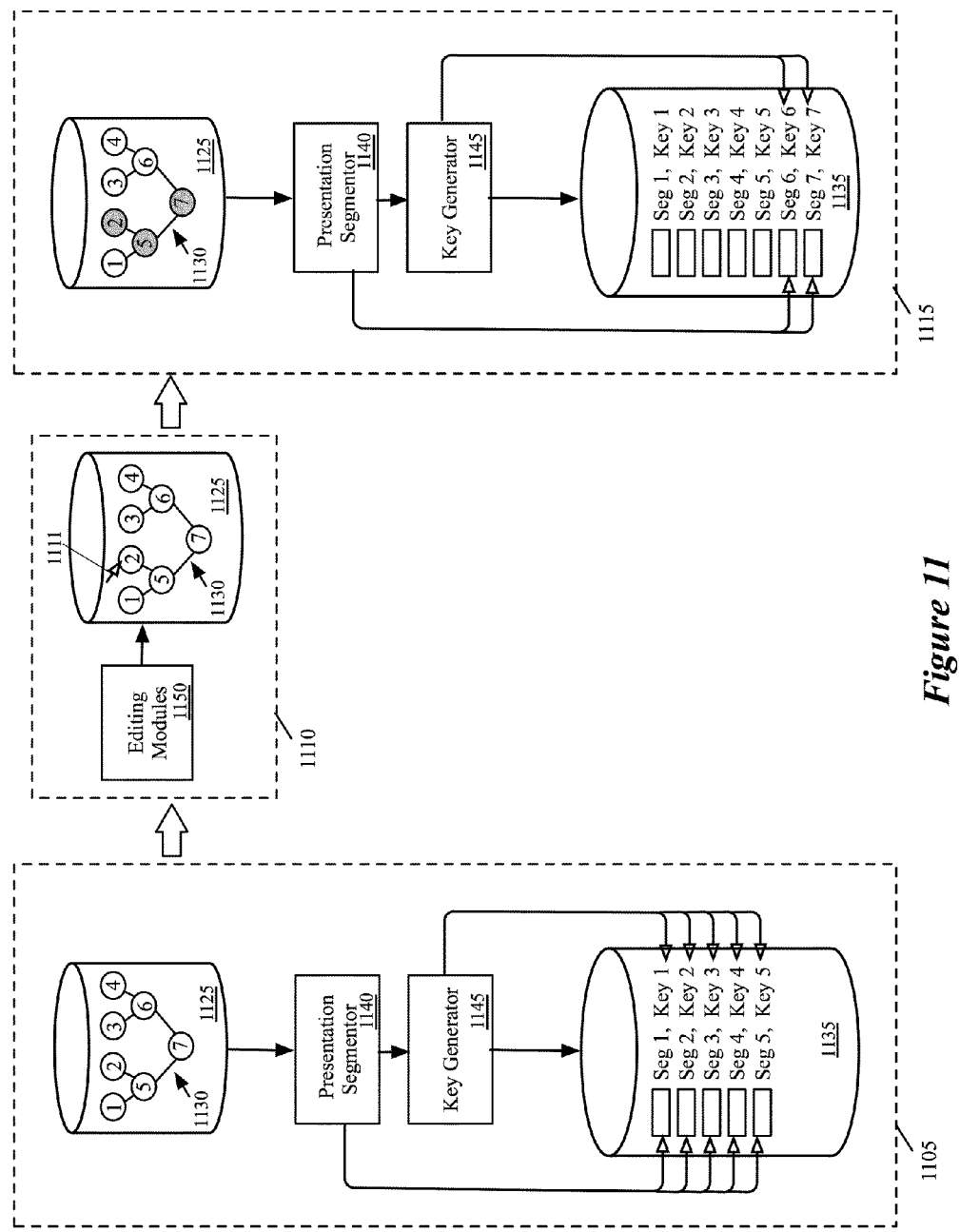
FIG. 11 conceptually illustrates creating new segments and generating new keys for the segments after receiving an edit to a media presentation.

FIG. 11 illustrates an example of an edit to a media presentation that creates several new segments. Specifically, the figure illustrates a project data model repository 1125 and segments and keys repository 1125 at three different stages 1105, 1110, and 1115 to show that new segments and new keys for the new segments are resulted from an edit that is made to the media presentation. FIG. 11 illustrates a presentation segmentor 1140, a key generator 1145, and editing modules 1150.

The presentation segmentor 1140 is similar to the presentation segmentor 140 described above by reference to FIGS. 1 and 3. The key generator 1145 generates a unique key to identify a rendered result for a segment based on a set of attributes of the segment. The key generator 1145 is similar to the key generator 1210 which will be described in further detail below by reference to FIG. 12. The editing modules 1150 are similar to the editing modules 615 described above by reference to FIG. 6.

At stage 1105, the project data model repository 1125 stores a project data model that defines a media presentation. The media presentation is represented by a composite graph 1130 which includes nodes 1-7. Node 7 is the root node, which represents the composite media content of the media presentation. Each of the other nodes 1-6 represents a media clip. The media content of the media clips represented by nodes 1 and 2 overlays the media content of the media clip represented by node 5. Likewise, the media content of the media clips represented by nodes 3 and 4 overlays the media content of the media clip represented by node 6.

The presentation segmentor 1140 divides the media presentation into several segments. The segmentor 1140 divides the media presentation based on the composite graph 1130. In some embodiments, the segmentor 1140 segments the media presentation only along the timeline of the media presentation. That is, the segments are resulted from dividing the root node only. In other embodiments, the segmentor 1140 segments the media presentation along the timeline of the media presentation as well as along individual media clips represented by the non-root nodes of the composite graph 1130. The segmentor divides the media presentation into five different segments 1-5 (denoted by seg 1-5 in this figure). The key generator 1145 generates a key for each of the segments 1-5 that are divided from the media presentation by the segmentor 1140. The segments have different sets of attributes and the unique keys 1-5 are generated for the segments 1-5, respectively, based on those attributes in the sets.

At stage 1110, the editing modules 1150 receive some user inputs that specify an edit to the media presentation. The editing modules 1150 apply the edit to the media presentation. The edit modifies a media clip represented by node 2 of the composite graph 1130 as indicated by the arrow 1111 that points to the node 2 as shown.

At stage 1115, the edit that is made to the media clip represented by node 2 affects nodes 2, 5, and 7 as indicated by the nodes 2, 5, and 7 drawn in gray in this figure. For instance, the edit applies an effect to the media clip represented by node 2. The edit changes the media clips represented by nodes 2 and 5 such that the presentation segmentor 1140 defines two new segments 6 and 7. The key generator 1145 then generates keys for these two new segments. The sets of attributes of the segments 6 and 7 that are used to compute the keys are different from those of other clips in the media presentation and two new keys 6 and 7 are generated for these two new segments.

B. Key Generation and Frame Offsets

In some embodiments, both a segment identifier and a frame-level identifier are expressed in terms of a key and a frame offset value. In case of the segment identifier, the key is generated from the segment's set of attributes and its offset value identifies the first frame of the segment in a storage structure that stores the segment's rendered result. In case of the frame-level identifier of a frame, the key is generated from the set of attributes of that frame's segment, and its offset identifies the frame in a storage structure that stores the segment's rendered result. The next two figures describe generating keys and frame offsets.

Figures 12, 13:
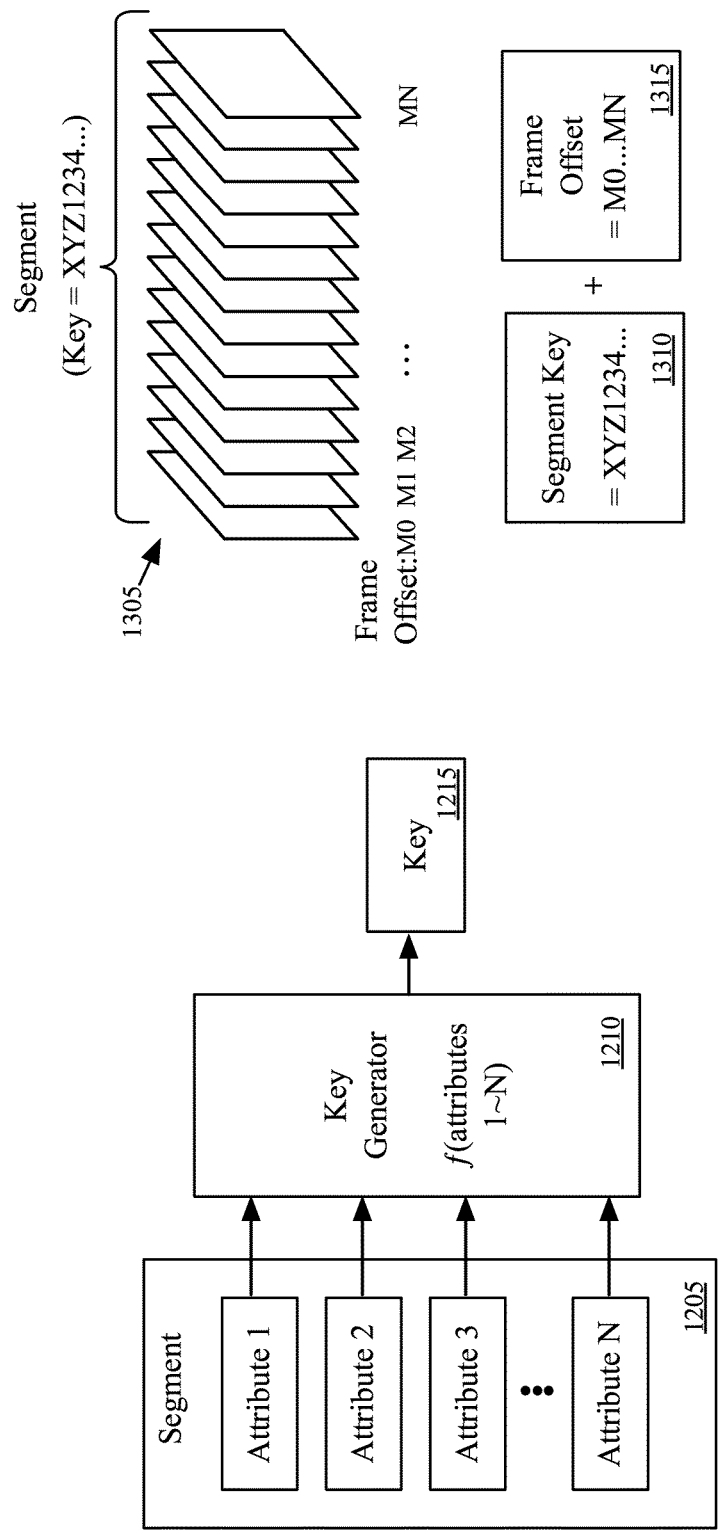
FIG. 12 conceptually illustrates generating a key based on a set of attributes.
FIG. 13 conceptually illustrates a segment key and frame offsets.

FIG. 12 illustrates generating a unique key that identifies the rendered result for a segment of a media presentation. Specifically, FIG. 12 illustrates that a key that identifies the rendered result for a segment is generated based on a set of attributes of the segment. In some embodiments, the rendered result for a segment is stored in a storage structure such as a render file. A key generated by the key generator 1210 is associated with a render file for a segment as soon as the segment is rendered.

In some embodiments, the frames in a render file for a segment are composite frames. These frames share the same set of attributes of the segment. For instance, all frames in a render file are results of compositing media contents from the same set of media clips. Only the set of attributes that is shared by all frames in the render file are used in computing a key that identifies the render file in some embodiments.

As shown, a segment 1205 has a set of attributes 1-N. These attributes are shared by the frames in a render file for the segment in some embodiments. The set of attributes is supplied into a key generator 1210 which computes and outputs a key 1215 based on these attributes in the set. In some embodiments, a key generator uses a hash function (e.g., a Message-Digest algorithm 5 (MD5) function) to compute a key. The hash function takes a set of attributes of a segment as an input, and its output value (i.e., the hash value) is used as a key that identifies a render file for the segment.

There could be numerous attributes of a segment that the key generator 1210 in some embodiments uses to compute a key. Some of those attributes include (1) a hash value for a media clip or an effect in the segment, (2) a unique identifier for a media clip in the media presentation combined with an identifier for a track that the media clip is in, (3) for a nested effect, the effect's hash value, (4) a list of input identifiers being used, (5) a start of a source media file that a media file represents a portion of, (6) a relative in-point, (7) an effect identifier, (8) parameters specific to an effect, (9) duration of an effect, (10) rendering quality information, (11) a target frame rate, (12) a tag for revision of hash function, (13) other values relevant to the particular image processing configuration, etc. These attributes may be expressed in any alphanumeric characters, string, or any symbols. Some of these attributes are discussed in more details below.

A hash value for a media clip or an effect in the segment is a value that is generated by a hash function by taking some attributes of the media clip or the effect as inputs. The hash value for the media clip or effect is changed when some attributes of the media clip or the effect are changed. Some such attributes of the media clip or the effect include the creation time, the duration, the frame rate, etc.

A unique identifier for a media clip is a value that uniquely identifies the media clip within the media presentation. The value of the identifier for a media clip may be different than a hash value of the media clip because two different media clips may have the same hash value. For example, two duplicate media clips may have the same hash value because they have the same set of attributes, but have different identifiers because they are two separate media clips within the media presentation.

An identifier for a track identifies a track in the media presentation. For example, a track number may be used as a track identifier. A nested effect is an effect that became part of a media clip. This is the case when a media clip with an applied effect is saved as a new media clip and the segment includes this new media clip.

The list of input identifiers are used to classify the media clips and the effects that make up the segment. Some example classifiers are "compositingForeground", "compositingBackground", "TransitionASide", TransitionBSide", "effectInput", etc. The "compositingForeground" indicates that the media clip or the effect that is associated with the classifier is used as a foreground for the media content represented by the segment. The "compositingBackground" indicates that the media clip or the effect that is associated with the classifier is used as a background for the media content represented by the segment. The "TransitionASide" and "TransitionBSide" indicate that the media clips associated with these classifiers, respectively, are the two media clips connected by a transition effect in the segment.

The start of a source media file limits how far the in-point of a media clip can be extended. That is, for example, when the source media file is a ten-second video file and the media clip represents the portion of the file from the second two to the second seven, the in-point of the media clip can be extended by as much as two seconds towards the start of the source file.

A relative in-point is an in-point defined by its position relative to the start of the source media file. For example, for the above-mentioned media clip that represents the ten-second video file, the relative in-point is a two that represents the elapse of time from the start of the video file to the in-point of the media clip. An effect identifier is a value that identifies an effect applied to the segment. Effect-specific parameters are the parameters specific to an effect applied to the segment. Example effect parameters include the blur amount, the opacity, etc.

Rendering quality information specifies the quality of the rendered result. For instance, a high quality rendering may specify a high resolution for the frames in the rendered result for the segment. A target frame rate is a number of frames per unit of time that a segment represents. It defines the number of frames that the rendered result will have per unit of time when the segment is rendered. A tag for revision of hash function is the tag that indicates the version of the code that implements the hash function. Other values relevant to the particular image processing configuration include an aspect ratio of the frames in the rendered result for the segment.

When the segment is rendered, changes to any of these attributes of the segment result in different rendered result than what would have been rendered without the changes. However, changes to some other attributes of the segment do not result in a different rendered result. Several examples of these two types of attributes will be described further below by reference to FIGS. 14 and 15 in subsection II.C.

FIG. 13 illustrates constructing a segment identifier and frame-level identifiers for a segment. As described above, both the segment identifier and frame-level identifier are expressed in terms of a key and a frame offset. As shown, a rendered result 1305 for a segment has M frames (that is, from M0 to MN). M denotes the frame offset value of the first frame of the rendered result 1305 within a storage structure that stores the rendered result 1305. N denotes the number of frames in the rendered result 1305. A key 1310 is generated based on a set of attributes of the segment.

In some embodiments, a frame-level identifier for a frame in the rendered result 1305 is constructed by concatenating the key and a frame offset within a storage structure (not shown) such as a render file that stores the rendered result 1305. For instance, the identifier for the second frame of the rendered result in the storage structure will be "XYZ1234 . . . " concatenated by "M1". The "XYZ1234 . . . " is the value of the key that identifies the storage structure. The "M1" is an offset value that identifies the second frame within the storage structure. In other embodiments, a frame in the rendered result 1305 is identified using the key and the offset together without concatenating the two values. That is, the rendered result 1305 can be identified with the key first and then a particular frame in the rendered result can be located with an offset within the identified storage structure.

In some embodiments, an offset value is an index that indicates the location of a frame within a render file. As an example, the rendered result 1305 is within a render file (not shown) that is identified by the segment key "XYZ1234 . . . " The rendered result 1305 includes the last 30 frames (i.e., N is 29) of the render file that includes hundred frames. In this example, the value of M0 (e.g., 71) indicates that the first frame of the rendered result 1305 is the 71st frame of the render file.

In some embodiments, an offset value for a frame does not necessarily indicate the location of the frame within a render file. That is, an offset value may be just a value that is associated with the frame in order to identify the frame and does not indicate the location of the frame within the render file. Instead, an offset value in these embodiments indicates a position of the frame relative to other frames of the rendered result. For instance, in the example described above, the value of M0 may be zero to indicate that the first frame of the rendered result 1305 is the first frame of the rendered result. However, a value of zero does not indicate the location of the first frame within the render file.

In some embodiments, an offset value for a frame is based on the relative position of a segment in a media presentation. For example, an offset value for a frame is computed from time zero at a given frame rate for the media presentation. When rendering a segment that starts at hour 1 of the media presentation that has a frame rate of 24 frames per second (fps), the first frame in the rendered result for the segment has an offset value of 86,400 (i.e., 24 frames/second multiplied by 60 seconds/minute multiplied by 60 minutes). Similarly, the first frame of a segment that starts at hour −1 would have an offset value of −86,400 when the media presentation is edited to have more content before time zero.

C. Segmentation and Keys

Figure 14:
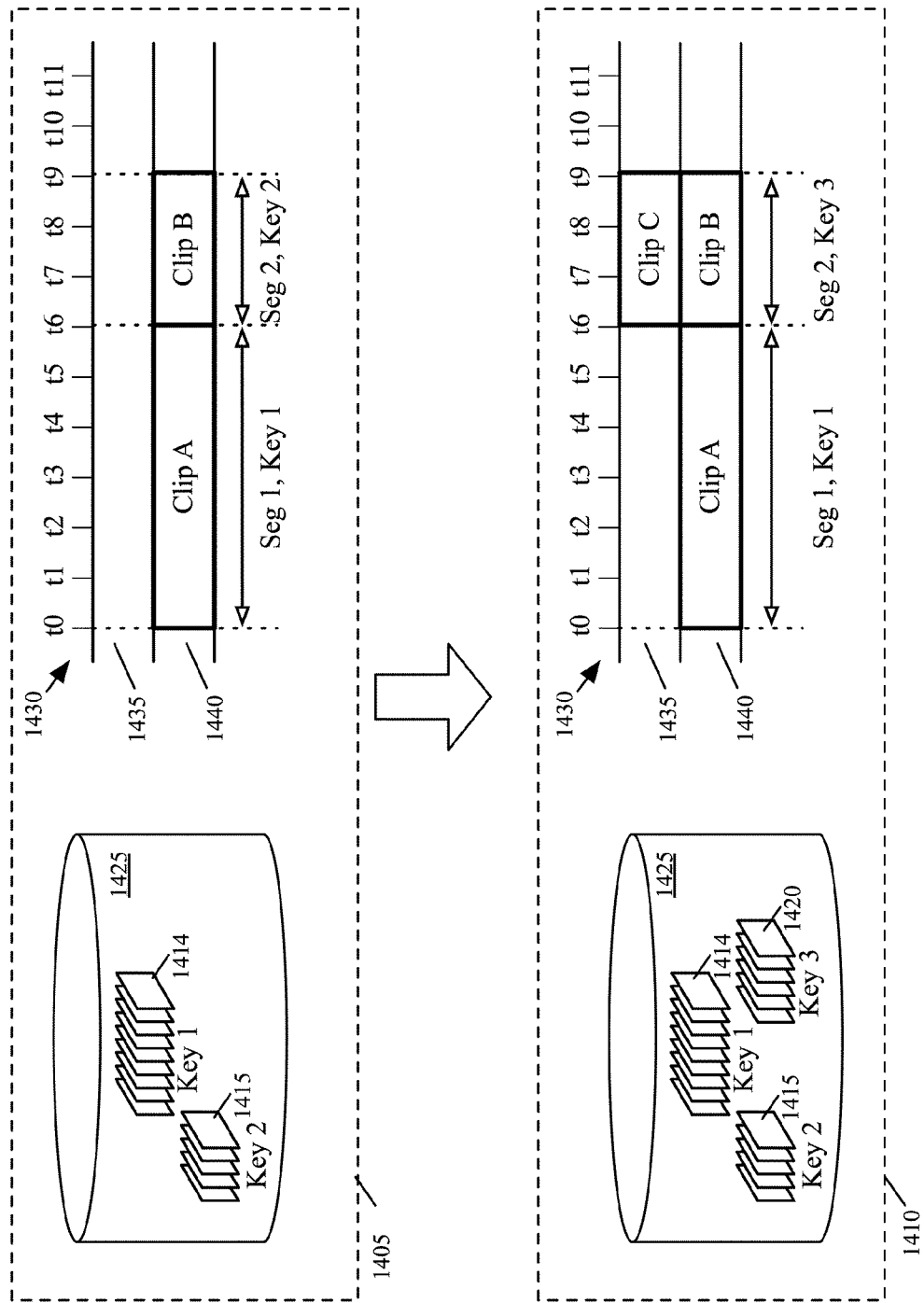
FIG. 14 conceptually illustrates a segment that receives an edit that modifies the segment.

FIG. 14 conceptually illustrates changes to some attributes of a segment of a media presentation. Specifically, this figure illustrates in two stages 1405 and 1410 that changes to some attributes of a segment require re-rendering the segment. That is, when the segment is rendered, the changes to these attributes of the segment result in new rendered result that is different than the rendered result for the segment prior to the changes. As shown, FIG. 14 illustrates a rendered results repository 1425 and a composite display area 1430. The repository 1425 stores the rendered results for the segments in the media presentation. The composite display area 1430 is similar to the composite display area 800 as described above by reference to FIG. 8. The composite display area 1430 includes tracks 1435 and 1440. The composite display area 1430 displays a portion of the media presentation, which includes media clips A and B.

At stage 1405, media clip A spans track 1440 from time t0 to time t6. The media clip B spans track 1440 from time t6 to time t9. Segments 1 and 2 span the same time periods as the media clips A and B, respectively. Keys 1 and 2 have been generated based on sets of attributes of segments 1 and 2, respectively. Segments 1 and 2 have been rendered. The render file 1414 contains the rendered result for segment 1. The render file 1415 contains the rendered result for segment 2.

At stage 1410, the media clip C is added to track 1435 of the media presentation. The user has dragged and dropped a media clip from a library (now shown) that holds available media clips to the track 1435. As shown, the media clip C spans the same time period that the media clip B does. Because the two media clips are now in segment 2, the set of attributes of segment 2 that is used to compute a key is different than the corresponding set of attributes of segment 2 prior to adding the media clip C to the media presentation. Moreover, segment 2 now represents media content that is a composite of the media contents of the media clips B and C. As a result, when segment 2 is rendered, a new render file 1420 that contains different rendered result than the rendered result stored in the render file 1415 is generated. A key 3 for the render file 1420 for segment 2 is also newly constructed based on the changed attributes of segment 2.

As described above and below, a render file that contains the rendered result for a segment is kept for future use even after the segment is modified and re-rendered. As shown at stage 1410, the render file 1415 is not removed from the render results repository 1425 even though segment 2, which the render file 1415 contains the rendered result for, has been modified by adding media clip C.

Figure 15:
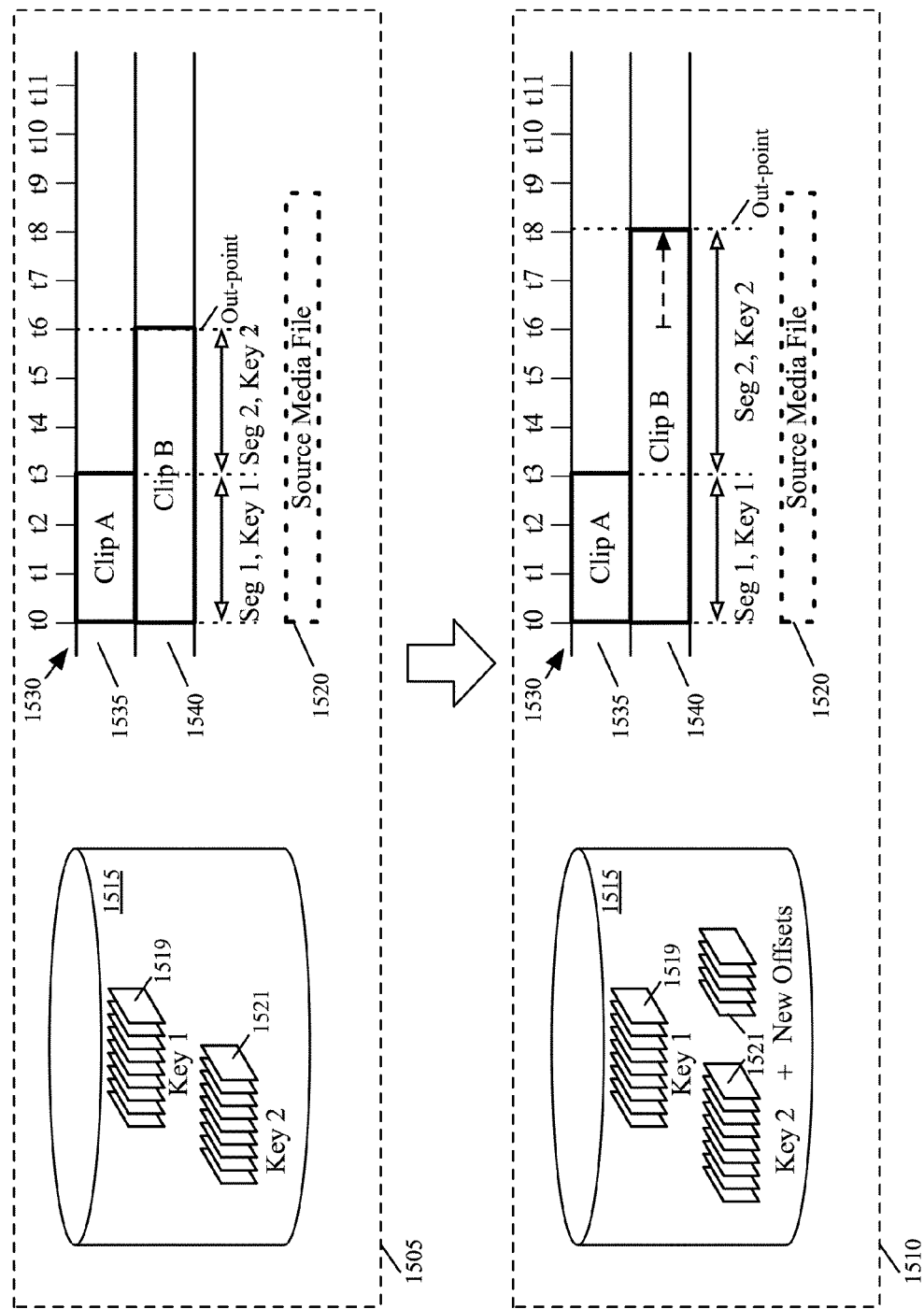
FIG. 15 conceptually illustrates a segment that receives an edit that does not result in changing the key for the rendered frames for the segment.

FIG. 15 conceptually illustrates changes to attributes of a segment of a media presentation. Specifically, this figure illustrates in two stages 1505 and 1510 that changes to some attributes of a segment do not require re-rendering a portion of the segment that was not affected by the changes. One such attribute of a segment is the out-point of a media clip in the segment.

As shown, FIG. 15 illustrates a rendered results repository 1515 and a composite display area 1530. The repository 1515 stores the rendered results for the segments in the media presentation. The composite display area 1530 is similar to the composite display area 800 described above by reference to FIG. 8. The composite display area 1530 includes track 1535 and 1540. The composite display area 1530 displays a portion of the media presentation which includes media clips A and B. FIG. 15 also illustrates a source media file 1520. As described above, a media clip represents a portion of the media content in the source media file. The source media file 1520 is not part of the media presentation nor is it displayed in the composite display area 1530. The source media file 1520 is nevertheless illustrated in this figure in order to show which portion of the source media file is being represented by the media clip B as the media clip B is being edited.

At stage 1505, the media clip A spans the track 1535 from time t0 to time t3. The media clip B spans the track 1540 from time t0 to time t6. Segment 1 spans from time t0 to time t3, which are the in-points of the media clip A (or B) and the out-point of the media clip A, respectively. Segment 2 spans from time t3 to time t6, which are the out-point of the media clip A and the out-point of the media clip B, respectively.

The media clip B represents a portion of the source media file 1520 which is about six time-units long. As shown, the source media file 1520 has about three-time-units length of media content beyond the current out-point of the media clip B.

Segments 1 and 2 have been rendered. A render file 1519 contains the rendered result for segment 1. A render file 1521 contains the rendered result for segment 2.

At stage 1510, the media clip B's end point has been extended from time t6 to time t8 to cover two more time-units' length of the media content in the source media file 1520. A user has dragged the left edge of the media clip A from time t6 to time t8. Extending the end point of the media clip B does not affect the rendered results for segments 1 and 2 because the media content represented by the two segments from time t0 to time t6 are not changed. The render file 1519 associated with key 1 is used again as the rendered result for segment 1.

In some embodiments, the two-time-unit's length of the media content now additionally represented by media clip B does not make another separate segment. Instead, segment 2 now spans from time t3 to time t8. In other embodiments, a new third segment that spans from time t6 to time t8 is created. Whether or not a new segment is created, the media content represented in the time period from t3 to t8 share the same set of attributes. For example, the same media clip makes up the time period. As such, the render file 1521 will contain an additional rendered result for the two time-units' length of the media content. This additional rendered result, which is a set of additional frames, will be identified by the offsets of the frames within the render file 1521. In this manner, when the out-point of a media clip has been extended, no new render file or new key are needed.

Constructing a new key for a segment in some embodiments requires generating a new render file because a key uniquely identifies a render file. Using the out-point of a media clip in a segment as an attribute to compute a key requires an unnecessary new render file. The re-rendering would be unnecessary because the out-point of a media clip do not affect the frames in the existing render file for the segment. To avoid unnecessary re-rendering of a segment, some embodiments use the start of the source media file and the relative in-point of a media clip instead of an out-point of the media clip in computing a key that identifies a render file for the segment.

Figure 16:
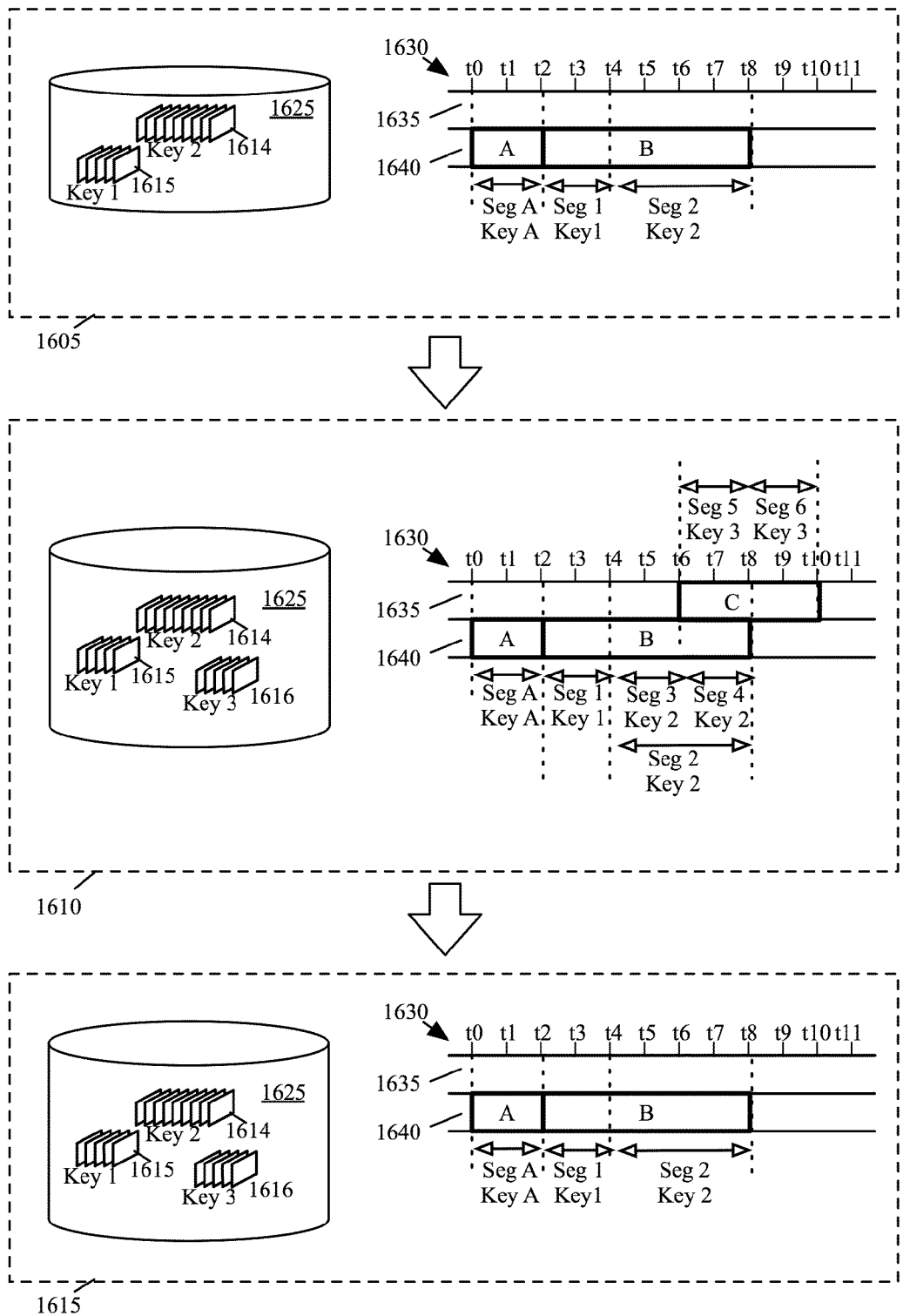
FIG. 16 conceptually illustrates a segment that receives an edit that involves overlaying a composed media clip on another media clip.

FIG. 16 illustrates reusing render files to avoid re-rendering segments in a media presentation by a media-editing application. Specifically, this figure illustrates a rendered results repository 1625 and a composite display area 1630 to show that an edit made to the media presentation creates several new segments and the render files for the existing segments can be reused after another edit is made to the media presentation. As shown, the composite display area 1630 includes two tracks 1635 and 1640. The composite display area 1630 is similar to the composite display area 800 described above by reference to FIG. 8.

As discussed above, the media-editing application of some embodiments divides a single media clip into multiple segments. The media-editing application in these embodiments divides a composed media clip or an imported media clip into multiple segments based on the media clips within the composed media clip or an imported media clip. The media-editing application in these embodiments also divides a single media clip into multiple segments based on the in- and out-points of other media clips falling in the time period of the media presentation occupied by the single media clip.

In some such embodiments, the media-editing application defines more segments based on the segments defined within the single media clip. For instance, the media-editing application first defines three segments within a single media clip and then defines the time period occupied by the first two segments as a new segment. Further, the media-editing application may define all three segments within the single media clip as one segment.

At stage 1605, media clip A spans track 1640 from time t0 to time t2. Media clip B is a composed media clip that includes two media clips. The first of the two media clips spans from time t2 to time t4 and the second clip spans from time t4 to time t8.

A presentation segmentor (not shown) of the media-editing application divides the media clips A and B into segments. The segmentor defines media clip A as segment A. The segmentor divides media clip B into two segments 1 and 2. Segment 1 represents the first media clip in the composed media clip B and segment 2 represents the second media clip in the composed media clip B. In some embodiments, the presentation segmentor defines a composed clip as a single segment without taking into account the media clips inside the single composed media clip. For instance, the composed media clip B would be defined as a single segment in some such embodiments.

A key generator (not shown) of the media-editing application generates a key for each defined segment. The generator generates key A for segment A. For segments 1 and 2, the key generator generates different keys because they are two different media clips within a composed clip.

A background-rendering module (not shown) renders segments 1 and 2 and stores the render files 1614 and 1615 that contain the rendered results for segments 1 and 2, respectively, in the rendered results repository 1625. The background-rendering module chose not to render segment A yet.

At stage 1610, the media presentation receives an edit, which adds media clip C to the portion of the media presentation displayed in the composite display area 1630. The media clip C spans track 1635 from time t6 to time t10. The in-point of media clip C at time t6 falls in the time period occupied by the media clip B. The segmentor divides segment 2 into two segments (segments 3 and 4) at the in-point of the media clip C. The out-point of the media clip B falls in the time period occupied by the media clip C. The segmentor divides the media clip C into two segments 5 and 6 at the out-point of the media clip B. The segmentor may also define the media clip C as a single segment. In some embodiments, the segmentor may not define the segments 4 and 5 as separate segments that fall in the time period from time t6 to time t8. Instead, the segmentor in these embodiments defines a segment that contains the composite media content of the media clips B and C for that time period.

The key generator generates a key for each of the new segments defined by the segmentor. A key generated for segment 3 is the same as the key (i.e., key 2) for segment 2 because segments 3 and 2 are segmented from the second media clip in the composed media clip B. That is, segment 3 is a segment that results from pulling in the out-point of the second media clip from t8 to time t6 and segment 2 is a segment representing the second media clip before pulling in the out-point. For segment 4, the key generator generates the same key as the key for segment 3 because segments 3 and 4 are divided from the same media clip (i.e., the second media clip in the composed media clip B). The key generator generates the same key for segments 5 and 6 because these two segments are divided from the same media clip (i.e., media clip C).

The background-rendering module renders segment 5 and stores the render file 1616 that contain the rendered result for segment 5 in the rendered results repository 1625. As shown, the render file 1614 for segment 2 has not been removed from the repository 1625 even though segment 2 is divided into two segments 3 and 4.

At stage 1615, the media presentation receives another edit which removes media clip C from the portion of the media presentation displayed in the composite display area 1630. As a result, the portion of the media presentation is back to what it was at stage 1605. That is, media clip B is segmented into segments 1 and 2. When the background-rendering module determines to render segment 2, the render file 1614 that contains the render result for segment 2 is reused.

Having described dividing a media presentation into segments and generating keys for the segments, the following Section III describes how background-rendering operations are performed to background-render the segments.

III. Background Rendering

As described above, the media-editing application includes several background-rendering modules. These modules automatically render segments of a media presentation in the background of a system on which the media-editing application is being executed. By performing rendering in the background, the background-rendering modules produce rendered results for the segments. That is, the modules pre-generate playable media output data (e.g., composite video frames or audio samples) of the media presentation without interrupting other operations (e.g., editing operations, etc.) of the media-editing application. As such, the users can continue on interacting with the media presentation using the media-editing application without being interrupted.

The background-rendering modules in some embodiments include a first background-rendering module and a second background-rendering module. The first background-rendering module determines a prioritized order in which the segments are to be rendered.

The second background-rendering module renders the segments of each category in the prioritized order that is determined by the first background-rendering module. That is, the second background-rendering module renders the segments in the highest priority category first and moves on to the lower priority categories of segments. The second background-rendering module produces the rendered result for a segment from the data that specify how the media content of the segment of the media presentation should be presented.

A. Overview

Figure 17:
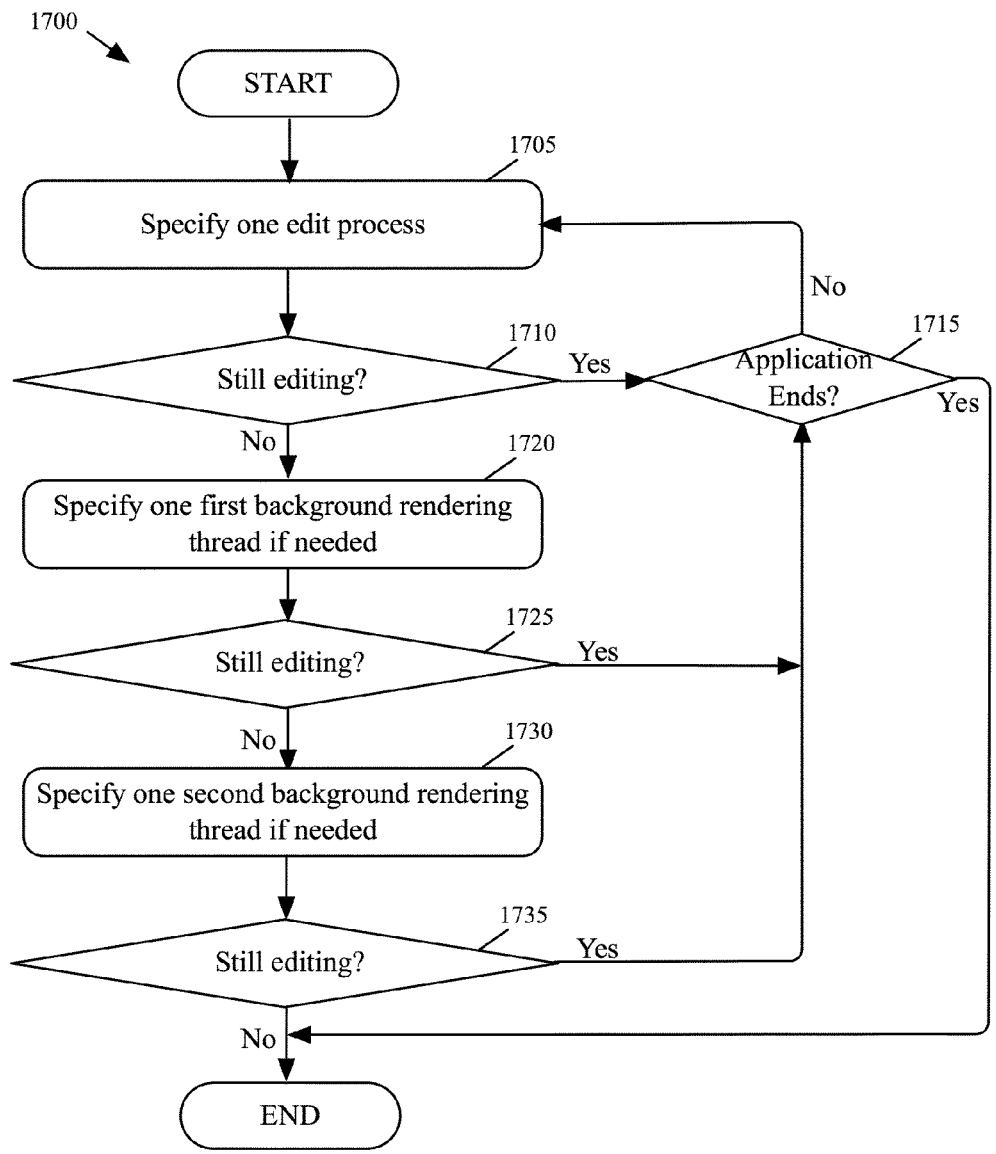
FIG. 17 illustrates a conceptual process that some embodiments use to place instructions in the prioritized queues in accessing computing resources.

FIG. 17 conceptually illustrates a process 1700 that some embodiments use to place instructions for edit operations and background-rendering operations in instruction queues. Specifically, this process illustrates that the edit operation takes precedence over the background-rendering operations. Process 1700 starts when a user makes edits to a media presentation using a media-editing application.

The process begins by specifying (at 1705) one edit process. An edit process is a multithreaded process. Each thread includes a series of instructions or operations. By specifying an edit process, the process places a series of instructions into one or more instruction queues in some embodiments. These instructions are carried out by processing units such as a central processing unit (CPU) or a graphics processing unit (GPU). As the instructions are carried out by the CPU or GPU, the edits that the user makes are applied to a project data model that represents the media presentation the user is editing.

The edits involve modifying the project data model. These edits include, for example, putting an effect over a time period along the timeline of the media presentation, adding or removing media clips from the media presentation, shortening or lengthening media clips or effects, moving media clips along the timeline or into different tracks, etc.

Although it is named "edit" process, the edit process in this figure is not limited to the edits that the user is making using the media-editing application. That is, the edit process in this figure also relates to any other user operations that do not involve modifying the project data model. Such operations include user activities with the media presentation such as previewing operations (e.g., skimming or playing back), which require conversion of the project data model into displayable frames without modifying the project data.

Next, process 1700 determines (at 1710) whether the media presentation is being edited. That is, the process determines whether the user is still interacting with the media presentation using the media-editing application. The process detects user activities with the media presentation by receiving user inputs to the media-editing application. Some example user inputs may include dragging and dropping a media clip into one of the tracks along the timeline of the media presentation. When the process determines (at 1710) that the media presentation is not being edited, the process proceeds to 1720 which will be described further below.

When the process determines (at 1710) that the media presentation is being edited, the process determines (at 1715) whether the media-editing application ends. The process in some embodiments detects the application's being closed by receiving a signal with such indication. When the process determines that the media-editing application is ending, the process ends. Otherwise, the process loops back to 1705 to place another series of edit instructions in the queue(s).

When the process determines (at 1710) that the media presentation is not being edited, the process specifies (at 1720) one first background-rendering thread if it is necessary. By specifying a first background-rendering thread, the process places a series of instructions into one or more instruction queues in some embodiments. These first background-rendering threads of instructions are for operations performed by a background-rendering module such as the first background-rendering module 605 described above by reference to FIG. 6. As described above, such operations include generating segment keys for the segments in the media presentation, grouping segments into different categories, prioritizing the categories, updating a list of segments, etc. A first background-rendering thread is specified only if it is necessary. That is, if there are no first background-rendering operations to perform, nothing will be placed in the instruction queue(s). A first background-rendering thread need not be specified in some embodiments when the user's edits do not result in modifying any portion of the media presentation.

Process 1700 then determines (at 1725) whether the media presentation is being edited. When the process determines (at 1725) that the media presentation is not being edited, the process proceeds to 1730 which will be described further below.

When the process determines (at 1725) that the media presentation is being edited, the process determines (at 1715) whether the media-editing application ends. When the process determines that the media-editing application is ending, the process ends. Otherwise, the process loops back to 1705 to place another series of edit instructions in the queue(s).

When the process determines (at 1725) that the media presentation is not being edited, the process specifies (at 1730) one second background-rendering thread if it is necessary. By specifying a second background-rendering thread, the process places a series of instructions into one or more instruction queues in some embodiments. These second background-rendering thread of instructions are for operations performed by a background-rendering module such as the second background-rendering module 635 described above by reference to FIG. 6. As described above, second background-rendering operations include finding segments in different priority categories and rendering segments in each category in a prioritized order, etc. A second background-rendering thread is specified only if it is necessary. That is, if there are no second background-rendering operations to perform, nothing will be placed in the instruction queue(s).

Process 1700 then determines (at 1735) whether the media presentation is being edited. When the process determines (at 1735) that the media presentation is not being edited, the process ends. Otherwise, the process determines (at 1715) whether the media-editing application ends. When the process determines that the media-editing application is ending, the process ends. Otherwise, the process loops back to 1705 to place another series of edit instructions in the queue(s).

One of ordinary skill in the art will recognize that process 1700 is a conceptual representation of the operations used to specify editing and background-rendering instructions. The specific operations of process 1700 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, process 1700 may perform the operations 1720 and 1730 concurrently in order to treat the first and second background-rendering threads equally when placing the instructions in the queue(s).

Figure 18:
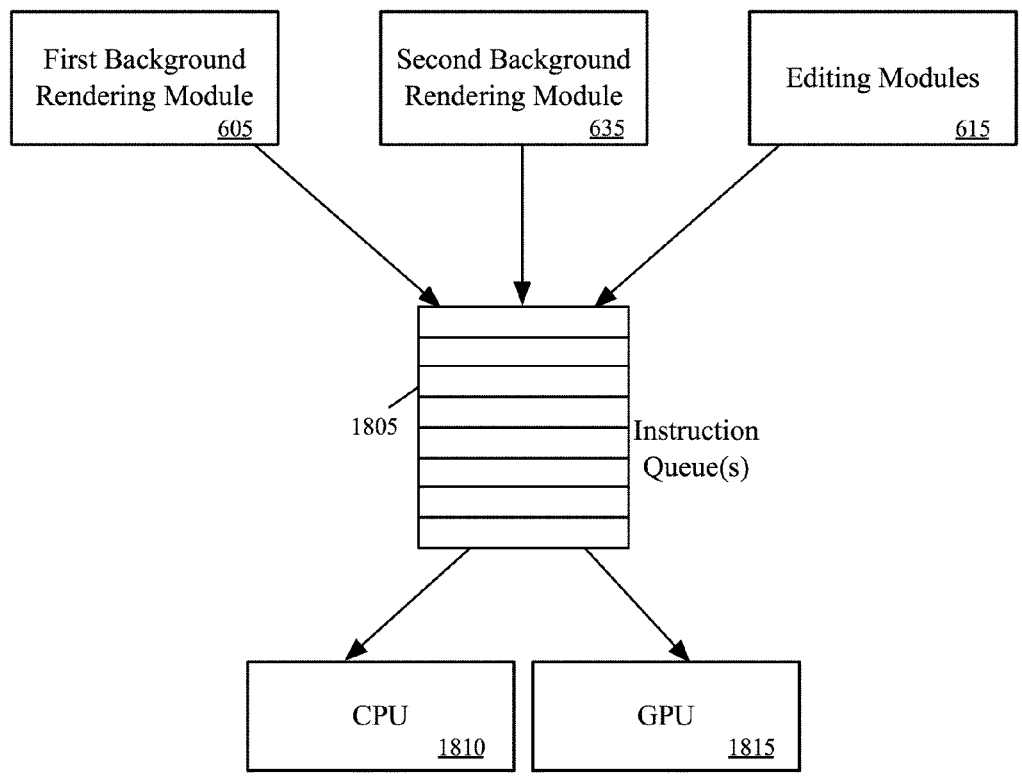
FIG. 18 conceptually illustrates instruction queues into which modules of the media-editing application put instructions.

FIG. 18 illustrates the instruction queues which a media-editing application of some embodiments uses. Specifically, this figure illustrates that these instruction queues distribute the instructions to the processing units such as a CPU or a GPU so that the processing units carry out these instructions. FIG. 18 illustrates the first background-rendering module 605, the second background-rendering module 635, the editing modules 615, instruction queue(s) 1805, a CPU 1810, and a GPU 1815.

The first and second rendering modules 605 and 635 and the editing modules 615 are described above by reference to FIG. 6. These modules place their operational instructions into one or more instruction queues 1805 in a similar manner described above by reference to FIG. 17. In some embodiments, these modules are running simultaneously. That is, the modules use the instruction queue(s) together to place the instructions. However, the instructions from the editing modules 615 take precedence over the instructions from the first and second background-rendering modules 605 and 635 in some embodiments. By taking precedence, the instructions from the editing modules 615 are carried out by the processing units 1810 and 1815 before the instructions from the background-rendering modules are carried out. As such, the background-rendering operations are deemed paused when there are editing or user operations to perform.

Different embodiments implement these instruction queue(s) differently. For instance, some embodiments have a normal priority queue and a low priority queue. The instructions from the background-rendering modules are placed in the low priority queue. The normal priority queue receives instructions from the editing modules. The instructions placed in the low priority queue are not carried out until all instructions in the normal priority queue are carried out by the processing unit(s).

Figure 19:
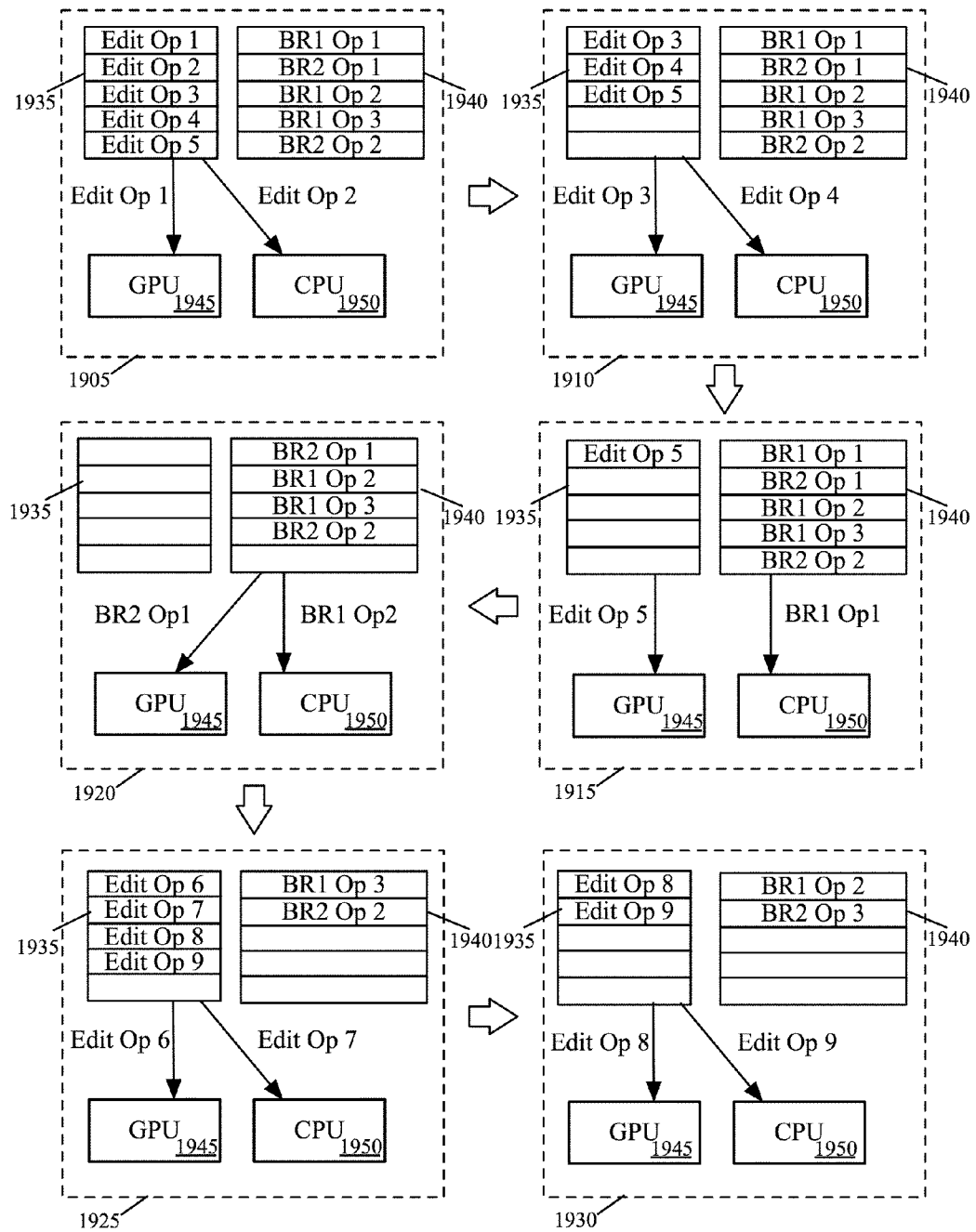
FIG. 19 illustrates example instruction queues at several stages to show instructions are processed in a prioritized order.

FIG. 19 illustrates instruction queues that some embodiments use to carry out editing and background-rendering instructions. Specifically, this figure illustrates two instruction queues 1935 and 1940 at six different stages 1905-1930 to show that the editing instructions are carried out before background-rendering instructions.

Queue 1935 is a normal priority queue and queue 1940 is a low priority queue. As described above, the instructions placed in a low priority queue are not carried out by the processing units until all the instructions placed in normal priority queue are carried out first. The queues 1935 and 1940 may have more than five instructions, but the queues are depicted to have five entries each for simplicity. "Edit Op 1" denotes a first edit instruction or operation from editing modules (not shown) of a media-editing application. "BR1 Op 1" denotes a first instruction from a first background-rendering module. "BR2 Op 1" denotes a first instruction from a second background-rendering module. The instructions placed in the queues are carried out by the processing units, CPU 1945 and GPU 1950.

At stage 1905, the first five edit instructions are in the normal priority queue 1935. The low priority queue 1940 holds the first five background-rendering instructions. The first and second edit operations, which are on top of the queue, are then being carried out by the GPU 1940 and the CPU 1950, respectively.

At stage 1910, the third, fourth, and fifth edit instructions have moved up in the queue 1935. The five background-rendering instructions are still in the queue 1940 without being carried out yet because the normal priority queue 1935 still holds edit instructions to be carried out. The third and fourth edit instructions are then being carried out by the GPU 1945 and the CPU 1950, respectively.

At stage 1915, the fifth edit instruction has moved up in the queue 1935. The background instructions are in the queue 1940. The first background-rendering instruction from the first background-rendering module is on top of the queue 1940. The fifth edit instruction is then being carried out by the GPU 1945. As there are no other edit instructions in the normal priority queue 1935 to be carried out, the background instruction that is on top of the queue 1940 is then carried out by the CPU 1950.

At stage 1920, the normal priority queue 1935 is empty. The background-rendering instructions have moved up in the low priority queue 1940. The first instruction from the second background-rendering module and the second instruction from the first background rending module are on top of the queue 1940. These two background-rendering instructions are then being carried out by the GPU 1945 and the CPU 1950, respectively.

At stage 1925, the editing module has placed four more instructions into the normal priority queue 1935. The two remaining background-rendering instructions have moved up in the low priority queue 1940. However, because now there are edit instructions in the normal priority queue 1935, the background-rendering instructions will not be carried out until those newly placed edit instructions are carried out first. As such, the sixth and seventh edit instructions, which are on top of the normal priority queue 1940, are being carried out by the GPU 1945 and the CPU 1940, respectively.

At stage 1930, the eighth and ninth editing instructions have moved up in the normal priority queue 1935. These two edit instructions are then carried out by the GPU 1945 and the CPU 1950. The two remaining background-rendering instructions will not be carried out at this stage.

B. First Background-Rendering Operations

As described above, the media-editing application of some embodiments divides a media presentation into segments along the timeline. The application then identifies which segments need rendering and determines an order in which those segments are to be rendered. The application renders the segments in the determined order. The application performs rendering operations without having them interrupt other operations (e.g., editing operations) that it performs.

As described above, when a media presentation is divided into segments along the timeline, a background-rendering module determines an order in which the segments are rendered. In some embodiments, a background-rendering module such as the first background-rendering module 605 groups the segments into prioritized categories to determine the rendering order.

Figure 20:
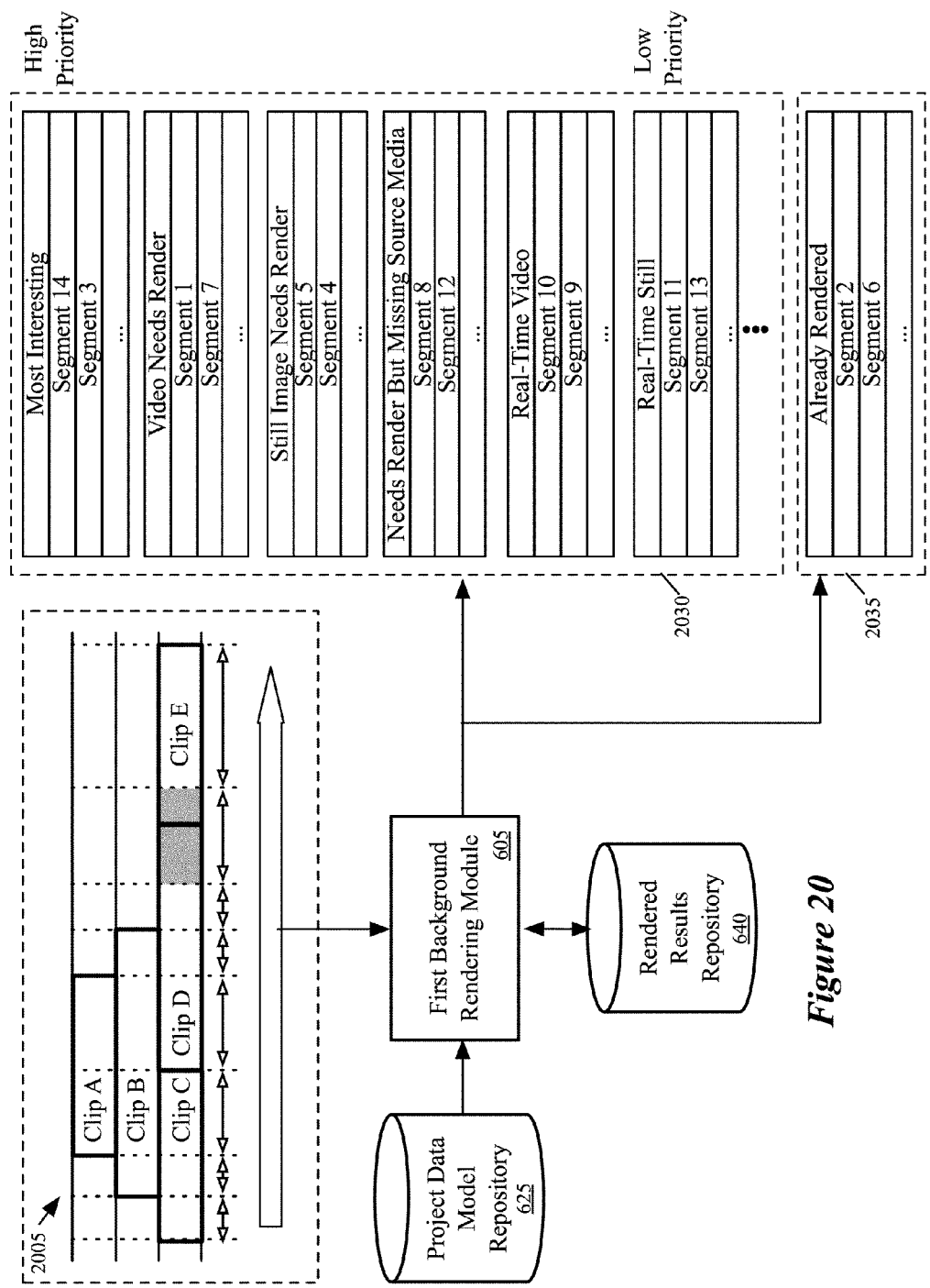
FIG. 20 conceptually illustrates a background-rendering module that groups the segments of a media presentation into prioritized categories.

FIG. 20 conceptually illustrates grouping segments in a media presentation into categories that are prioritized. Specifically, this figure illustrates how a background-rendering module traverses the timeline of the media presentation in order to group the segments into the prioritized categories. As shown, FIG. 20 illustrates a composite display area 2005, the first background-rendering module 605, the project data model repository 625, the rendered results repository 640, and the segment categories 2030 and 2035.

The composite display area 2005 is similar to the composite display area 800 described above by reference to FIG. 8. The composite display area 2005 displays a portion of the media presentation. This portion of the media presentation is divided into multiple segments. Only this portion of the media presentation is depicted in this figure for simplicity. Other portions of the media presentation that are not displayed in the composite display area 2005 are divided into segments.

The first background-rendering module 605 traverses the timeline of the media presentation in one direction (e.g., chronological direction) and categorizes each segment. In some embodiments, the first background-rendering module 605 receives a list of segments arranged in a chronological order. The module 605 then retrieves the corresponding portion of the project data model for each segment from the project data model repository 625. The module analyzes the corresponding portion for the segment in order to generate a key for that segment and to categorize the segment based on some of its attributes.

The first background-rendering module 605 generates a key for each segment. As described above, this key is based on a set of attributes of the segment and is used to identify a render file that contains the rendered result for that segment. Some example key generating operations by a first background-rendering module is described above by reference to FIG. 6.

The attributes of a segment that are used to categorize the segment are only a subset of the attributes that are used for generating a key for that segment in some embodiments. The subset of the attributes includes (1) the computational cost of rendering the segment, (2) whether the media content represented by the segment is in a still image or a video, (3) whether the source media files for the media clips in the segment are present, (4) whether a user wishes to render the segment before other segments, and (5) whether the segment already has a render file. These attributes are described in more details below.

The computational cost of rendering a segment is evaluated based on the amount of computational resources required to produce the rendered result for the segment. For instance, a segment that has an effect (e.g., blurring effect) applied to it may require more computing resources to render than another segment that does not have any applied effect. A segment that represents a still image has a set of the same frames in the rendered result when the segment is rendered. That is, the frames in the rendered result do not have to be different frames because when the segment is played back, a single image is going to be displayed for a particular time period of the media presentation occupied by the segment. In contrast, a segment that represents a video has different frames in the rendered result for the segment when the segment is rendered.

The source media files for the media clips in the segment may be missing when the source media files that contain the media content represented by the media clips are not accessible by the media-editing application. Such cases occur, for example, when a disk drive that stores the source media files are detached from the system on which the media-editing application executes. A segment has a render file when a render file that contains the rendered result for the segment exists in the rendered results repository 640.

As shown in the segment categories 2030 and 2035, some example categories include "most interesting", "video needs render", "still image needs render", "needs render but missing source media", "real-time video", "real-time still", and "already rendered". The "already rendered" category includes those segments that have render files. That is, the rendered results for these segments are already stored in the rendered results repository 640. All other categories include the segments that need rendering or do not have render files.

The "most interesting" category includes the segments that the user wishes to render before other segments. In some embodiments, the user can specify which segment to render first by clicking a mouse button or tapping a touchscreen to select a user interface (UI) item, selecting an option through keyboard input, etc. When the user zooms in a particular time period of a media presentation, the segments in that particular time period may also be specified as the segments to render first.

In the "video needs render" category, the segments that represent video are included. In the "still image needs render" category, the segments that represent a still image are included. The "needs render but missing source media" category includes those segments that need to be rendered (i.e., the segments cannot be played back in real-time) but the source media files for the media clips in the segments are not accessible. The "real-time video" category includes the segments that represent video and do not need rendering because they can be played back in real-time. Similarly, the "real-time still" category includes the segments that represent a still image and do not need rendering.

As described above, these categories are prioritized based on some attributes of the segments in each category. The segments in the highest priority category are rendered before any segments in other lower categories are rendered. The attributes that are used to prioritize the categories are the same attributes that are used to categorize the segments. In some embodiments, those segments that the user wishes to render first are given the highest rendering priority.

For the segments that represent video and the segments that represent still images, a category that includes the former segments is given a higher priority than a category that includes the latter segments. As such, the "video needs render" category is prioritized higher than the "still image needs render" category. Similarly, the "real-time video" category is prioritized higher than the "real-time still" category. The rationale for giving higher priority to a video-representing category is that such segment is more sensitive than a still-image-representing category. That is, when both categories are not rendered yet but were to be played back, the dropped frames that are failed to be played back from a video-representing segment in real-time are more conspicuous than those dropped frames that are failed to be played back from a still-image-representing segment.

The "needs render but missing source media" category is prioritized lower than other categories that need rendering because the segments in this category cannot be rendered. This is because the source media files that are represented by the media clips in the segments are missing and therefore cannot provide the media content needed for rendering the segments.

The operation of the first background-rendering module 605 will now be described. The module 605 receives a list of segments arranged in chronological order within a media presentation from a segmentor module (not shown). The first background-rendering module 605 then goes through each segment in the list. The module 605 first retrieves the attributes of the segment from the project data model that is stored in the project data model repository 640. Based on some attributes of the segments, the module 605 groups the segments into different categories. For each segment, the module 605 first checks whether a render file that can be used for the segment exists in the rendered results repository 640.

The module 605 finds render files for segments 2 and 6 in the repository 640 and put these two segments into the "already rendered" category. The module 605 put segments 14 and 3 in the "most interesting" category because the project data model in some embodiments includes the data indicating the user's wish to render these segments first. The module put segments 1 and 7 in the "video needs render" category because segments 1 and 7 cannot be played back in real-time and do not have render files in the repository 640 yet. Segments 8 and 12 are placed in the "needs render but missing source media" because the source media files represented by the media clips in these two segments are not accessible by the media-edit application. The module 605 put segments 10 and 9 in the real-time video category because these two segments represent video that can be played back in real-time. Finally, the module 605 puts segments 11 and 13 in the real-time still category because these two segments represent still images that can be played back in real-time by the system that the media-editing application is being executed on. In some embodiments, the first background-rendering module 605 accesses the computing resources to figure out whether a segment can be rendered in real-time.

Figures 21, 22:
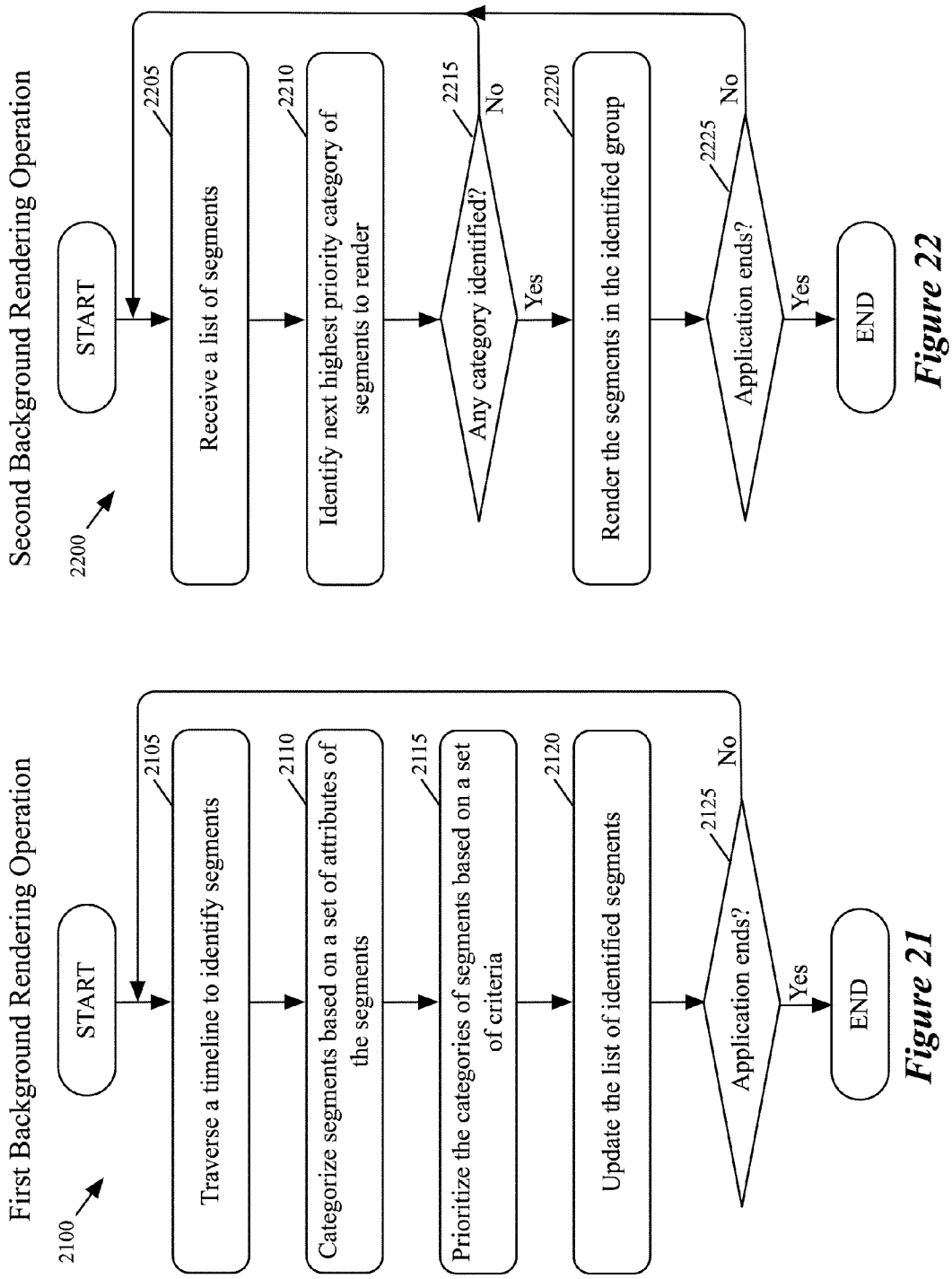
FIG. 21 illustrates a conceptual process that some embodiments use to group the segments of a media presentation into prioritized categories.
FIG. 22 illustrates a conceptual process that some embodiments use to render segments in a prioritized order.

FIG. 21 illustrates a conceptual process 2100 that some embodiments use to place segments in a media presentation into different categories and to prioritize the categories. Process 2100 is performed by a media-editing application. More specifically, the process in some embodiments is performed by a first background-rendering module such as the first background-rendering module 605 described above by reference to FIGS. 6 and 20. The process in some embodiments starts when a certain amount of time (e.g., one to ten seconds) elapses after a user of the media-editing application stops interacting with the media presentation.

Process 2100 begins by traversing (at 2105) a timeline of a media presentation to identify segments. In some embodiments, the process identifies the segments by defining the segments based on (1) in- and out-points of the media clips in different tracks of the media presentation and (2) starts and ends of effects applied to the media presentation. The process builds a list of segments that it defined. Instead of defining the segments, the process in other embodiments receive a list of segments from a segmentor module such as the segmentor module 620 described above by reference to FIG. 6. As the process identifies the segments in the media presentation, the process also generates a key for each segment based on some attributes of the segment. As described above, this key is used to identify a render file that contains the rendered results for the segment. The process associates the generated keys with the segments.

Next, the process categorizes (at 2110) each segment based on a set of attributes of the segment. This set of attributes is a subset of the attributes that are used to generate the key for the segment. Some example attributes in this set is described above by reference to FIG. 20. The process checks whether there is a render file for the segment. The segment is categorized as a segment that is already rendered when a render file for the segment exists.

Process 2100 then prioritizes (at 2115) the categories based on a set of criteria. The process in some embodiments assigns the highest priority to the category that contains the segments that a user of the media-editing application wishes to render before other segments. The process assigns a higher priority to a category that represents video than a category that represents a still image. The process assigns lower priorities to categories that contain segments that do not need rendering and do not have render files. The segments in these categories can be played back in real-time by the system on which the media-editing application is executing. These segments have no render files. In some embodiments, the process prioritizes only the categories that include segments that need rendering or do not have render files yet. That is, the process assigns no priority to the categories that contain segments for which render files already exist.

Next, process 2100 updates (at 2120) the list of the identified segments. The process updates the list by associating each segment in the list with the category and priority information and a render status of the segment. This updated list of segments will be used when the segments are rendered.

The process then determines (at 2125) whether the media-editing application ends. The process in some embodiments detects the application being closed by receiving a signal with such indication. When the process determines that the media-editing application is ending, the process ends. Otherwise, the process loops back to 2105 to traverse the timeline of the media presentation again to identify segments.

One of ordinary skill in the art will recognize that process 2100 is a conceptual representation of the operations used to identify segments in a media presentation, categorize the segments, and prioritize the categories. The specific operations of process 2100 may not be performed in the exact order shown and described. The specific operations may not be performed in one continuous series of operations, and different specific operations may be performed in different embodiments. Furthermore, the process could be implemented using several sub-processes, or as part of a larger macro process.

For instance, in some embodiments, process 2100 may perform the operations 2110 and 2115 as the process is traversing the timeline at 2105. In other embodiments, the process may separately traverse the timeline of the media presentation for categorizing and prioritizing.

C. Second Background-Rendering Operations

Once the order in which the segments in a media presentation are to be rendered is determined, a background-rendering module such as the second background-rendering module 635 described above by reference to FIG. 6 renders the segments in that order.

FIG. 22 illustrates a conceptual process 2200 that some embodiments use to render segments in a media presentation. The process is performed by a media-editing application. More specifically, the process in some embodiments is performed by a second background-rendering module such as the second background-rendering module 635 described above by reference to FIG. 6. The process in some embodiments starts when a certain amount of time (e.g., one to ten seconds) elapses after a user of the media-editing application stops interacting with the media presentation.

Process 2200 begins by receiving (at 2205) a list of segments. This list contains the segments in the media presentation. Different embodiments implement the list of segments differently. For instance, each segment in the list in some embodiments is associated with the information about a category that the segment belongs to and the priority that is given to that category. In other embodiments, the segments are listed by the categories that the segments belong to.

Next, the process identifies (at 2210) segments in the next highest priority category that need rendering. The process may go through the list and check the information about the category that each segment belongs to. Or, the process may find the segments that are grouped together under the next highest priority category. The process also checks the render status of each segment in the category. When all of the identified segments are rendered, the process moves onto the next highest priority category until a category that includes segments that need rendering but have not been rendered is found.

The process then determines (at 2215) whether any category of segments to render is identified. When all of the segments in all categories are already rendered, there is no category of segments to render. When the process determines (at 2215) that there is no category of segments to render, the process loops back to 2205 to receive a list of segment which may include the segments that have been newly defined based on the edits made to the media presentation in the mean time. Otherwise, the process renders (at 2220) the segments in the identified category. As mentioned above, rendering involves producing a set of frames for each segment. The frames will be displayed when the segment is played back. The process renders the segments in the identified category in an order that is based on a set of criteria. For instance, the process may render the segments in their chronological order within the media presentation.

The process then determines (at 2225) whether the media-editing application ends. The process in some embodiments detects the application being closed by receiving a signal with such indication. When the process determines that the media-editing application is ending, the process ends. Otherwise, the process loops back to 2205 to receive a list of segments in the media presentation.

One of ordinary skill in the art will recognize that process 2200 is a conceptual representation of the operations used to identify segments in a media presentation, categorize the segments, and prioritize the categories. The specific operations of process 2200 may not be performed in the exact order shown and described. The specific operations may not be performed in one continuous series of operations, and different specific operations may be performed in different embodiments. Furthermore, the process could be implemented using several sub-processes, or as part of a larger macro process.

Figure 23:
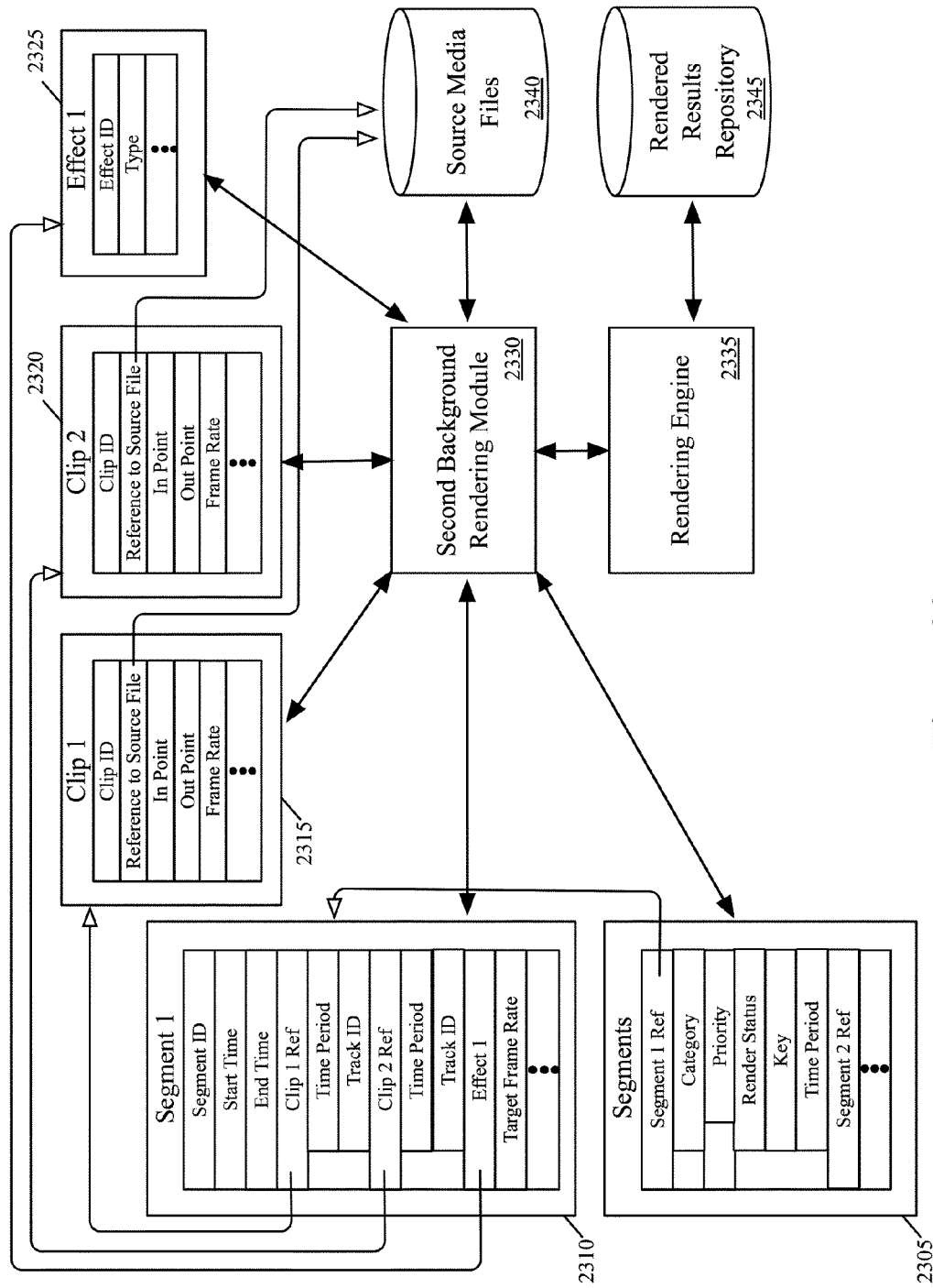
FIG. 23 illustrates example data structures of project data and background-rendering modules that render frames from the data.

FIG. 23 conceptually illustrates data structures for media clips, effects, segments, and list of segments. Specifically, this figure illustrates how a background-rendering module uses these data structures to render segments in a media presentation. As shown, FIG. 23 illustrates a data structure 2305 for a list of segments, a data structure 2310 for a segment, data structures 2315 and 2320 for media clips, and a data structure 2325 for an effect. The figure also illustrates a second background-rendering module 2330, a rendering engine 2335, a source media files repository 2340, and a rendered results repository 2345.

The data structure 2305 for a list of segments is created and updated by a first background-rendering module in some embodiments. The data structure 2305 includes different pieces of information that define the list of segments. Each segment in data structure 2305 is a reference to a data structure for the particular segment. For example, the reference for segment 1 links to the data structure 2310 for the media clip 1. Under each reference for a segment, the data structure 2305 includes (1) category and priority information for the segment, (2) a render status of the segment, (3) a key for the segment, etc.

The data structure 2310 for a segment is created by a segmentor module such as the segmentor module 620 described above by reference to FIG. 6. The data structure 2310 includes an identifier for the segment and start time and end time of a particular time period of the media presentation that the segment represents. The data structure 2310 also includes one or more media clips and effects. Each media clip in the data structure 2310 is a reference to a data structure for the particular media clip. The reference for the media clip 1 links to a data structure 2315 for the media clip 1. Under the reference for a media clip, the data structure 2310 includes a time period that specifies the particular duration of the media clip that is included in the segment and a track number that identifies the track of the media presentation that the media clip spans. Each effect in the data structure 2310 is a reference to a data structure for the particular effect applied to the segment. The reference for effect 1 links to a data structure 2325 for the effect.

The data structure 2315 for the media clip 1 is created by the media-editing application when the media clip is brought into the media presentation. The data structure 2315 can be updated as the media clip 1 receives user edits. The data structure 2315 includes a clip identifier, reference to a source media file, in-point, out-point, frame rate, etc. The reference to a source media file links to the source media file whose media content is represented by the media clip 1. The source media file for the media clip 1 is stored in a source media files repository 2340.

The data structure 2325 for the effect 1 is created by the media-editing application when an effect is added to a media clip in the media presentation. The data structure 2325 includes an identifier for the effect, the type of effect (e.g., blurring effect), etc.

The second background-rendering module 2330 is similar to the second background-rendering module 635 described above by reference to FIG. 6. The second background-rendering module 2330 uses the information included in the data structure 2305 for a list of segments to find each segment of the media presentation. From the data structure 2310, the module 2330 identifies the media clips and effects in the media clip. The module 2330 finds data corresponding to the segment and the portions of the media clips in the segment from the source media files repository 2340 when rendering the segments.

In some embodiments, the second background-rendering module 2330 directs the rendering engine 2335 to render each segment that it identifies to render. The module 2330 provides to the rendering engine the data necessary for rendering the identified segment and the rendering engine renders the segment. The rendering engine 2335 stores the rendered result (e.g., as a render file) in the rendered results repository 2345.

In some embodiments, the rendering engine is implemented identically as a playback engine such as the playback engine 630 described above by reference to FIG. 8. In these embodiments, the difference between the rendering and playback engines is where to send the processed output from each engine. As described above, a playback engine produces a set of frames for the segment in real-time for playback and sends the produced frames in the set to a display device. In contrast, a rendering engine produces a set of frames for the segment and stores the produced frames in storage for a future playback.

In some embodiments, the playback engine and the rendering ending perform a disk reading operation for the project data model, a decompressing operation of the project data model, and a frame-generating operation for the segment in order to playback or render the media presentation. In some such embodiments, when these two engines schedule these operations to perform, the engines put enough time gaps between these operations. For instance, the engines schedule a disk reading operation a certain amount of time (e.g., 15 milliseconds) ahead of a decompressing operation. The engines schedule the decompression operation a certain amount of time (e.g., 15 milliseconds) ahead of a frame-generating operation. In this manner, the decompression operation does not have to wait for the disk reading operation to complete. The frame-generating operation does not have to wait for the decompression operation or the disk reading operation to complete. This results in a throughput improvement over a conventional approach which synchronously schedules these operations.

Figure 24:
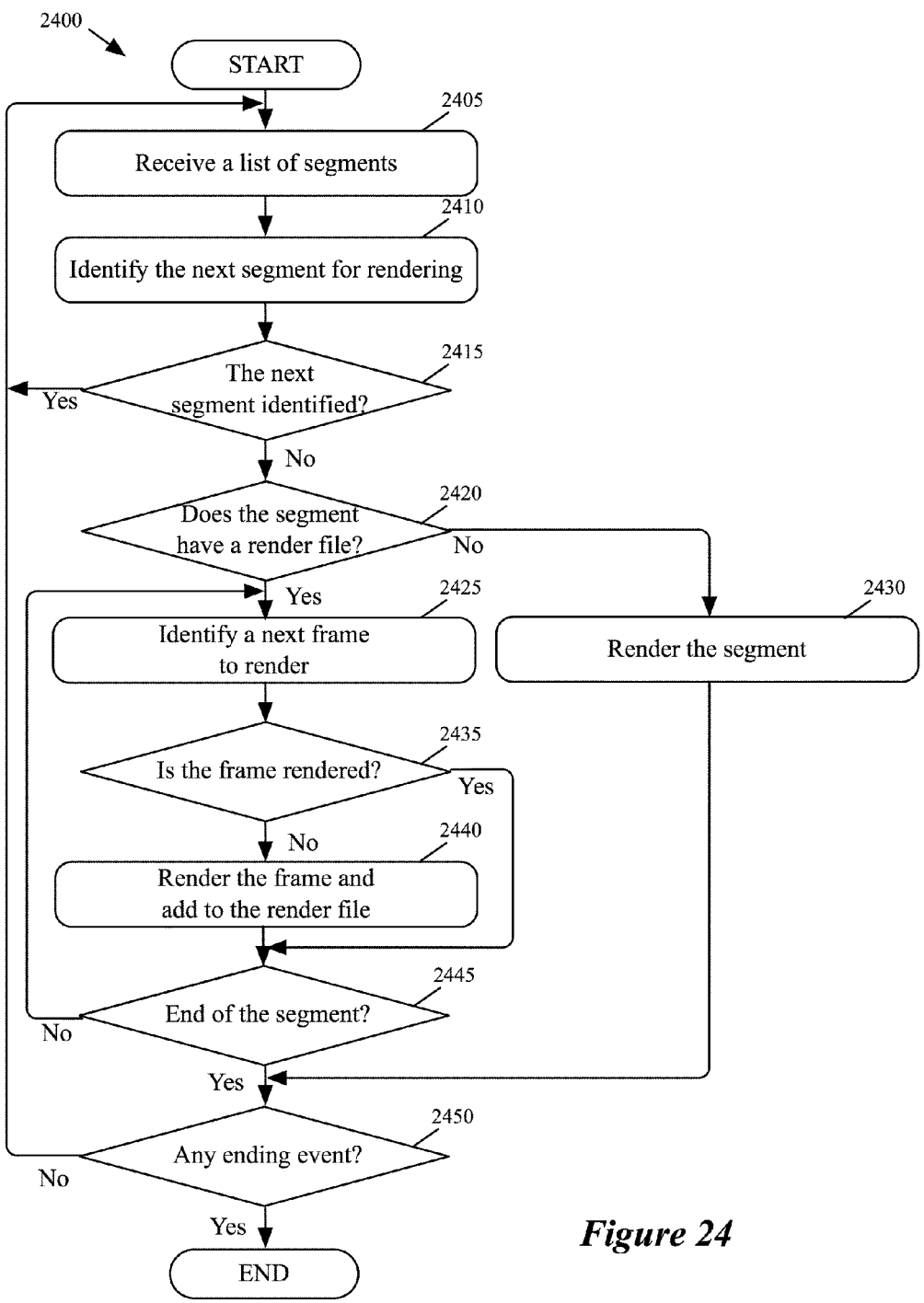
FIG. 24 illustrates a conceptual process that some embodiments use to playback portions of a media presentation.

FIG. 24 illustrates a conceptual process 2400 that some embodiments use to render segments in a media presentation. The process is performed by a media-editing application. More specifically, the process in some embodiments is performed by a second background-rendering module such as the second background-rendering module 635 described above by reference to FIG. 6. The process in some embodiments starts when a certain amount of time (e.g., one to ten seconds) elapses after a user of the media-editing application stops interacting with the media presentation.

Process 2400 begins by receiving (at 2405) a list of segments. This list contains the segments in the media presentation. Different embodiments implement the list of segments differently. For instance, each segment in the list in some embodiments is associated with information about a category that the segment belongs to and the priority that is given to that category. In other embodiments, the segments are grouped based on the categories to which they belong.

Next, the process identifies (at 2410) the next segment for rendering. The process may go through the list and check the information about the category that each segment belongs to. Or, the process may find the segments that are grouped together under the next highest priority category. The process also checks the render status of each segment in the category. In some embodiments, each segment in the list is associated with one of three render statuses. The first render status indicates that the segment is not rendered. That is, the segment does not have a render file. The second render status indicates that the segment is fully rendered. A fully rendered segment has a render file that contains the whole rendered result for the segment. That is, the render file contains all of the frames that are supposed to be produced from the segment. The third render status indicates that the segment is partially rendered. A partially rendered segment has a render file but only a partial rendered result for the segment is in the render file. In other words, the render file does not contain all the frames that are supposed to be produced from the segment. The process in some embodiments identifies a segment that is not rendered or partially rendered as a segment that needs rendering. The process goes through each segment in each category until it finds a segment that needs rendering.

The process then determines (at 2415) whether the next segment for rendering is identified. When the next segment that needs rendering is not identified, it means that all of the segments in the list are fully rendered or do not need rendering. In some embodiments, the process determines all segments are fully rendered or do not need rendering when it reaches the end of the list of segments without identifying a segment that needs rendering. When the process determines (at 2415) that the next segment that needs rendering is not identified, it loops back to 2405 to receive a list of segments in the media application. This list of segments may include the segments that have been newly defined based on the edits made to the media presentation in the mean time.

When the process determines (at 2415) that a segment that needs rendering is identified, the process determines (at 2420) whether the identified segment has a render file. When the identified segment that needs rendering has a render file already, the segment is deemed partially rendered in some embodiments. When the identified segment that needs rendering does not have a render file, the segment is not rendered at all.

When the process determines (at 2420) that the identified segment does not have a render file, the process renders (at 2430) the identified segment. A new render file that contains the rendered result for the segment is generated. Otherwise, the process identifies (at 2425) the next frame to be produced from the segment data, which is a piece of data in the project data model that specifies the segment.

Next, process 2400 determines (2435) whether the identified frame is rendered. That is, the process checks if the identified frame is included in the render file for the segment already. When the frame is found (at 2435) not rendered, the process renders (at 2440) the identified frame data by producing a frame from the segment data and adds the produced frame to the render file for the segment.

The process then determines (at 2445) whether the process has reached the end of the segment. In some embodiments, the process detects the end of the segment when there is no more data for frames that the process has not gone through. When the process determines (at 2445) that the process has not reached the end of the segment, the process loops back to 2425 to identify the next frame in the segment.

When the process determines (at 2445) that the process has reached the end of the segment, the process determines (at 2450) whether there has been an ending event for the process. An example ending event is the media-editing application's being closed. The process in some embodiments detects the application being closed by receiving a signal with such indication. Another example ending event is when the time period that the segment is occupying within the media presentation is modified. Such an ending event may occur when an editing module that processes an edit received by the segment modifies the time period occupied by the segment. When the process determines (at 2450) that there is an ending event, the process ends. Otherwise, the process loops back to 2405 to receive a list of segments.

One of ordinary skill in the art will recognize that process 2400 is a conceptual representation of the operations used to identify segments in a media presentation, categorize the segments, and prioritize the categories. The specific operations of process 2400 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, process 2400 may perform the operation 2440 after each of the operations 2405-2445 in order to determine whether there has been an ending event.

D. Not Interrupting Editing Operations

As described above, the background-rendering operations performed by the background-rendering modules of a media-editing application do not supersede the editing operations performed by the editing modules of the application in some embodiments.

The background-rendering modules avoid superseding the operations of the editing modules by prioritizing themselves lower than the editing modules in using computing resources. The computing resources include central processing units (CPU), graphics processing units (GPU), memories such as random access memories (RAM), data storages, etc.

By prioritizing lower than the editing modules, the background-rendering modules do not take away the computing resources that might be used by the editing modules. In some embodiments, the background-rendering modules use a set of operating system (OS) services to prioritize themselves lower than the editing modules. Instead of, or in conjunction with, using OS services, the background-rendering modules of other embodiments use an internal prioritization scheme of the media-editing application in order to prioritize themselves lower than the editing modules.

Figure 25:
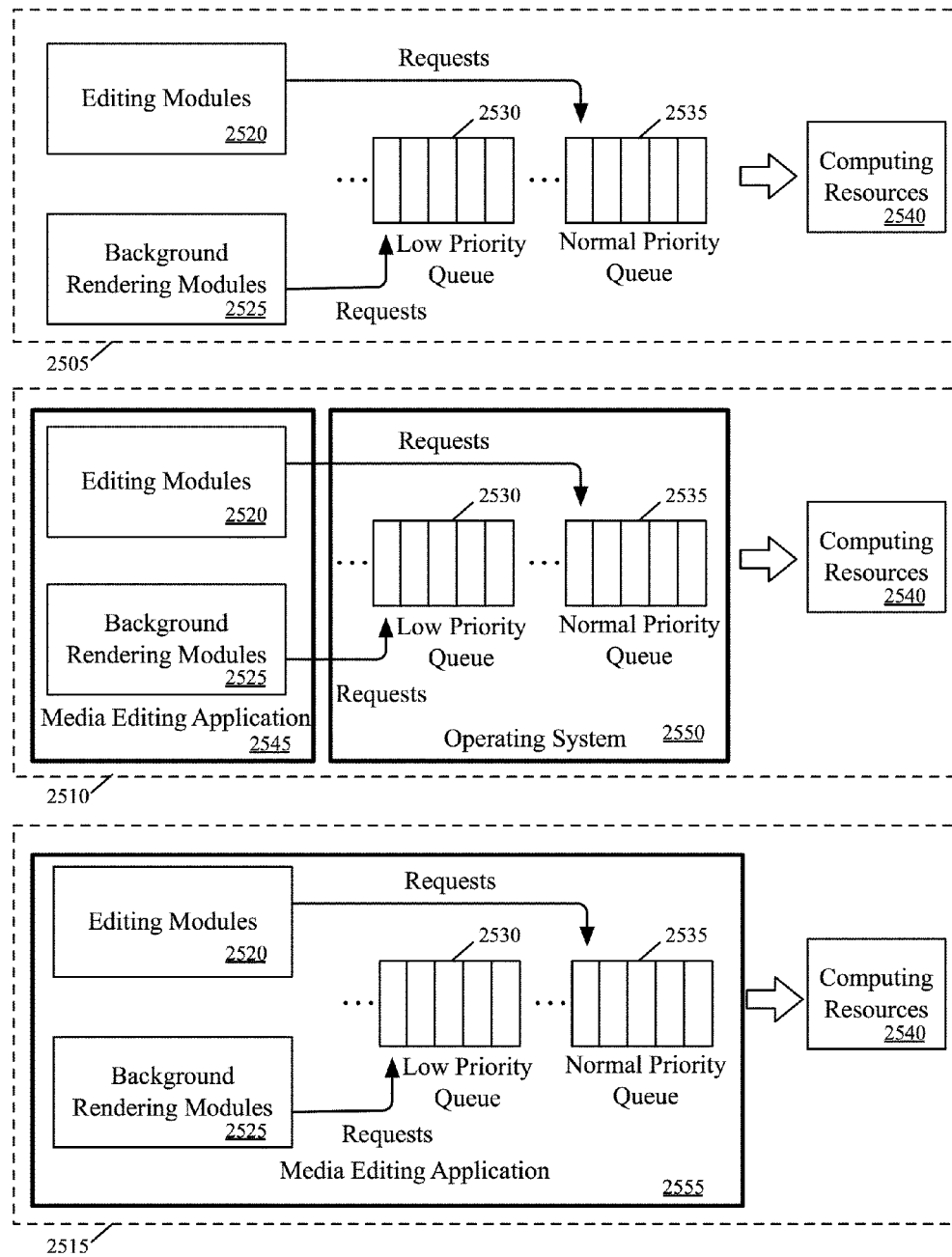
FIG. 25 conceptually illustrates prioritizing editing and background-rendering modules using prioritized instruction queues in accessing computing resources.

FIG. 25 illustrates management of computing resources by a media-editing application while the application is performing editing and background-rendering operations. Specifically, this figure illustrates that editing modules 2520 and background-rendering modules 2525 of the media-editing application utilize priority queues in accessing computing resources 2540. FIG. 25 illustrates three resource-management schemes 2505-2515.

The editing modules 2520 are similar to the editing modules 815 described above by reference to FIGS. 6 and 18. The background-rendering modules 2525 are similar to the first and second background-rendering modules 605 and 635 described above by reference to FIGS. 6 and 18. The normal and low priority queues 2535 and 2530 store requests for computing resources 2540. The requests in the low priority queue 2530 are not carried out by the computing resources 2540 until there are no requests in the normal priority queue 2535. The computing resources 2540 include a CPU, a GPU, memories, disk storages, etc. which take the requests from the queues 2530 and 2535. These computing resources are of a system on which the media-editing application is being executed.

In the resource-management scheme 2505, the media-editing application utilizes the queues 2530 and 2535 to manage the computing resources 2540 such that the requests from editing modules 2520 take precedence over the requests from the background-rendering modules 2525. By putting the requests from the editing modules 2520 in the normal priority queue 2535, the media-editing application ensures that the requests from the background-rendering modules 2525 do not get in the way of the requests from the editing modules. In this manner, the computing resources are always made available to the editing modules 2520 over the background-rendering modules 2525.

Different embodiments implement the resource-management schemes differently. For instance, as shown by the resource-management scheme 2510, the normal and low priority queues 2535 and 2530 are part of an operating system (OS) 2550. The editing modules 2520 and the background-rendering modules 2525 are part of the media-editing application 2545. The OS 2550 is running on the system on which the media-editing application 2545 is being executed. In some embodiments, the modules 2520 and 2525 use a set of OS services (e.g., an input/output throttling service, a thread priority service, etc.) to use the queues 2530 and 2535.

As shown by the resource-management scheme 2515, instead of or in conjunction with using the queues implemented as part of OS, a media-editing application 2555 in some embodiments utilizes the queues 2530 and 2535 that are implemented as part of the media-editing application.

Figure 26:
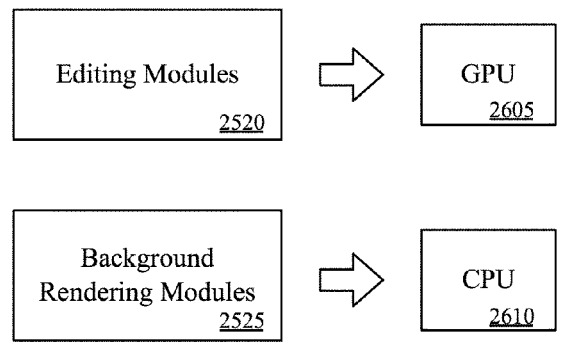
FIG. 26 conceptually illustrates assigning GPU and CPU resources to editing and background-rendering modules, respectively.

FIG. 26 illustrates another resource-management scheme. Specifically, this figure illustrates dedicating a GPU 2605 and a CPU 2610 to the editing modules 2520 and background-rendering modules 2525, respectively. As it is well known in the art, a CPU is a general-purpose processor and a GPU is a processor that is more specialized in processing graphics-related computations.

In some embodiments, the editing instructions from the editing modules 2520 are processed by the GPU 2605. The background-rendering instructions from the background-rendering modules 2525 are processed by the CPU 2610. In this manner, the editing instructions, which may involve real-time playback of the media presentation, are carried out by the specialized processor.

Figure 27:
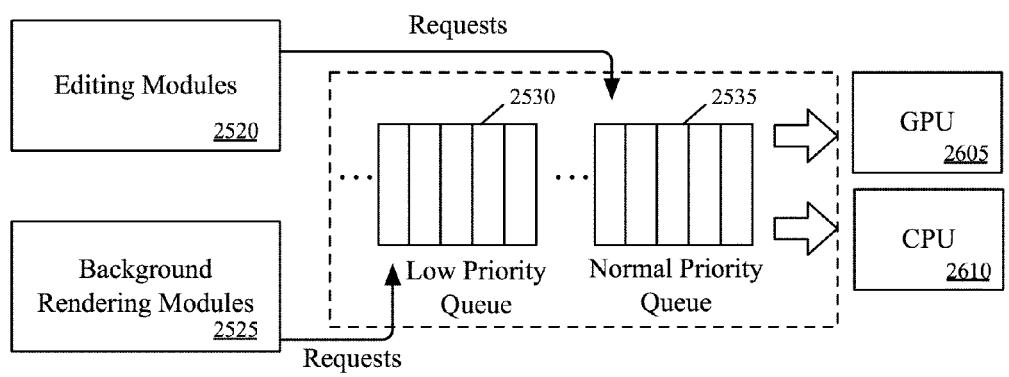
FIG. 27 conceptually illustrates prioritizing editing and background-rendering modules using prioritized instruction queues in accessing GPU and CPU resources.

FIG. 27 illustrates yet another resource-management scheme used by some embodiments. This figure illustrates that the instructions in the queues 2530 and 2535 are carried out by either the GPU 2605 or the CPU 2610.

As shown, the editing instructions from the editing modules 2520 are queued in the normal priority queue 2535. The background-rendering instructions from the background-rendering modules 2525 are queued in the low priority queue 2530. Each instruction in these queues is carried out by either of the two processors 2605 and 2610, depending on the availability of each processor at the time the instruction is due for being carried out.

Figure 28:
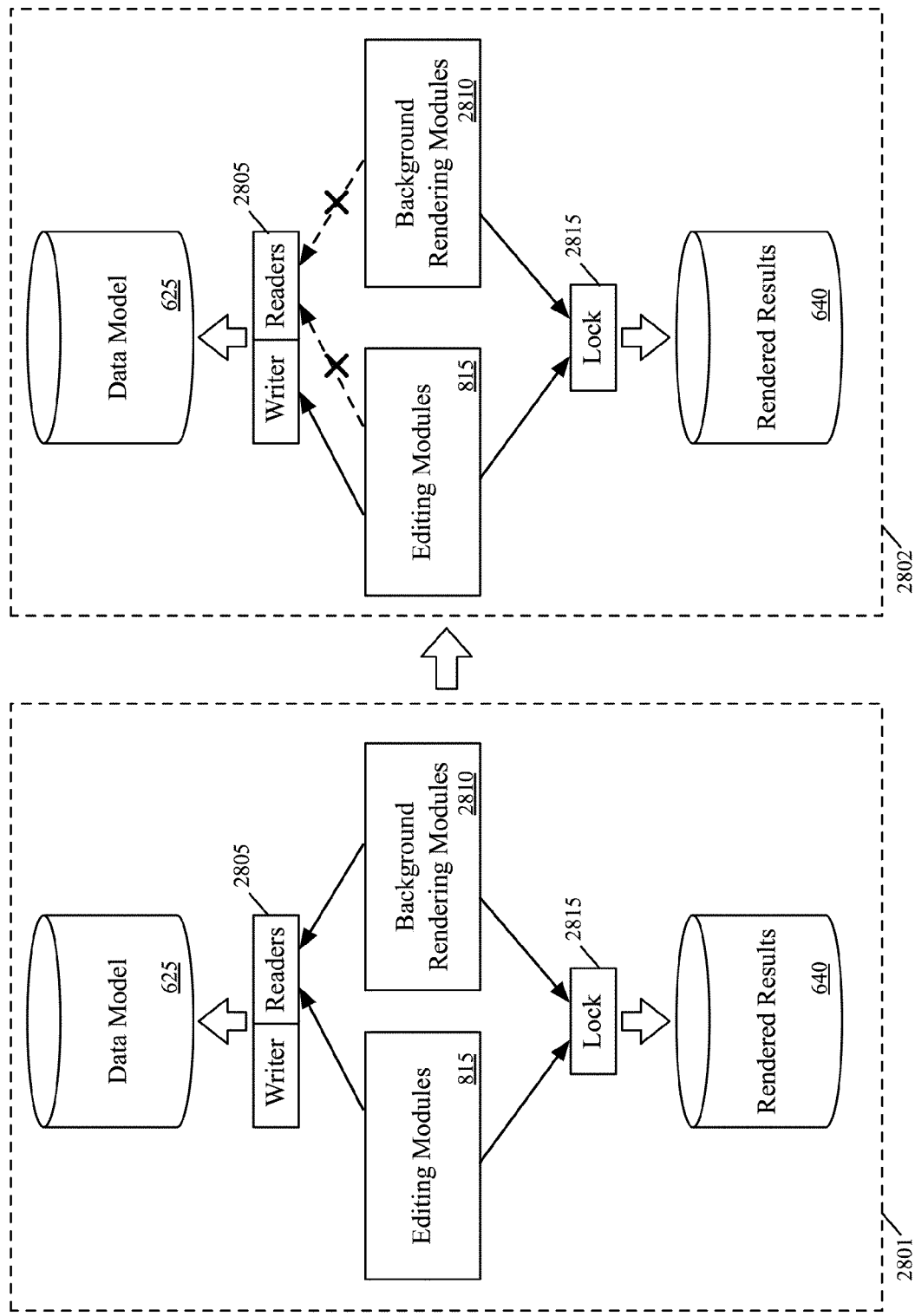
FIG. 28 conceptually illustrates managing accesses to data model and rendered results.

FIG. 28 illustrates simultaneous reading of a segment by editing modules and background-rendering modules of a media-editing application in some embodiments. Specifically, this figure illustrates that the media-editing application uses a readers/writer lock for the simultaneous reading of the segment data and another lock for accessing a render file. As shown, FIG. 28 illustrates the project data model repository 625, a readers/writer lock 2805, the editing modules 615, the background-rendering modules 2810, a lock 2815, the rendered results repository 640. The background-rendering modules 2810 are similar to the first and second background-rendering modules 605 and 635 described above by reference to FIG. 6.

The readers/writer lock 2805 allows multiple modules to read a segment data in a project data model simultaneously. When a module is writing or modifying a piece of data, the readers/writer lock 2805 blocks all other modules from reading or modifying the same piece of data in order to prevent multiple attempts to modify it at the same time. A conventional lock normally would allow only one module to access a piece of data at a given time. When a module accesses a piece of data to read or modify, a conventional lock blocks all other modules from reading the same piece of data. By using the readers/writer lock 2805 when a segment data in the project data model is being read, the background-rendering modules 2810 do not block the editing modules 615 from reading the same segment data.

The lock 2815 is a separate lock from the readers/writer lock 1405. The lock 2815 controls accesses to the render files stored in the rendered results repository 640. In some embodiments, the lock 2815 is a readers/writer lock, which allows simultaneous reading of data by multiple modules. In other embodiments, the lock 2815 is a conventional lock.

The operation of the locks and the modules will now be described in two stages 2801 and 2802. As shown in stage 2801, the background-rendering modules is reading a segment data of a project data model stored in the repository 625. The background-rendering modules use the readers part of the readers/writer lock 2805. The editing modules 615 are also reading the same segment data which the background-rendering modules are reading.

At stage 2802, an editing module modifies a segment data in the project data model after the segment has received an edit. The editing module uses the writer part of the readers/writer lock 2805 so that no other editing modules and background-rendering modules can access the segment data.

Figure 29:
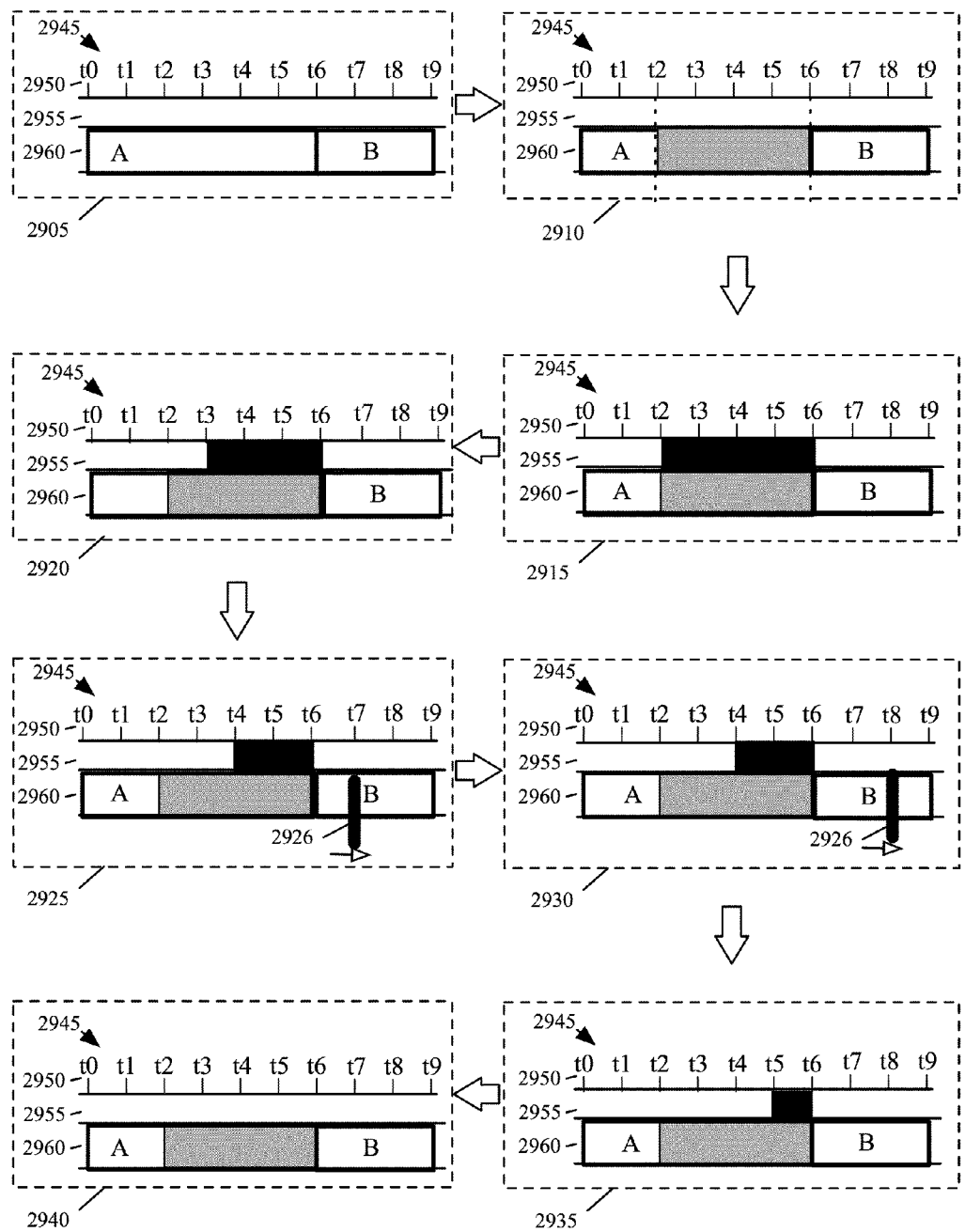
FIG. 29 conceptually illustrates a render status bar that keeps track of progression of background-rendering operations.

FIG. 29 conceptually illustrates a render status bar 2955 that indicates the render status of time periods in a media presentation. Specifically, this figure shows in eight stages 2905-2940 that the render status bar 2955 keeps track of progression of background-rendering operations being performed on a portion of the media presentation. FIG. 29 illustrates a composite display area 2945. The composite display area 2945 is similar to the composite display area 800 described above by reference to FIG. 8. As shown, the composite display area 2945 includes a timeline 2950, the render status bar 2955, and a track 2960. Media clips A and B span the track 2960.

The composite display area 2945 displays a portion of the media presentation. The portion includes the media clips A and B. The portion spans the timeline from time t0 to time t9. The render status bar 2955 indicates the render status of time periods in the media presentation. In some embodiments, the portions of the render status bar that represent time periods of the media presentation that are to be background-rendered are drawn in white. The time periods of the media presentation that have been rendered or do not need to be rendered are drawn in white in these embodiments. The render status bar 2955 of different embodiments may use different color combinations to indicate different statuses of different portions of the media presentation. For instance, the render status bar in some embodiments uses an orange color to indicate a portion of the media presentation is to be background-rendered. Also, the render status bar in some embodiments use a gray color to indicate the portion has been rendered.

In some embodiment, a playhead 2926 shown at stages 30 and 35 is a user interface (UI) item that indicates the location of the content of the media presentation that is currently being played back. For instance, assuming the media clip B is a video clip, the playhead 2926 which is at the time t7 of the media presentation indicates that the frame that is currently being displayed in a viewing area (not shown) of the media-editing application is the frame at the end of the first minute of the media clip B. The playhead moves to either direction of a timeline depending on the direction of playback (i.e., forward or backward).

At stage 2905, the media clip A spans a time period of the media presentation from time t0 to time t6. The media clip B spans a time period of the media presentation from time t6 to time t9. Neither of these two time periods has been rendered yet. Accordingly, the render status bar 2955 for these two time periods are drawn in white.

At stage 2910, an effect is applied to the last five seconds of the media clip (e.g., by user's selection of this portion of the media clip and selecting from a drop-down menu to add an effect to the portion). A gray portion that spans the track from time t2 to time t6 at stages 2910-2935 represents an effect applied to the media clip A.

At stage 2915, a first background-rendering module (not shown) of some embodiments selects the time period from time t2 to time t6 as a portion to background-render. The corresponding portion of the render status bar 2955 is drawn in black. A second background-rendering module (not shown) of some embodiments starts rendering the time period.

At stage 2920, the second background-rendering module has rendered a time period of the media presentation from time t2 to time t3. The render status bar 2945 is redrawn to indicate the progression of the background-rendering by the second background-rendering module. As shown, the period of time from time t2 to time t3 is drawn in white. A time period from time t3 to time t6 has remained drawn in black because the second background-rendering module has not yet rendered that time period.

At stage 2925, the second background-rendering module has rendered a time period of the media presentation from time t3 to time t4. The render status bar 2945 is redrawn to indicate that that time period has also been rendered. As shown, that time period is drawn in white, too. A time period from time t4 to time t6 has remained drawn in black. When the second-background-rendering module has rendered the time period from time t3 to time t4, the user starts playback of the media clip B (e.g., by placing a playhead 2926 on the media clip B as shown and pressing a play button (not shown)). As a result, an editing module (not shown) of some embodiments starts performing in order to process the user's request to playback. As described above, all background-rendering modules stops performing when an editing module performs in some embodiments.

At stage 2930, the playhead 2926 has moved to the right as the rest of the media clip B is being played. The editing module is still performing the playback. The second background-rendering module does not start performing again because the editing module is still performing. The render status bar is redrawn but the time period of from time t4 to time t6 is remained drawn in black. That is, the render status bar indicates that background-rendering operations on the applied effect has halted.

At stage 2935, the user has stopped playing the media presentation (e.g., by pressing a stop button (not shown)) and stops interacting with the media presentation. The editing module has stopped performing after the user stopped interacting the media-presentation. The second background rendering starts performing again and has rendered a time period from time t4 to time t5. The render status bar is redrawn and only a time period from time t5 to time t6 remains drawn in black.

At stage 2940, the second background-rendering module has rendered the time period from time t5 to time t6 as well. The render status bar 2955 is redrawn to reflect to the render status of the media presentation. As shown, the render status bar is in white to indicate that the time period t0 to time t9 does not have a portion to be background-rendered.

Having described how the background-rendering modules of a media-editing application perform background-rendering operations, the following Section IV will now describe how the rendered results become immediately available.

IV. Making Rendered Results Available for Playback

As described above, the background-rendering modules make individual frames in the rendered result for a segment of a media presentation immediately available for the editing modules to use. As soon as a frame is rendered from a segment, the background-rendering modules associate the frame with a frame-level identifier. As such, when a frame for the segment is generated, the editing modules can immediately identify the frame with the identifier and use the frame.

Figure 30:
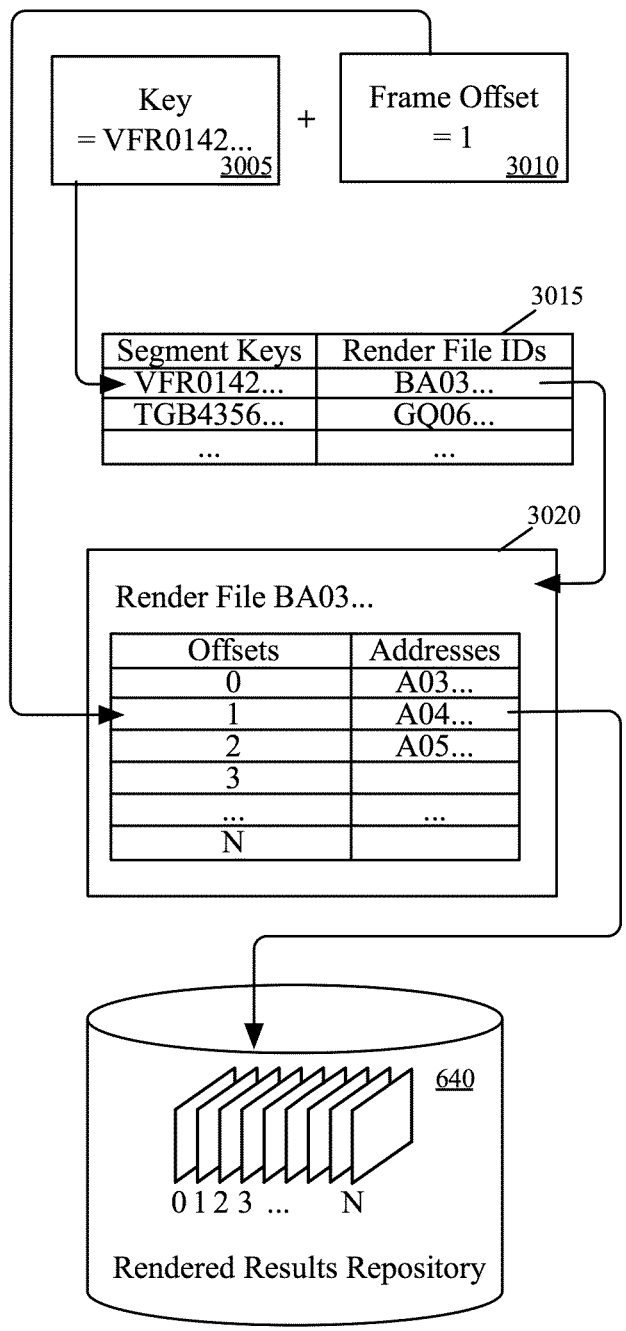
FIG. 30 conceptually illustrates accessing produced frames using segment key and frame offsets.

FIG. 30 illustrates using a segment key and an offset to identify a rendered frame. Specifically, this figure illustrates a data structure 3015 for a list of segment keys and a data structure 3020 for a render file that some embodiments use to identify a frame in a render file. As shown, FIG. 30 illustrates a segment key 3005, an offset for a frame 3010, data structures 3015 and 3020, and the rendered results repository 640.

The segment key 3005 is a key generated based on a set of attributes of a segment in a media presentation. The offset 3010 is an offset for a frame in a render file that contains the rendered result for the segment.

The data structure 3015 includes segment keys and render file identifiers that are associated with the keys. Each render file identifier links to a data structure for the render file. The data structure 3015 is populated with segment keys by a first background-rendering module such as the first background-rendering module 605 described above by reference to FIG. 6. The render file identifiers are entered into the data structure 3015 by a second background-rendering module such as the second background-rendering module 635 described above by reference to FIG. 6 as the render files for the segments are generated.

The data structure 3020 for a render file includes offsets for the frames produced from a segment and the addresses of the locations in the memory (e.g., the rendered results repository 640) where the frames are stored. An address for a frame is associated with an offset. Each address links to a rendered frame stored in the rendered results repository 640. For a frame that has not been rendered, the entry for the frame would not have an address in some embodiments.

A playback engine (not shown) identifies a frame in a sequence with a key value, "VFRO142 . . . ", and a frame offset value, "1", in order to display the frame. The playback engine first identifies a render file identifier value, "BA03 . . . ", that is associated with the key value in the data structure 3015. With the render file identifier, the playback engine locates the data structure for the render file. The playback engine then identifies the address value, "A04 . . . ". The playback engine finds the rendered frame in the rendered results repository 640 with the address value. It is to be noted that a key value, an offset value, and an address value may be in any numerical value in any length. For instance, a key value in some embodiments is a 128-bit number.

Figure 31:
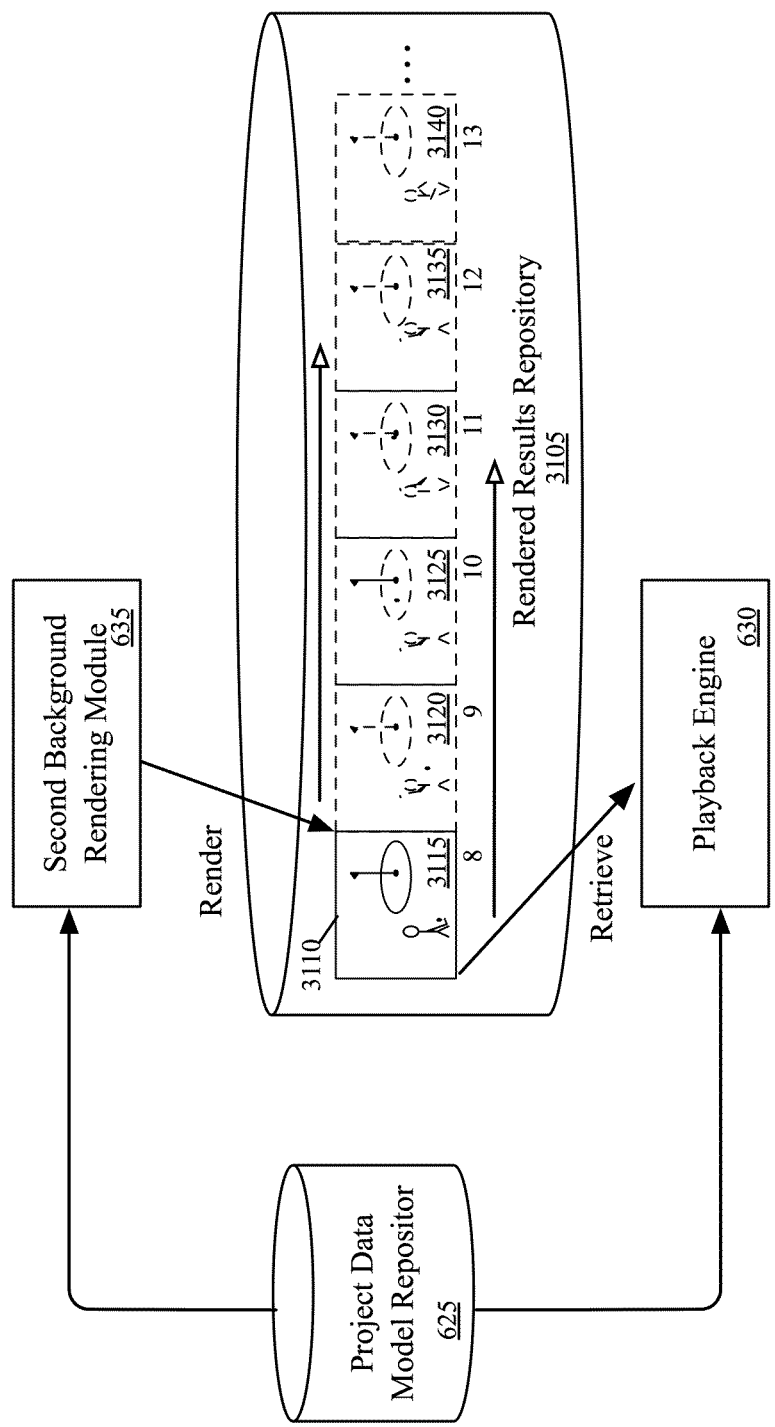
FIG. 31 conceptually illustrates making a rendered image immediately available for playback.

FIG. 31 conceptually illustrates immediate availability of those frames that are in the rendered result for a segment of a media presentation. Specifically, this figure shows that individual frames are available for playback as the frames are being produced and stored in a render results repository. FIG. 31 illustrates the second background-rendering module 635, the project data model repository 625, the playback engine 630, and a rendered results repository 3105.

The rendered results repository 3105 includes a render file 3110. The render file 3110 is depicted in this figure as a film strip to show which of the frames in the render file are generated and which are not yet. The render file 3110 includes frames 3115-3040. Frame 3115 is depicted in solid lines in this figure to indicate that this frame has been produced. Frames 3120-3040 are depicted in dotted lines to indicate that these frames have not been produced yet. An offset for the frame within the segment is depicted underneath each frame.

The second background-rendering module 635 identifies a segment to render as described above by reference to FIG. 24.

The module 635 retrieves the segment data from the project data model repository 625 and starts rendering the segment. The module 635 has produced the frame 3115, which is the first frame of the sequence being rendered. The frame 3115 is in the render file 3110.

The playback engine 630 is directed to display the first frame of the segment. The engine 630 is provided with a segment key that identifies the render file and an offset that identifies the first frame of the segment. The playback engine 630 first locates the render file 3110 with the segment key. Using the offset, the engine then determines whether the frame has been produced. The engine 630 finds that the first frame of the segment that has an offset value, "8", has been already produced. The engine then locates the first frame 3115 in the render file 3110 and sends it to a display device (not shown) to display.

Figure 32:
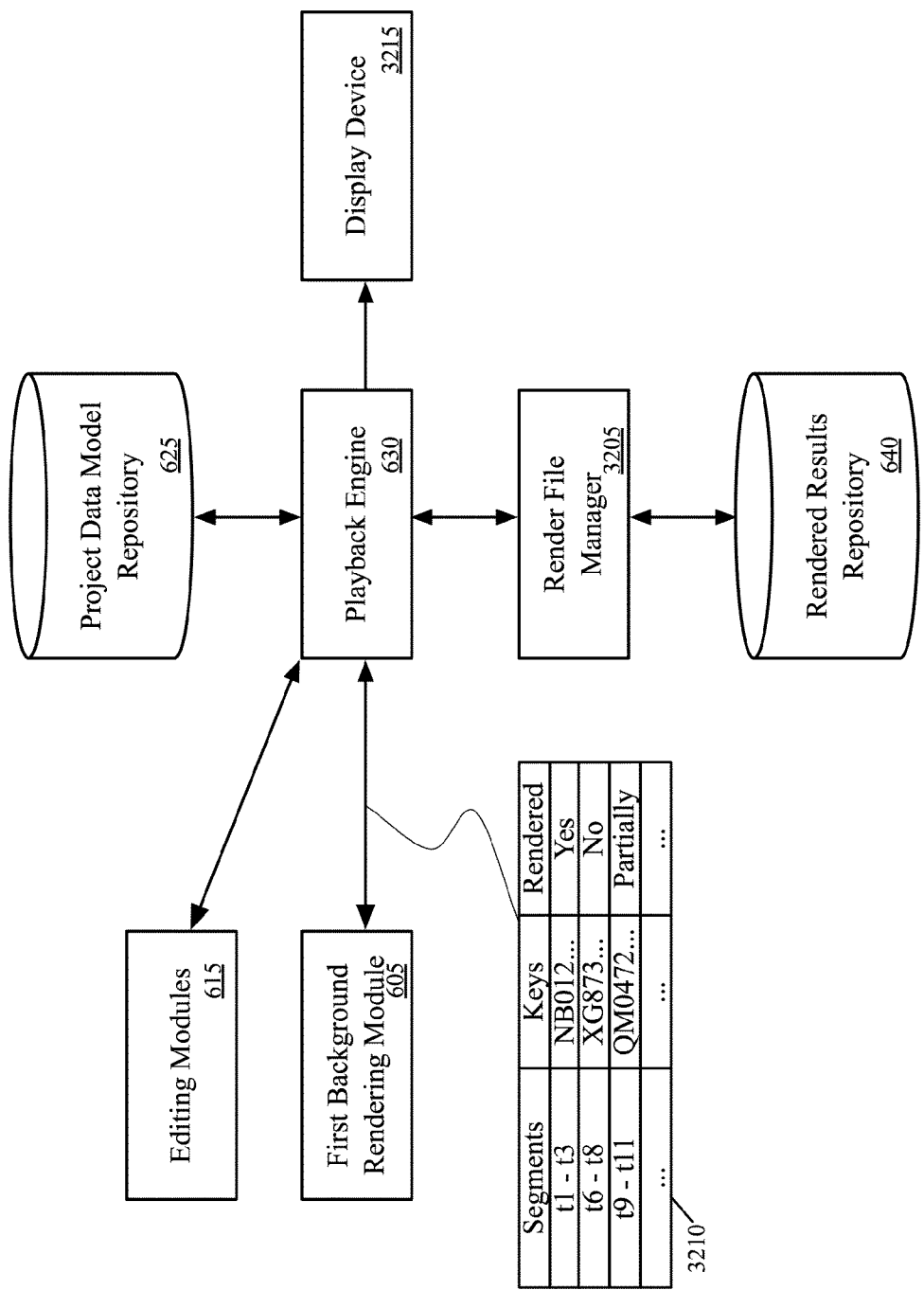
FIG. 32 conceptually illustrates playing back rendered frames.

FIG. 32 illustrates playing back a segment of a media presentation in real-time. Specifically, this figure shows how a playback engine 630 uses the rendered result for the segment to playback the segment. FIG. 32 illustrates editing modules 615, the project data model repository 625, the first background-rendering module 605, the playback engine 630, a display device 3215, a data structure 3210, a render file manger 3205, and the rendered results repository 640.

The render file manger 3205 manages the render files stored in the repository 640. The render file manager in some embodiments creates and updates a data structure for a list of segment keys such as the data structure 3005 described above by reference to FIG. 30. The render file manager uses the data structure to map segment keys for render files. The render file manger 3205 also provides the render status of a segment when the status is queried by other modules of the media-editing application. In addition, the render file manager retrieves a render file or individual frames in a render file when requested by other modules of the media-editing application.

The data structure 3210 for a list of segments includes segment identifiers of the segments in the media presentation. Each segment identifier is associated with a segment key and a render status of the segment. In some embodiments, there are three possible render statuses—a fully rendered status, a partially rendered status, and not rendered status. The data structure 3210 is created and updated by the first background-rendering module 605 in some embodiments.

The playback engine 630 plays back a segment in real-time. As described above, the playback engine 630 is driven by the editing modules 615. The playback engine 630 receives a request to playback a segment from the editing modules 615. Using the information in the data structure 3210 provided by the first background-rendering module 605, the playback engine 630 identifies the render status of the segment.

When the render status of the segment indicates that the segment has not been rendered, the playback engine retrieves the segment data from the project data model repository 625 and produce the frames from the data in real-time. When the segment is fully rendered, the playback engine asks the render file manager 3205 to retrieve the render file for the segment. When the segment is only partially rendered, the playback engine produces the frames for the portion of the segment that has not been rendered and receives the render file that contains the frames for the rendered portion of the segment. The playback engine 630 sends the frames for the segment to the display device 3215.

The display device 3215 displays frames that the device receives from the playback engine 630. Examples of display device includes a monitor, a display panel, etc.

The operation of the modules to play back a segment in the media presentation in real-time will now be described. The editing modules 615 receives and processes user inputs that specify a segment to playback. The editing modules 615 then direct the playback engine 630 to playback the segment by providing information about the time period of the media presentation to be played back. Using the information about the time period, the playback engine 630 identifies one or more segment keys and the render statuses of the segments associated with the keys from the data structure 3210. The engine receives the data structure 3210 from the first background-rendering module 3230.

The render status of the segment indicates that the segment is fully rendered. The playback engine 630 then requests a render file for the segment using the identified segment key. The render file manager 3205 identifies a render file that is mapped to by the segment key. The render file is then provided to the playback engine. The playback engine retrieves the frames in the render file and sends them to the display device 3215. The display device 3215 plays back the frames.

Figure 33:
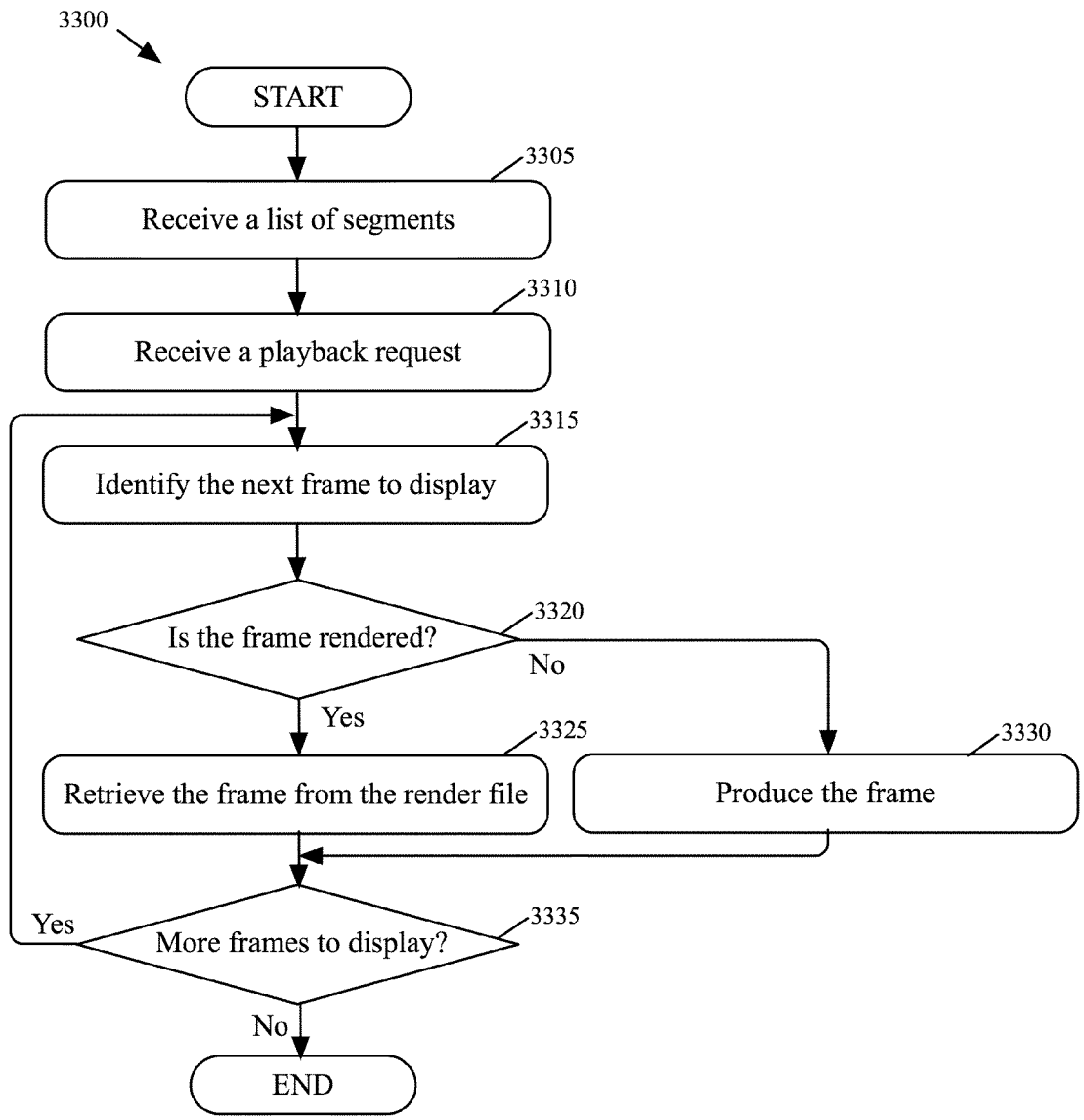
FIG. 33 illustrates a conceptual process that some embodiments use to playback a segment of a media presentation.

FIG. 33 illustrates a conceptual process 3300 that some embodiments use to playback a media presentation. The process is performed by a media-editing application. More specifically, the process is performed by a playback engine such as the playback engine 630 described above by reference to FIGS. 6 and 32. The process starts when the media-editing application receives and processes user inputs that specify a set of segments to playback.

Process 3300 begins by receiving (at 3305) a list of segments. This list includes the identifiers for the segments in the media presentation. The media-editing applications of different embodiments implement the list of segments differently. For instance, each segment identifier in the list in some embodiments is associated with a segment key and a render status for the segment. As described above, there are three possible render statuses—a fully rendered status, a partially rendered status, and not rendered status. In some embodiments, the process receives this list of segments from a first background-rendering module such as the first background-rendering module 605 described above by reference to FIGS. 6 and 32.

Next, the process receives (at 3310) a request to playback a segment. The process receives the request from an editing module. The editing module processes the user inputs that specify the segment to playback. The request includes a segment identifier for the segment to playback and an offset of the first frame of the segment. In some cases, the user inputs specify a particular frame other than the first frame that the segment is to be played back from. For instance, the user may move a play head to a location within a graphical representation of a media clip along the timeline of the media presentation in a GUI. When the segment is played back, the playback starts from the frame represented by the location of the play head. The playback request in these cases includes the offset of the frame from which the segment is to be played back in addition to a segment identifier for the segment. In other cases, the user inputs may specify a single frame to display. The playback request in such cases includes an indication that only the specific frame is to be displayed, the segment identifier for the segment in which the frame is in, and the offset of the frame within the segment.

The process then identifies (at 3315) the next frame to playback. The process identifies the first frame of the segment as the next frame to playback. When a particular frame from which the segment is to be played back is specified in the request, the process identifies the particular frame as the next frame to playback. When the request indicates that only a single frame is to be displayed, the process identifies this frame as the next frame to playback or display.

Process 3300 then determines (at 3320) whether the identified frame has already been produced. The process determines this by identifying the render status of the segment. Using the identifier of the segment, the process identifies the render status of the segment from the list of segments in which the segment identifier is associated with the render status of the segment. When the status indicates that the segment is not rendered, the identified frame has not been produced. When the status indicates that the segment is partially rendered, the process uses the offset for the identified frame if the identified frame is in the render file for the segment. The identified frame has not been rendered when the frame is not in the render file. When the status indicates that the segment is fully rendered, the identified frame has been rendered.

When the process determines (at 3320) that the identified frame has not been produced, the process produces (at 3330) the frame by processing the portion of the segment data that represent the frame. The process sends the produced frame to a display device for playback.

When the process determines (at 3320) that the identified frame has been produced, the process retrieves (at 3325) the frame from the render file for the segment using the offset for the identified frame. The process sends the retrieved frame to a display device for playback.

The process then determines (at 3335) whether there are more frames to playback or display. When the playback request indicates that only a single frame is to be displayed, there are no more frames to playback. The process determines that there are no more frames to display when the process reaches the end of the segment. In some cases, the process determines that there are no more frames to display when the process receives a stop or a pause request from an editing module that processes the user inputs which request a stop or pause.

When the process determines (at 3335) that there are no more frames to display, the process ends. Otherwise, the process loops back to 3315 to identify the next frame to display.

Having described how the rendered results become immediately available for playback, the following Section V will now describe how the rendered results are managed and maintained by a media-editing application.

V. Managing Render Files

As described above, some embodiments keep as many render files as possible in a repository in order to avoid re-rendering segments that already have render files. However, as the capacity of a repository is limited, some embodiments remove some of the render files in the repository in order to make room for the render files that are newly generated.

Figure 34:
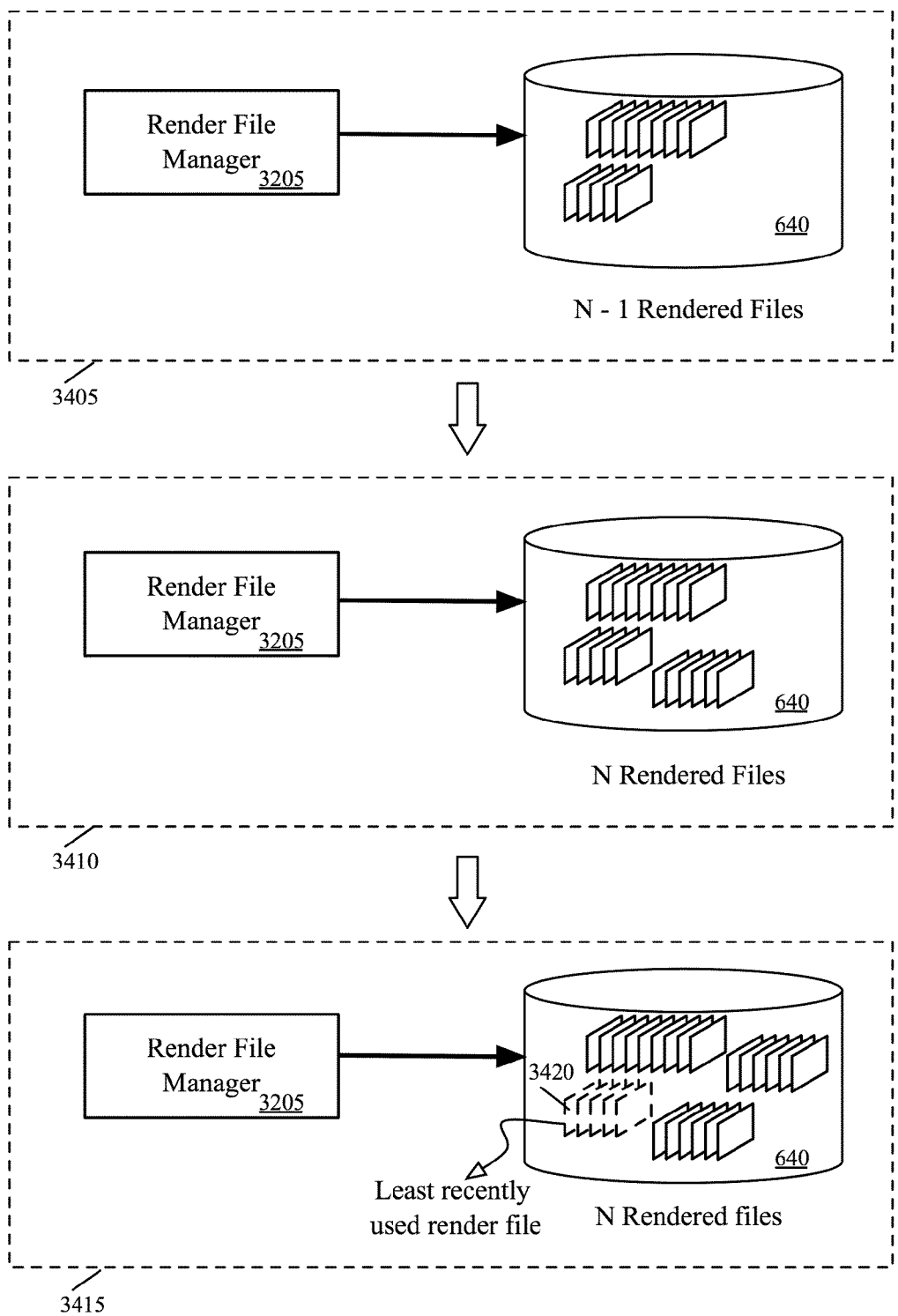
FIG. 34 conceptually illustrates maintaining the size of the pool of the rendered frames.

FIG. 34 conceptually illustrates managing the size of the pool of render files. Specifically, this figure shows how the render file manager 3205 removes render files from the rendered results repository 640. FIG. 34 illustrates the rendered results repository 640 at three stages 3405-3315.

As described above, the rendered results repository 640 is storage for render files that contains the rendered results for the segments in a media presentation. The media-editing applications of different embodiments implement the repository 640 differently. For instance, the repository 640 in some embodiments is implemented as a cache so that the render files are quickly accessed by the modules of a media-editing application. The repository keeps render files for the segments that are no longer part of the media presentation in addition to the render files for the segments that are currently part of the media presentation.

The render file manger 3205 keeps the size of the render files pool under a certain threshold. Different kinds of thresholds may be used. For example, a threshold is defined in terms of the number of render files. A threshold can also be defined in terms of the total size of the render files in the repository 640. The render file manager removes render files when the size of the pool exceeds the threshold. In some embodiments, the user can set or adjust the threshold value through the media-editing application.

The render file manger 3205 removes render files from the repository 640 based on a set of criteria. The set in some embodiments includes a validity status of each render file in the repository 640 and the time at which the render file was last used. The render file manager in these embodiments keeps track of the validity status and the last access time for each render file in the repository 640. A render file is valid when a segment that is currently part of the media presentation would use the render file when the segment is played back. A render file is invalid when none of the segments that are currently part of the media presentation would use the render file when the segments are played back. The render file manager 3205 removes invalid render files first. The valid files are removed only if there are no more invalid render files to remove from the repository 640 in some embodiments. When the render file manger needs to remove a render file among invalid files only or valid files only, the render file manger removes the least recently used render file first.

In some embodiments, the render file manager 3205 removes all invalid files from the repository 640 when the media-editing application is being closed. The valid render files are kept in the repository in these embodiments so that the render files can be used when media-editing application is re-opened to edit the media presentation.

In some embodiments, the render file manager 3205 receives from an editing module of the media-editing application a request that a render file for a segment be removed from the repository. The render file manager removes the render file from the repository or specifies the render file as a render file to be removed.

The operation of the render file manager 3205 will now be described. At stage 3405, the rendered results repository 640 is storing N−1 render files. The number N is the threshold number of render files for the repository 640 to store.

At stage 3410, the render file manager 3205 receives from the second background-rendering module the rendered result to store as a render file in the repository 640. The render file manger 3205 creates a render file and adds the rendered result into the file. As a result, the repository 640 is storing N render files.

At stage 3415, the render file manager 3205 receives the rendered result for another segment. In some embodiments, the render file manger removes a render file before adding a new render file for the just received set. The render file manager 3205 removes a render file 3420 because the render file 3420 is the least recently used render file among the invalid render files stored in the repository 640.

Figure 35:
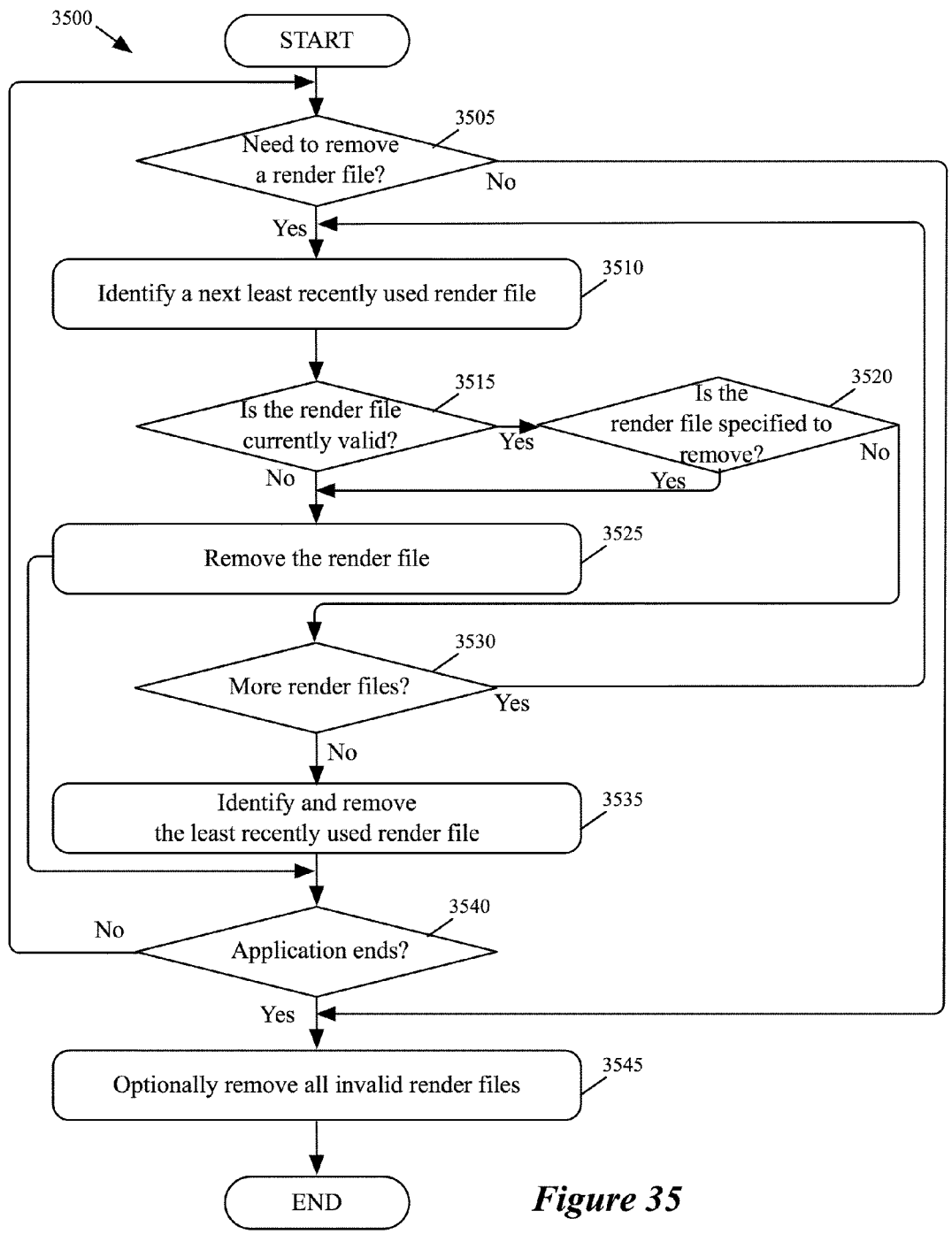
FIG. 35 illustrates a conceptual process that some embodiments use to maintain the size of the pool of the rendered frames.

FIG. 35 illustrates a conceptual process 3500 that some embodiments use to manage render files that are stored in a repository. Process 3500 is performed by a media-editing application. More specifically, the process in some embodiments is performed by a render file manager such as the render file manager 3205 by reference to FIGS. 32 and 34. In some embodiments, the process keeps track of the validity status of each segment in the media presentation and the time at which the media presentation is last used. The process in some embodiments starts when the media-editing application starts.

Process 3500 begins by determining (at 3505) whether the process needs to remove a render file from a render results repository for the media-editing application. In some embodiments, the process monitors the size of the pool of render files in the rendered results repository. When the size of the pool exceeds a threshold value, the process determines that the process needs to remove a render file from the repository.

When the process determines (at 3505) that it does not need to remove a render file, the process proceeds to 3545 which will be described further below. Otherwise, the process identifies (at 3510) the next least recently used render file. A render file is used when at least a frame in the render file is retrieved and sent to a display device. As described above, the process keeps track of the time at which the render file is last used. When any frame of a render file has not been used for playback, the file creation time serves as the last used time.

Process 3500 then determines (at 3515) whether the identified render file is currently valid. As described above, a valid render file is a render file that would be used for playing back at least one segment of the media presentation. A render file is invalid when the file is currently referenced by none of the segments that are currently in the media presentation.

When the process determines (at 3515) that the render file is currently not valid, it proceeds to 3520 which will be described further below. When the process determines (at 3515) that the identified render file is currently invalid, it removes (at 3525) the identified render file from the repository and proceeds to 3540 which will be described further below.

When the process determines (at 3515) that the render file is currently valid, it determines (at 3520) whether the identified render file is specified as a render file to remove. In some embodiments, a render file is specified to remove when the media-editing application receives user inputs that indicate that the user wishes to remove the rendered result for a segment. In these embodiments, the process receives from an editing module of the media application a request that the render file be removed.

When the process determines (at 3520) that the render file is specified to be removed, it removes (at 3525) the specified render file and proceeds to 3540 which will be described further below. Otherwise, the process determines (at 3530) whether there are more render files that the process has not considered for removing. When there are no more render files that the process needs to check for removing, all render files remaining in the repository at 3530 are valid render files that are not specified to be removed.

When the process determines (at 3530) that there are more render files that the process has not considered for removing, the process loops back to 3510 to identify the next least recently used render file. Otherwise, the process (at 3535) identifies and removes the least recently used render file among the remaining valid render files in the repository.

Process 3500 determines (at 3540) whether the media-editing application ends. The process in some embodiments detects the application being closed by receiving a signal with such indication. When the process determines (at 3540) that the media-editing application is ending, the process proceeds to 3545 which will be described further below. Otherwise, the process loops back to 3505 to determine whether the process needs to remove another render file.

When the process determines (at 3540) that the media-editing application is ending, the process optionally removes (at 3545) all invalid render files, if any, from the repository in some embodiments. Then, the process ends.

One of ordinary skill in the art will recognize that process 3500 is a conceptual representation of the operations used to specify editing and background-rendering instructions. The specific operations of process 3500 may not be performed in the exact order shown and described. The specific operations may not be performed in one continuous series of operations, and different specific operations may be performed in different embodiments. Furthermore, the process could be implemented using several sub-processes, or as part of a larger macro process.

Having described how render files are managed, the following Section VI will now describe several use cases that illustrate how some embodiments of the invention are utilized.

VI. Use Cases

Figure 36:
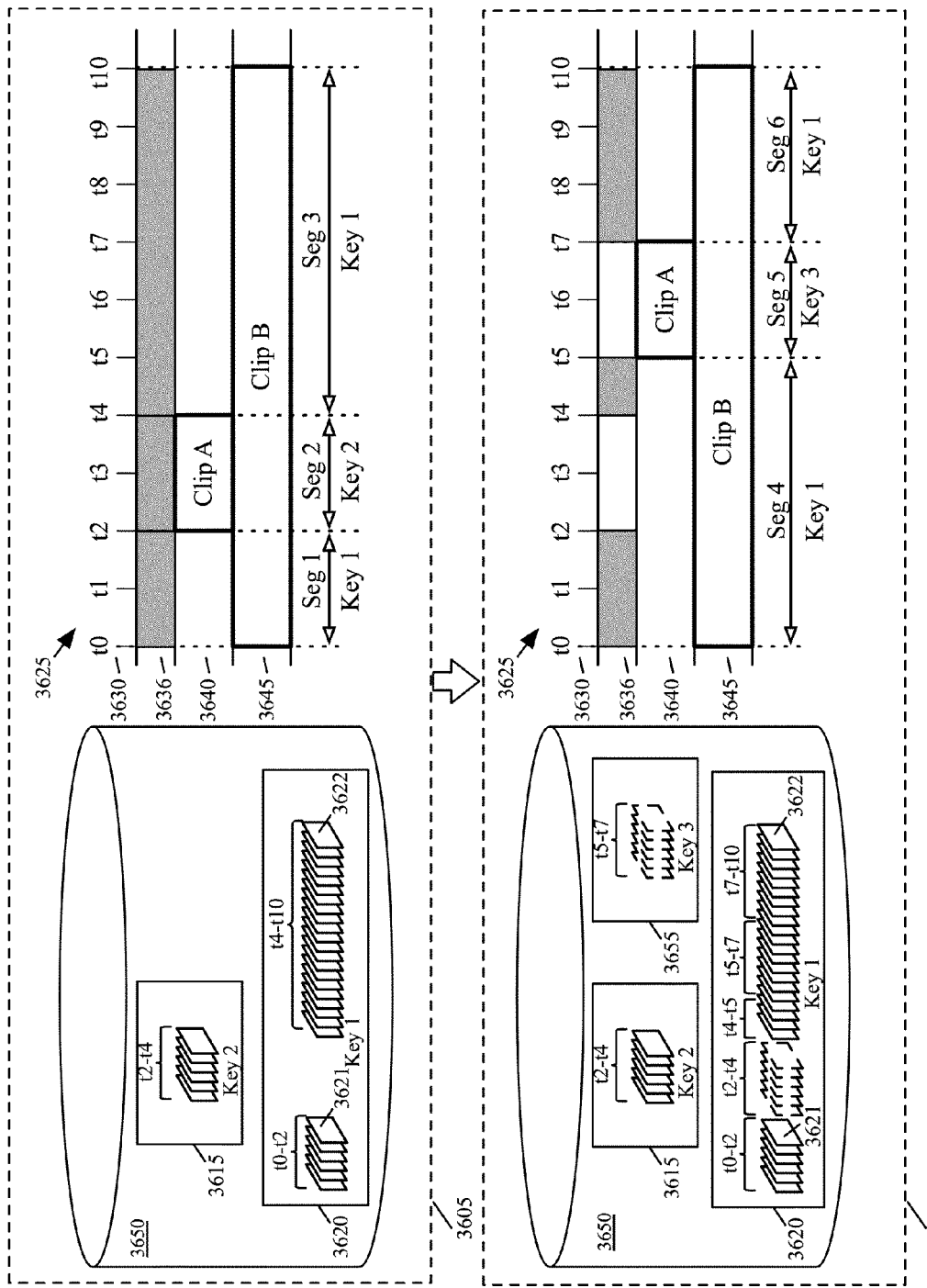
FIG. 36 conceptually illustrates reusing rendered frames for segments of a media presentation after the segments receive some edits.

FIG. 36 conceptually illustrates reusing render files to avoid re-rendering segments in a media presentation. Specifically, this figure shows in two stages 3605 and 3610 that reusing the rendered results for the segments when one of the media clips in a portion of the media presentation is moved along the timeline. FIG. 36 illustrates a rendered results repository 3650 and a composite display area 3625. The composite display area 3625 is similar to the composite display area 800 described above by reference to FIG. 8. As shown, the composite display area 3625 includes a timeline 3630, a render status bar 3635, and tracks 3640 and 3645. Media clips A and B span the tracks 3640 and 3645, respectively.

The composite display area 3625 displays a portion of the media presentation. The portion includes the media clips A and B. The portion spans the timeline from time t0 to time t10. The render status bar 3635 indicates the render status of time periods in the media presentation. In some embodiments, the portions of the render bar that represent rendered time periods of the media presentation are drawn in gray. The time periods of the media presentation that have not been rendered are drawn in white. Other embodiments use different colors for different render statuses. The rendered results repository 3650 stores render files that contain the rendered results for the segments in the media presentation.

At stage 3605, the media clip A spans the track 3640 from time t2 to time t4. The media clip B spans the track 3645 from time t0 and time t10. The media-editing application divides this portion of the media presentation into three segments 1-3 based on the edit points in the media presentation. Accordingly, segment 1 spans from time t0 to time t2, which are the in-point of the media clip B and the in-point of the media clip A, respectively. Segment 1 includes media content from the first two time-units of the media clip B. Segment 2 spans from time t2 to time t4, which are the in- and out-points of the media clip A, respectively. Segment 2 includes composite media content from portions of the media clips A and B. Segment 3 spans from time t4 to time t10, which are the out-point of the media clip A and the out-point of the media clip B, respectively. Segment 3 includes media content from last six time-units of the media clip B.

The media-editing application renders all three segments and stores the rendered results for these three segments in the repository 3650. The application generates key 1 based on a set of attributes of segment 1. The application associates key 1 with a render file 3620, which contains the rendered result 3621 for segment 1. A key 2 is generated based on a set of attributes of segment 2. Key 2 is associated with the render file 3615, which contains the rendered result for segment 2. Key 2 is different than key 1 because segment 2 represents composite media content from the two media clips A and B while segment 1 represents media content from the media clip B only. Thus, the rendered results for segments 1 and 2 are stored in the different render files 3615 and 3620, respectively.

The media-editing application generates a key based on a set of attributes of segment 3. This key is the same as key 1 because segment 3 shares with segment 1 the same set of attributes that are used in computing a key. For instance, both segments represent media content only from the media clip B that spans the track 3645. Thus, the number of media clips in a segment, track identification of each media clip in a segment, and identification of the media clips in a segment are the same for segments 1 and 3. Because the keys for the rendered results for segments 1 and 3 are the same, the rendered results for these two segments are stored in the same render file 3620.

A difference between segments 1 and 3 is that the two segments represent different portions of the media clip B. This difference does not require the two segments to have different keys in some embodiments. Rather, the difference is handled by different offsets. Within the render file for these two segments, different offsets are used to identify the frames rendered from different portions of the media clip B.

At stage 3610, the media clip A has been moved to occupy the track 3640 from time t5 to time t7. The user has selected the media clip A and slid it to the right by three time-units. The media-editing application segments the portion of media presentation again according to the new edit points created by the movement of the media clip A to a new location. The media-editing application divides the portion into three different segments 4-6. Segment 4 spans from time t0 to time t5, which are the in-point of the media clip B and the in-point of the media clip A, respectively. Segment 4 includes media content from the first five time-units of the media clip B. Segment 5 spans from time t5 to time t7, which are the in- and out-points of the media clip A, respectively. Segment 5 includes media content from the media clips A and B. Segment 6 spans from time t7 to time t10, which are the out-point of the media clip A and the out-point of the media clip B, respectively. Segment 6 includes media content from last three time-units of the media clip B.

The media-editing application generates keys for the rendered results for segments 4 and 6. The generated keys for these two segments are the same as key 1 for the similar reason that the key for segment 3 is the same as key 1 as described above. That is, segments 4 and 6 share with segment 1 the same set of attributes that are used in computing a key. Key 3 is generated based on a set of attributes of segment 5. Key 3 is different than key 1 because segment 5 includes media content from the two media clips while segment 1 includes media content from the media clip B only.

The media-editing application has not run rendering operations on the new segments yet. Only the render statuses of segments 4-6 have been updated. As shown, the render status bar 3635 indicates that a time period from time t0 to time t2, a time period from time t4 to time t5, and a time period from time t7 to time t10 of the media presentation are rendered. The media contents of the media presentation in these three time periods of the media presentation are not affected by the movement of the media clip A. Thus, the media-editing application locates the render files that contain the rendered results for these three time periods using the generated keys and the offsets. For the first two time-units of segment 4, the media-editing application locates the rendered result 3621 with key 1 and an appropriate offset for the rendered result 3621 within the render file 3620. For the fifth time-unit of segment 4, the media-editing application locates the corresponding frames within the render file 3620. Similarly, the media-editing application locates the corresponding frames for segment 6 within the render file 3620 using key 1 and corresponding offsets.

The render status bar 3635 indicates that the time period from time t2 to time t4 of the media presentation has not been rendered. This is because the time period of the media presentation previously included media contents from both the media clips A and B but now includes the media content from a portion of the media clip B only. This time period falls in segment 4 now and the rendered result for this time period therefore can be located with key 1 and an offset. However, the render file 3620 which would be identified with key 1 does not yet contain the rendered result for this time period because the corresponding portion of the media clip B has not been rendered yet. Similarly, the render bar indicates that the time period from time t5 to time t7 of the media presentation has not been rendered. This time period of the media presentation previously included media content from a portion of the media clip B only but now includes media contents from both the media clips A and B. The render file 3655 which would be generated to include the rendered result for this time period (i.e., segment 5) of the media presentation does not exist yet because segment 5 has not been rendered yet.

The rendered results repository 3650 includes the render files 3615 and 3620. The render file 3615 which contains the rendered result for segment 2 is now invalid because segment 2 is no longer part of the media presentation. The render file 3620 still includes the rendered result 3622 for segment 3. However, the frames in the rendered result 3622 that were produced for the time period from time t5 to time t7 of segment 3 are invalid because this time period of the media presentation is part of segment 5 now.

The rendered results repository 3650 also includes a render file 3655. The render file 3655 is depicted in dotted lines in this figure to indicate that the render file is not yet generated and not stored in the repository yet. When segment 5 is rendered, the render file 3655 will be associated with key 3. Similarly, "t2-t4" is depicted with dotted line in 3620 because . . . .

Figure 37:
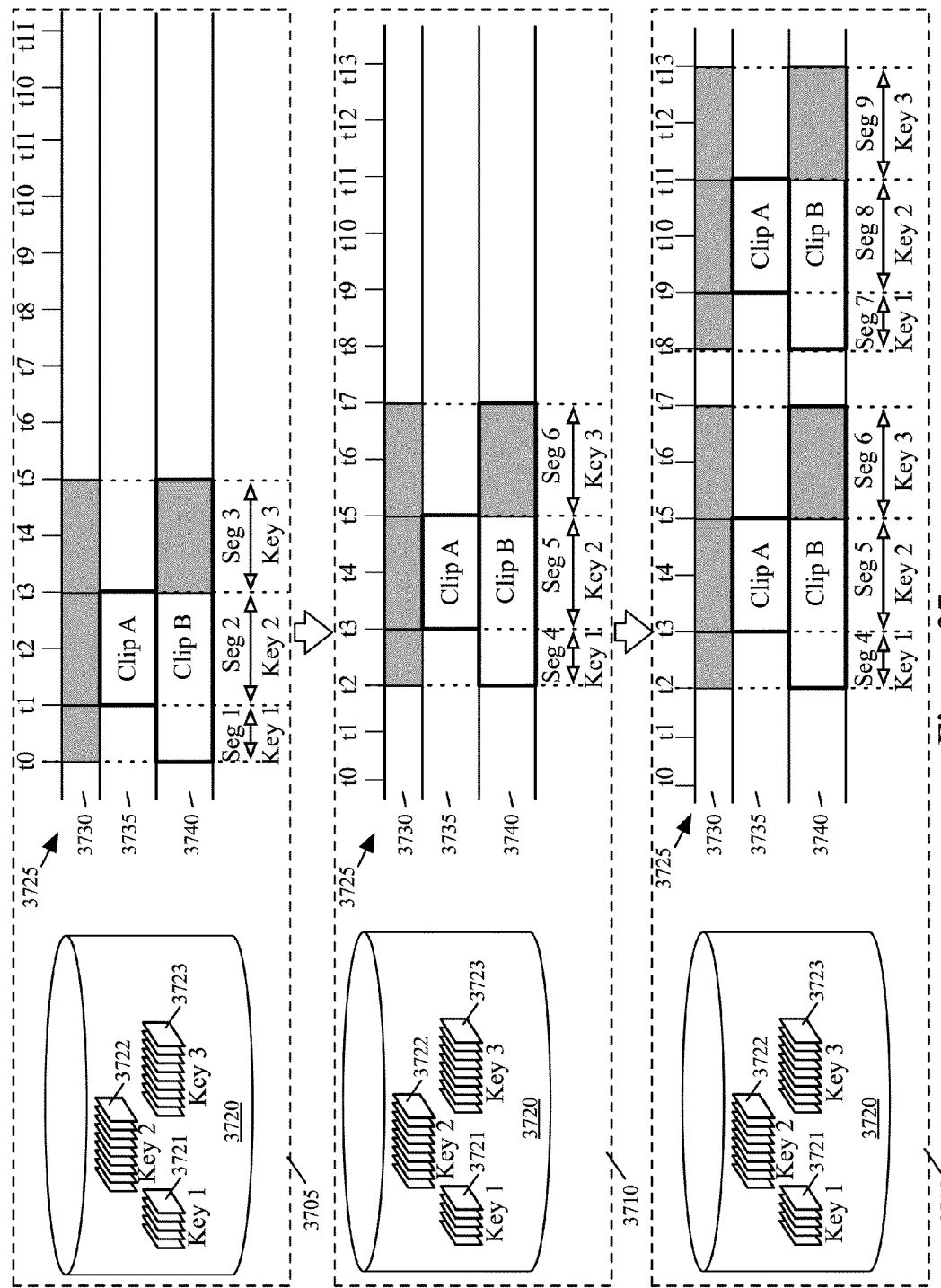
FIG. 37 conceptually illustrates using rendering frames for different segments that have the same attributes set.

FIG. 37 conceptually illustrates reusing render files to avoid re-rendering segments in a media presentation. Specifically, this figure shows in three stages 3705-3615 that a render file can be used for several segments that have the same set of attributes. FIG. 37 illustrates a rendered results repository 3720 and a composite display area 3725. As shown, the composite display area 3725 includes a render status bar 3730, and tracks 3735 and 3740. The rendered results repository 3720 and the composite display area 3725 are similar to the repository 3650 and the composite display area 3625 described above by reference to FIG. 36. The composite display area 3725 displays a portion of the media presentation.

At stage 3705, a media clip A spans the track 3735 from time t1 to time t3. Media clip B spans the track 3740 from time t0 to time t5. An effect is applied to clip B from time t3 to time t5. Accordingly, the portion of the media presentation is divided into three segments 1-3. Segments 1-3 are created based on in- and out-points of the media clips. Segment 3 can also be created based on the start and end of the effect applied to the last two time-units of the media clip B.

Segment 1 spans from time t0 to time t1 of the media presentation, which are the in-points of the media clips B and A, respectively. Segment 1 includes media content from the first time-unit of the media clip B. Segment 2 spans from time t1 to time t3, which are the in-point and the out-point of the media clip A, respectively. Segment 2 includes the media content of the second and third time-units of the media clip B overlaid by the media content of the media clip A. Segment 3 spans from time t3 to time t5, which are the out-points of the media clips A and B, respectively. Segment 3 includes media content from the last two time-units of the media clip B.

All three segments are fully rendered at this stage as indicated by the render status bar 3730. A key 1 is generated based on a set of attributes of segment 1. Key 1 is associated with a render file 3721 that contains the rendered result for the first time-unit of the media clip B. A key 2 is generated based on a set of attributes of segment 2. Key 2 is associated with a render file 3722 that contains the rendered result for segment 2. Key 2 is different than key 1 because some attributes that are used to compute a key are different for segments 1 and 2. For instance, the number of media clips that make up the segment is one for segment 1 while it is two for segment 2. Key 3 is generated based on a set of attributes of segment 3. Key 3 is associated with a render file 3723 that contains the rendered result for segment 3. Although the media content that each of these two segments include is from the same media clip, key 3 is different than key 1 because an effect is applied to segment 3 as described above.

At stage 3710, the media clips A and B are moved together along the timeline to the right by two time-units. The user has selected the media clips and slid them to the right. The media clip A now spans the track 3735 from time t3 to time t5. The media clip B spans the track 3740 from time t2 to time t7. As the media clips A and B now occupy different time periods of the media presentation, the presentation is divided into different segments 4-6. Segment 4 spans from time t2 to time t3 of the media presentation, which are the in-points of the media clips B and A, respectively. Segment 5 spans from time t3 to time t5, which are the in-point and the out-point of the media clip A, respectively. Segment 6 spans from time t5 to time t7, which are the out-points of the media clips A and B, respectively.

While the time periods in the media presentation that segments 4-6 occupy are different than the time periods that segments 1-3 occupied, those attributes of segments 4-6 that were used to compute keys for these segments are the same as those used for computing keys for segments 1-3. Accordingly, the keys generated for segments 4-6 are the same as keys 1-3 generated for segments 1-3. The media-editing application locates the render files 3721-3623 with the keys and do not render segments 4-6. As shown, no new render files are generated and added to the rendered results repository 3720.

At stage 3715, duplicate copies of the media clips A and B are added to the media presentation. The user has dragged and dropped the duplicate media clips from a library of media clips to the tracks of composite display area 3725. The user has applied the same effect to the last two time-units of the duplicate media clip B. The duplicate media clip A spans the track 3735 from time t9 to time t11. The duplicate media clip B spans the track 3740 from time t8 to time t13. As the duplicate media clips A and B now occupy a time period in the media presentation that was not occupied by any media clips, the time period of the presentation is divided into different segments 7-9. Segment 7 spans from time t8 to time t9 of the media presentation, which are the in-points of the duplicate media clips B and A, respectively. Segment 8 spans from time t9 to time t11, which are the in-point and the out-point of the duplicate media clip A, respectively. Segment 9 spans from time t11 to time t13, which are the out-points of the duplicate media clips A and B, respectively.

Segments 7-9 are different segments than segments 4-6 because segments 7-9 are occupying different time periods of the media presentation. However, the media content that segments 7-9 include are the same as the media content included in segments 4-6. Also, the attributes of segments 7-9 that are used to compute the keys for these segments are the same as the attributes of the segment 4-6. As such, the keys generated based on those attributes of segments 7-9 are the same as keys 1-3 generated based on those attributes of segments 4-6. The media-editing application locates the render files 3721-3623 with the keys and do not render segments 7-9. As shown, no new render files are generated and added to the rendered results repository 3720.

Figure 38:
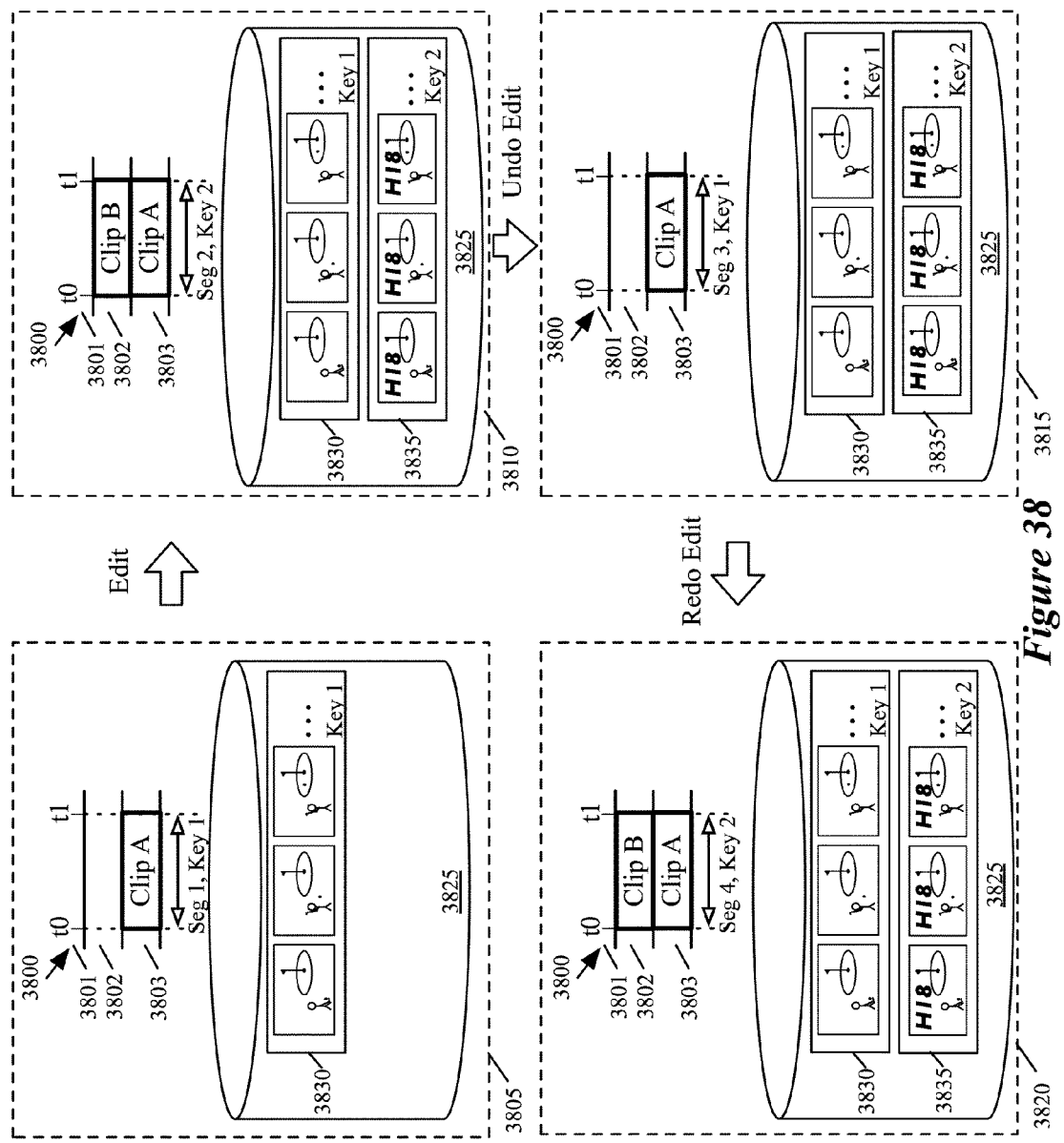
FIG. 38 conceptually illustrates keeping a pool of rendered frames to avoid re-rendering.

FIG. 38 conceptually illustrates reusing render files to avoid re-rendering segments in a media presentation. Specifically, this figure shows in four stages 3805-3720 that re-rendering segments can be avoided by keeping a pool of render files. FIG. 38 illustrates a rendered results repository 3825 and a composite display area 3800. As shown, the composite display area 3800 includes a timeline 3801 and tracks 3802 and 3803. The rendered results repository 3825 and the composite display area 3800 are similar to the repository 3650 and the composite display area 3625 described above by reference to FIG. 36. The composite display area 3800 displays a portion of the media presentation.

At stage 3805, media clip A spans the track 3803 from time t0 to time t1. As the portion of the media presentation includes the media clip A only, segment 1 is defined by the in- and out-points of the media clip A. Segment 1 spans time t0 to time t1, which are the in- and out-points of the media clip A. Segment 1 is fully rendered at this stage. Key 1 is generated based on a set of attributes of segment 1. Key 1 is associated with a render file 3830 that contains the rendered result for segment 1. The render file 3830 is depicted in this figure to visualize first several frames rendered from segment 1. The frames show a golfer who has hit the golf ball towards a hole.

At stage 3810, media clip B is added to the track 3802. The user of the media-editing application has dragged and dropped the media clip B from a library of media clips (not shown) into the composite display area 3800. The media clip B spans the track 3802 for the same time period as the media clip A spans the track 3803. The media content in the media clip B overlays the media content in the media clip A. As a result, a new segment 2 is created to represent the new composited media content. Segment 2 spans the timeline from time t0 to time t1, which are in- and out-points of the media clips A and B. In some embodiments, the media-editing application does not create a new segment. Instead, segment 1 is retained. Segment 1 will have different attributes as a result of the edit it just received.

Segment 2 is fully rendered at this stage. Key 2 is generated based on a set of attributes of segment 2. Key 2 is different than key 1 because some attributes that are used to calculate a key for a segment are different for segments 1 and 2. For instance, the number of media clips that make up segment 1 was one while it is two for segment 2. Key 2 is associated with a render file 3835 that contains the rendered result for segment 2. The render file 3835 is depicted in this figure to visualize first several frames rendered in segment 2. The frames in the file 3835 show the golfer and the hole number that overlays the golfer's images. The hole number comes from the media clip B, the content of which, overlays the media content of the media clip A.

The render file 3830 that contains the rendered result for segment 1 is not valid because segment 1 is no longer part of the media presentation. That is, key 1 that is associated with the render file 3830 will not be identified with key 2 that is generated based on a set of attributes of segment 2. Invalid render files are kept in the repository 3725.

At stage 3815, the media clip B is removed from the track 3802. The user has selected the media clip B and deleted the media clip B from the track 3801. In effect, the user has made another edit by removing the media clip B. Alternatively, the user could have undone the previous edit (i.e., adding the media clip B) and have achieved the same end result, which is leaving only the media clip A in the portion of the media presentation.

The time period from time t0 to time t1 of the media presentation now includes the media clip A only. The media content for this time period is the media content of the media clip A. As a result, a new segment 3 is created to represent the media content that is different than the media content represented by segment 2. Or, had the user undone the adding of the media clip B, the portion of the presentation would have gone back to include segment 1. Segment 3 spans the timeline from time t0 to time 1, which are in- and out-points of the media clip A.

Segment 3 is fully rendered at this stage. A key for segment 3 is generated based on a set of attributes of segment 3. Because the set of attributes of segment 3 is identical with the set of attributes of segment 1, the key for segment 3 is key 1. As such, the render file 3830 which is associated with key 1 is located using key 1 and can be used for playing back segment 3.

The render file 3825 that contains the rendered result for segment 2 is not valid anymore because segment 2 is no longer part of the media presentation. The render file 3835 is kept in the repository 3825 in some embodiments.

At stage 3820, the media clip B is added back to the track 3801. The user has made an edit by dragging and dropping the media clip B from the library of media clips into the composite display area 3800. Alternatively, the user could have chosen to redo the edit that added the media clip B initially. The media clip B spans the track 3802 for the same time period as the media clip A spans the track 3803. The media content in the media clip B overlays the media content in the media clip A. As a result, a new segment 4 is created to represent the new composited media content. Segment 4 spans the timeline from time t0 to time t1, which are in- and out-points of the media clips A and B.

Segment 4 is deemed fully rendered at this stage. A key for segment 4 is generated based on a set of attributes of segment 4. Because the set of attributes of segment 4 is identical with the set of attributes of segment 2, the key for segment 4 is key 2. As such, the render file 3835 which is associated with key 2 is located using key 2 and can be used for playing back segment 4.

VII. Process for Defining Media-Editing Application

Figure 39:
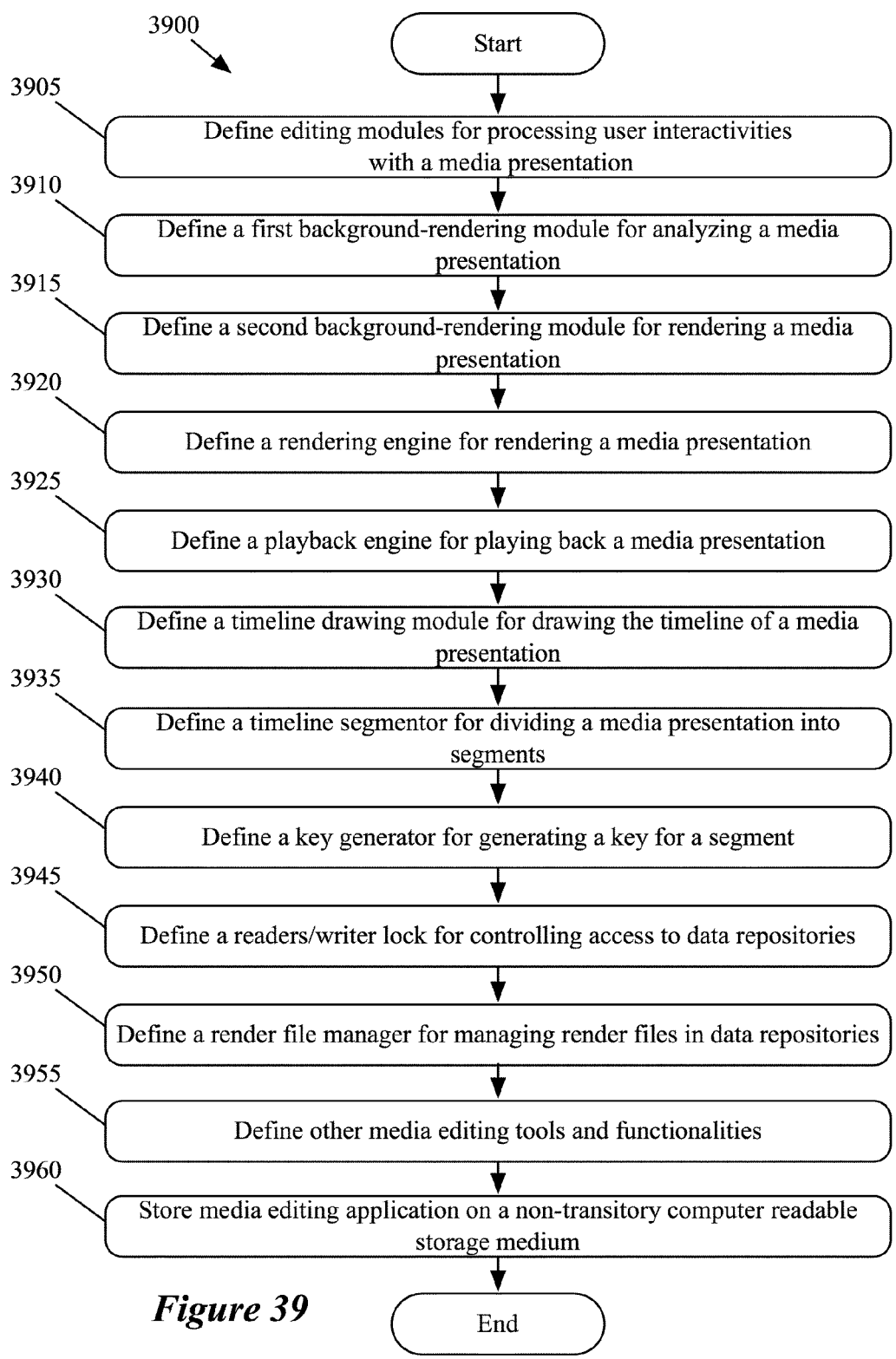
FIG. 39 conceptually illustrates a process used by some embodiments to define a media-editing application.

FIG. 39 conceptually illustrates a process 3900 of some embodiments for manufacturing a computer readable medium that stores a media-editing application such as the application described above by reference to FIG. 6. In some embodiments, the computer readable medium is a distributable Compact Disc Read-Only Memory (CD-ROM). As shown, process 3900 begins by defining (at 3905) editing modules for processing user activities with a media presentation. Editing modules in some embodiments process user edits made to the media presentation. For instance, the editing modules 615 and 2520 of FIGS. 6, 11, 18, 32, 25, 26, and 27 are examples of the defined editing modules. The process 3900 next defines (at 3910) a first background-rendering module. The first background-rendering module determines an order in which the segments of a media presentation are to be rendered. An example of the defined first background-rendering module is the first background-rendering modules 605 illustrated in FIGS. 6, 18, 20, and 32. Process 3900 then defines (at 3915) a second background-rendering module for rendering the segments in a prioritized order. For instance, the second background-rendering modules 635 and 2330 of FIGS. 6, 18, 23, and 31 are examples of the defined second background-rendering module.

The process 3900 next defines (at 3920) a rendering engine for rendering segments of a media presentation as directed by a second background-rendering module, such as the rendering engine 2335 illustrated in FIG. 23. Process 3900 then defines (at 3925) a playback engine for generating frames to playback in real-time, such as the playback engine 630 of FIGS. 6, 31, and 32. Process 3900 next defines (at 3930) a timeline drawing module for drawing the timeline of a media presentation in different colors, such as the timeline drawing module 610 described above by reference to FIG. 6.

Next, the process defines (at 3935) a presentation segmentor for dividing a media presentation into segments, such as the presentation segmentors 140, 620, 1140 illustrated in FIGS. 1, 3, 6 and 11. The process 3900 then defines (at 3940) a key generator for computing a key for a segment. The key generators 145, 1145 and 1210 illustrated in FIGS. 1, 3, 5, 11 and 12 are examples of the defined key generator. The process 3900 next defines (at 3945) a readers/writer lock for enabling modules of the media-editing application to read the same piece of data simultaneously, such as the readers/writer lock 2805 illustrated in FIG. 28. The process 3900 then defines (3850) a render file manager for managing render files in a repository, such as the render file manager 3205 illustrated in FIGS. 32 and 34.

Next, the process 3900 defines (at 3955) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process 3900 defines these additional tools in order to create a media-editing application that includes other features in addition to the features described above.

Figure 40:
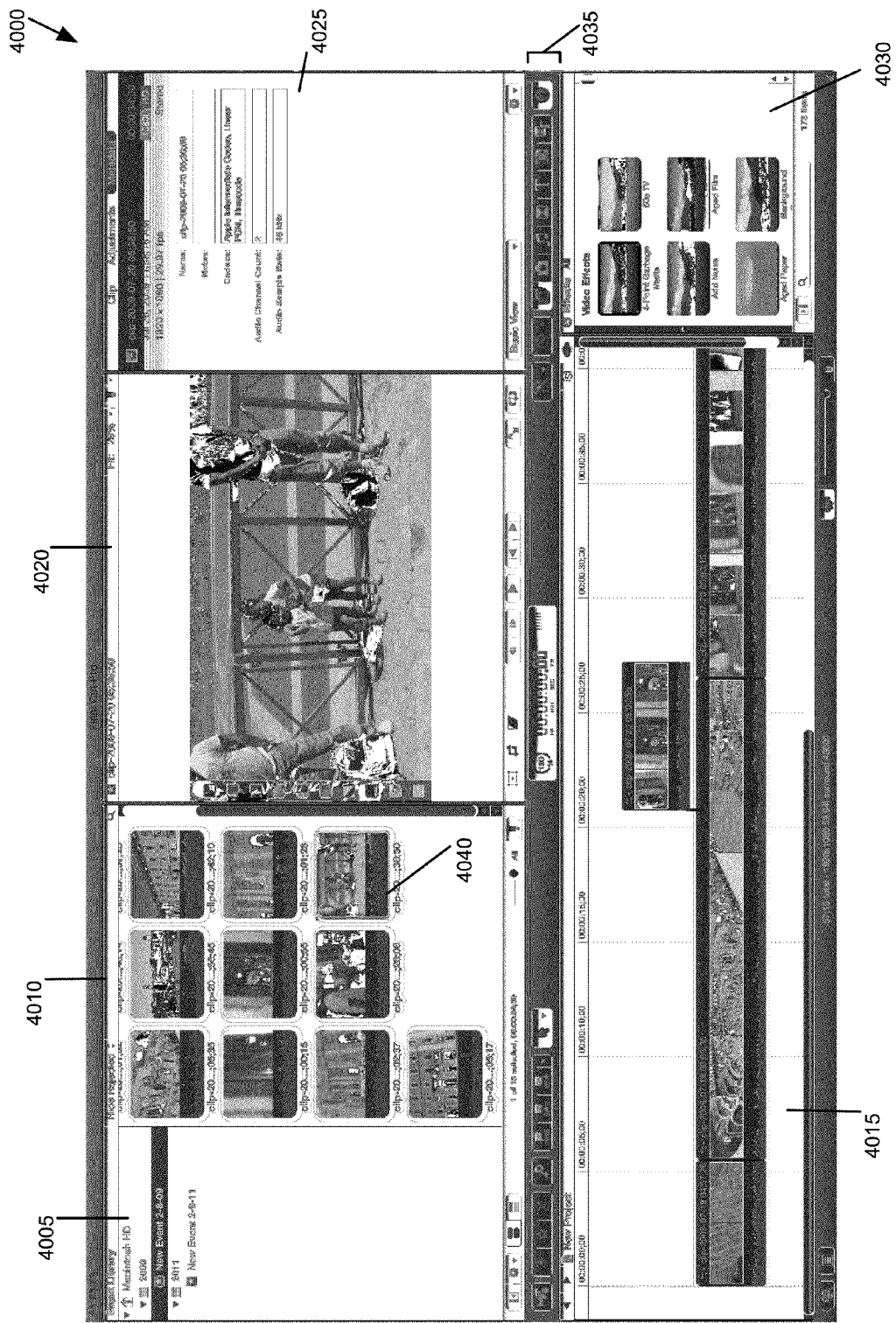
FIG. 40 illustrates an alternative GUI of the media-editing application of some embodiments.

A more detailed view of a media-editing application that includes some of these additional features is illustrated in FIG. 40. Specifically, this figure shows a media-editing application with these additional tools. FIG. 40 illustrates a graphical user interface (GUI) 4000 of a media-editing application of some embodiments. One of ordinary skill will recognize that the graphical user interface 4000 is only one of many possible GUIs for such a media-editing application. In fact, the GUI 4000 includes several display areas which may be adjusted in size, opened or closed, replaced with other display areas, etc. The GUI 4000 includes a clip library 4005, a clip browser 4010, a timeline 4015, a preview display area 4020, an inspector display area 4025, an additional media display area 4030, and a toolbar 4035.

The clip library 4005 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 4005 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 4005 might be renamed "European Vacation" as a descriptor of the content).

In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the event that filters clips in this event to only display media clips tagged with the "kids" keyword.

The clip browser 4010 allows the user to view clips from a selected folder (e.g., an event, a sub-folder, etc.) of the clip library 4005. As shown in this example, the folder "New Event 2-8-11 3" is selected in the clip library 4005, and the clips belonging to that folder are displayed in the clip browser 4010. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 4015 provides a visual representation of a composite presentation (or project) being created by the user of the media-editing application. Specifically, it displays one or more geometric shapes that represent one or more media clips that are part of the composite presentation. The timeline 4015 of some embodiments includes a primary lane (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 4010 into the timeline 4015 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 4020.

The preview display area 4020 (also referred to as a "viewer") displays images from media files that the user is skimming through, playing back, or editing. These images may be from a composite presentation in the timeline 4015 or from a media clip in the clip browser 4010. In this example, the user has been skimming through the beginning of clip 4040, and therefore an image from the start of this media file is displayed in the preview display area 4020. As shown, some embodiments will display the images as large as possible within the display area while maintaining the aspect ratio of the image.

The inspector display area 4025 displays detailed properties about a selected item and allows a user to modify some or all of these properties. The selected item might be a clip, a composite presentation, an effect, etc. In this case, the clip that is shown in the preview display area 4020 is also selected, and thus the inspector displays information about media clip 4040. This information includes duration, file format, file location, frame rate, date created, audio information, etc. about the selected media clip. In some embodiments, different information is displayed depending on the type of item selected.

The additional media display area 4030 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 4030 is currently displaying a set of effects for the user to apply to a clip. In this example, only two effects are shown in the display area (the keyer effect and the luma keyer effect, because the user has typed the word "keyer" into a search box for the effects display area).

The toolbar 4035 includes various selectable items for editing, modifying what is displayed in one or more display areas, etc. The right side of the toolbar includes various selectable items for modifying what type of media is displayed in the additional media display area 4030. The illustrated toolbar 4035 includes items for video effects, visual transitions between media clips, photos, titles, generators and backgrounds, etc. In addition, the toolbar 4035 includes an inspector selectable item that causes the display of the inspector display area 4025 as well as items for specifying background-rendering options, applying a retiming operation to a portion of the timeline, adjusting color, and other functions.

The left side of the toolbar 4035 includes selectable items for media management and editing. Selectable items are provided for adding clips from the clip browser 4010 to the timeline 4015. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill will also recognize that the set of display areas shown in the GUI 4000 is one of many possible configurations for the GUI of some embodiments. For instance, in some embodiments, the presence or absence of many of the display areas can be toggled through the GUI (e.g., the inspector display area 4025, additional media display area 4030, and clip library 4005). In addition, some embodiments allow the user to modify the size of the various display areas within the UI. For instance, when the display area 4030 is removed, the timeline 4015 can increase in size to include that area. Similarly, the preview display area 4020 increases in size when the inspector display area 4025 is removed.

Returning to FIG. 39, process 3900 next stores (at 3960) the defined media-editing application on a non-transitory computer readable storage medium. As described above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 3900 are not exhaustive of the modules, rules, processes, and UI items that could be defined and stored on a computer readable storage medium for a media-editing application incorporating some embodiments of the invention. In addition, the process 3900 is a conceptual process, and the actual implementations may vary. For example, different embodiments may define the various elements in a different order, may define several elements in one operation, may decompose the definition of a single element into multiple operations, etc. In addition, the process 3900 may be implemented as several sub-processes or combined with other operations within a macro-process.

VIII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 41:
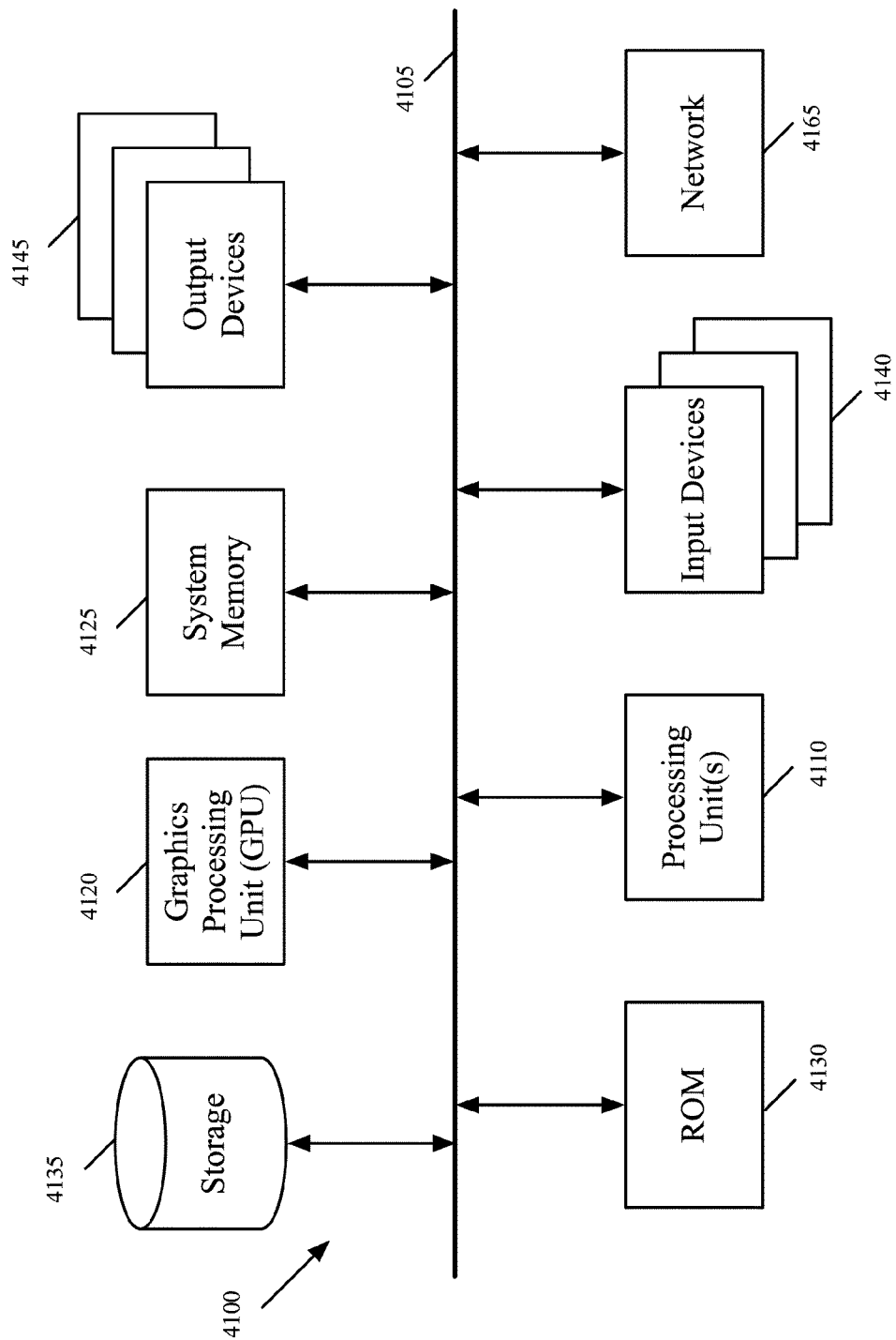
FIG. 41 illustrates an electronic system with which some embodiments of the invention are implemented.

FIG. 41 conceptually illustrates an electronic system 4100 with which some embodiments of the invention are implemented. The electronic system 4100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 4100 includes a bus 4105, processing unit(s) 4110, a graphics processing unit (GPU) 4115, a system memory 4120, a network 4125, a read-only memory 4130, a permanent storage device 4135, input devices 4140, and output devices 4145.

The bus 4105 collectively represents all system, peripheral, and chipset buses that communicatively connect the numerous internal devices of the electronic system 4100. For instance, the bus 4105 communicatively connects the processing unit(s) 4110 with the read-only memory 4130, the GPU 4115, the system memory 4120, and the permanent storage device 4135.

From these various memory units, the processing unit(s) 4110 retrieves instructions to execute and data to process in order to execute the processes of the invention. The processing unit(s) may be a single processor or a multi-core processor in different embodiments. Some instructions are passed to and executed by the GPU 4115. The GPU 4115 can offload various computations or complement the image processing provided by the processing unit(s) 4110. In some embodiments, such functionality can be provided using CoreImage's kernel shading language.

The read-only-memory (ROM) 4130 stores static data and instructions that are needed by the processing unit(s) 4110 and other modules of the electronic system. The permanent storage device 4135, on the other hand, is a read-and-write memory device. This device is a non-volatile memory unit that stores instructions and data even when the electronic system 4100 is off. Some embodiments of the invention use a mass-storage device (such as a magnetic or optical disk and its corresponding disk drive) as the permanent storage device 4135.

Other embodiments use a removable storage device (such as a floppy disk, flash memory device, etc., and its corresponding disk drive) as the permanent storage device. Like the permanent storage device 4135, the system memory 4120 is a read-and-write memory device. However, unlike storage device 4135, the system memory 4120 is a volatile read-and-write memory, such as random access memory. The system memory 4120 stores some of the instructions and data that the processor needs at runtime. In some embodiments, the invention's processes are stored in the system memory 4120, the permanent storage device 4135, and/or the read-only memory 4130. For example, the various memory units include instructions for processing multimedia clips in accordance with some embodiments. From these various memory units, the processing unit(s) 4110 retrieves instructions to execute and data to process in order to execute the processes of some embodiments.

The bus 4105 also connects to the input and output devices 4140 and 4145. The input devices 4140 enable the user to communicate information and select commands to the electronic system. The input devices 4140 include alphanumeric keyboards and pointing devices (also called "cursor control devices"), cameras (e.g., webcams), microphones or similar devices for receiving voice commands, etc. The output devices 4145 display images generated by the electronic system or otherwise output data. The output devices 4145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 41, bus 4105 also couples electronic system 4100 to a network 4125 through a network adapter (not shown). In this manner, the computer can be a part of a network of computers (such as a local area network ("LAN"), a wide area network ("WAN"), or an Intranet, or a network of networks, such as the Internet. Any or all components of electronic system 4100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 10, 17, 21, 22, 24, 33, 35, and 39) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory computer-readable medium storing a media-editing application for creating and editing a media presentation, said application comprising sets of instructions for:
    providing an editing module for editing the media presentation;
    specifying background-rendering operations, the background-rendering operations, rendering portions of the media presentation without interrupting editing by the editing module, including:
    grouping segments of media in the presentation into categories, prioritizing the categories to be processed based on attributes of the segments, and rendering the segments according to the priorities of the media presentation; and
    using operating system (OS) services to put the background-rendering operations and a set of other operations related to activities performed by a user of the media-editing application in differently prioritized queues, ensuring that the background-rendering operations queue is prioritized lower than the queue for the set of editing operations related to activities performed by a user when using shared computing resources in order not to interrupt editing by the editing module.

2. The non-transitory computer-readable medium of claim 1, wherein said prioritizing mitigates interruptions to the set of other operations of the media-editing application by the background-rendering operations.

3. The non-transitory computer-readable medium of claim 1, wherein the background-rendering operations comprise operations to determine an order to render the segments of the media presentation.

4. The non-transitory computer-readable medium of claim 3, wherein the background-rendering operations further comprise operations to render the segments of the media presentation in the determined order.

5. The non-transitory computer-readable medium of claim 1, wherein the computing resources of the device comprise a central processing unit (CPU), a graphics processing unit (GPU), a storage, and a memory.

6. The non-transitory computer-readable medium of claim 1, wherein the media-editing application further comprises a set of instructions for starting to perform the background-rendering operations after a certain amount of time elapses after a user of the media-editing application stops interacting with the media presentation using the media-editing application.

7. The method of claim 6, wherein the media-editing application further comprises a set of instructions for stopping performing the background-rendering operations when the user interacts with the media presentation again.

8. The method of claim 1, wherein using the OS services comprises putting the background-rendering operations in a queue that queues operations that a central processing unit (CPU) of the device executes.

9. The non-transitory computer-readable medium of claim 1, wherein using the OS services comprises putting the set of other operations of the media-editing application in a queue that queues operations that a graphics processing unit (GPU) executes.

10. A method of background-rendering portions of a media presentation that is defined by a media-editing application, the method comprising:
 providing an editing module for editing the media presentation;
 performing a set of background-rendering operations of the media presentation by the media-editing application without interrupting editing by the editing module, the background-rendering operations including:
 grouping segments of media in the presentation into categories, prioritizing the categories to be processed based on attributes of the segments, and rendering the segments according to the priorities;
 reading a piece of data that defines a portion of the media presentation; and
 applying a lock to control access to the piece of data, the lock allowing a set of editing operations by the media-editing application to access the piece of data while the set of background-rendering operations are reading the piece of data.

11. The method of claim 10, wherein the lock is a readers/writer lock.

12. The method of claim 11 further comprising specifying a lock to control access to rendered result for the portion of the media presentation.

13. A non-transitory computer-readable medium storing a media-editing application for creating and editing a media presentation, said application comprising:
 an editing module for editing a set of media clips to generate the media presentation; and
 a background-rendering module for rendering portions of the media presentation without interrupting editing by the editing module, the background-rendering module having operations including:
 grouping segments of media in the presentation into categories, prioritizing the categories to be processed based on attributes of the segments, and rendering the segments according to the priorities; and
 the background-rendering module prioritizing itself lower than the editing module when using shared computing resources of a device executing the media-editing application in order not to interrupt editing by the editing module.

14. The non-transitory computer-readable medium of claim 13, wherein the background-rendering module prioritizes itself lower than the editing module by placing instructions from the background-rendering module in a first queue of an operating system (OS) that is prioritized lower than a second queue of the OS for placing instructions from the editing module.

15. The non-transitory computer-readable medium of claim 13, wherein the background-rendering module prioritizes itself lower than the editing module by using a prioritization scheme that is internal to the media-editing application.

16. The non-transitory computer-readable medium of claim 13, wherein the background-rendering module allows the editing module to access a piece of data that represents a portion of the media presentation while the background-rendering module is accessing the same piece of data.

17. The non-transitory computer-readable medium of claim 16, wherein the editing module and the background-rendering module use a readers/writer lock for controlling access to the piece of data.

18. The non-transitory computer-readable medium of claim 16, wherein the editing module and the background-rendering module use another lock for controlling access to results of background-rendering the portions of the media presentation.

19. A non-transitory computer-readable medium storing a media-editing application for creating and editing a media presentation, said application comprising:
 an editing module for editing the media presentation;
 a first background-rendering module for (1) identifying different portions of the media presentation for background rendering and grouping the portions into categories and (2) determining an order in which the categories should be rendered based on attributes of the identified portions; and
 a second background-rendering module for background-rendering the portions identified by the first background-rendering module in the order determined by the first background-rendering module,
 wherein background rendering operations of the first and second rendering operations are performed without interrupting editing by the editing module by prioritizing the first and second background-rendering modules lower than the editing module in using computer resources.

20. The non-transitory computer-readable medium of claim 19, wherein the first background-rendering module groups the identified portions of the media presentation into different categories based on a set of attributes of the identified portions.

21. The non-transitory computer-readable medium of claim 20, wherein the set of attributes comprises a type of video that a portion of the media presentation has, real-time playability of a portion, availability of a source media file for a portion, user's inputs as to whether a particular portion is to be rendered first.

22. The non-transitory computer-readable medium of claim 19, wherein the first background-rendering module assigns the highest priority to a category that includes portions of the media presentation that a user of the media-editing application has specified to be rendered first.

23. The non-transitory computer-readable medium of claim 19, wherein the first background-rendering module assigns the lowest priority to a category that includes portions of the media presentation that do not need background-rendering or already have rendered results.

24. The non-transitory computer-readable medium of claim 19, wherein the first background-rendering assigns a higher priority to a category that includes portions the media presentation that require more computing resources of a device executing the media-editing application to render than a category that includes portions of the media presentation that require less computing resources to render.

25. The non-transitory computer-readable medium of claim 19, wherein said application further comprises an editing module for editing a set of media clips to generate the media presentation, wherein the first and second background-rendering modules perform identifying and rendering without interrupting processing editing by the editing module.

26. The non-transitory computer-readable medium of claim 1, wherein the background rendering operations further include:
generating keys for the segments.

27. The non-transitory computer-readable medium of claim 1, wherein the background rendering operations further include:
generating keys for the segments by using a hash function; and
constructing a frame identifier.

28. An apparatus comprising:
one or more processors;
memory storing one or more programs for execution by the one or more processors, the one or more programs including instructions for:
providing an editing module for editing the media presentation;
specifying background-rendering operations, the background-rendering operations, rendering portions of the media presentation without interrupting editing by the editing module, including:
grouping segments of media in the presentation into categories, prioritizing the categories to be processed based on attributes of the segments, and rendering the segments according to the priorities of the media presentation; and
using operating system (OS) services to put the background-rendering operations and a set of other operations related to activities performed by a user of the media-editing application in differently prioritized queues, ensuring that the background-rendering operations queue is prioritized lower than the queue for the set of editing operations related to activities performed by a user when using shared computing resources in order not to interrupt editing by the editing module.

* * * * *